United States Patent
Sakuma et al.

(10) Patent No.: US 10,056,757 B2
(45) Date of Patent: Aug. 21, 2018

(54) CONTROL DEVICE, POWER STORAGE DEVICE, BATTERY CONTROL SYSTEM, BATTERY CONTROL DEVICE, CONTROL METHOD, BATTERY CONTROL METHOD, AND RECORDING MEDIUM

(71) Applicant: NEC Corporation, Tokyo (JP)

(72) Inventors: Hisato Sakuma, Tokyo (JP); Koji Kudo, Tokyo (JP); Hitoshi Yano, Tokyo (JP); Ryo Hashimoto, Tokyo (JP); Eisuke Saneyoshi, Tokyo (JP); Takahiro Toizumi, Tokyo (JP); Kosuke Homma, Tokyo (JP); Alexander Viehweider, Tokyo (JP); Katsuya Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 126 days.

(21) Appl. No.: 15/021,408

(22) PCT Filed: Sep. 11, 2014

(86) PCT No.: PCT/JP2014/074050
§ 371 (c)(1),
(2) Date: Mar. 11, 2016

(87) PCT Pub. No.: WO2015/037654
PCT Pub. Date: Mar. 19, 2015

(65) Prior Publication Data
US 2016/0226249 A1    Aug. 4, 2016

(30) Foreign Application Priority Data
Sep. 12, 2013   (JP) .................................. 2013-189240

(51) Int. Cl.
*H02J 1/10* (2006.01)
*H02J 3/32* (2006.01)
(Continued)

(52) U.S. Cl.
CPC ................ *H02J 3/32* (2013.01); *H02J 7/007* (2013.01); *H02J 7/0047* (2013.01);
(Continued)

(58) Field of Classification Search
CPC ....................................................... H02J 3/32
See application file for complete search history.

(56) References Cited

U.S. PATENT DOCUMENTS

2012/0133333 A1   5/2012  Morioka et al.
2013/0300374 A1*  11/2013 Tomita ................ H01M 10/441
                                                       320/134
(Continued)

FOREIGN PATENT DOCUMENTS

EP    2 560 262    2/2013
EP    2 592 686    5/2013
(Continued)

OTHER PUBLICATIONS

Notification of Reasons for Refusal from the Japanese Patent Office dated Mar. 31, 2015, in counterpart Japanese patent application No. 2015-504086.

(Continued)

*Primary Examiner* — Daniel Puentes
(74) *Attorney, Agent, or Firm* — Finnegan, Henderson, Farabow, Garrett & Dunner, L.L.P.

(57) ABSTRACT

A control device for controlling the operation of a supply and demand adjustment device that is connected to a power grid includes: detection means for detecting the state of the supply and demand adjustment device; communication means for transmitting the detection result of the detection means to an external device and receiving from the external device operation control information for controlling the operation of the supply and demand adjustment device; comprehension means for receiving and comprehending an (Continued)

adjustment power amount transmitted by bidirectional communication or one-way communication; and control means for, based on the adjustment power amount and the operation control information, controlling the operation of the supply and demand adjustment device.

40 Claims, 26 Drawing Sheets

(51) Int. Cl.
  *H02J 13/00* (2006.01)
  *H02J 7/00* (2006.01)
(52) U.S. Cl.
  CPC ........ *H02J 7/0068* (2013.01); *H02J 13/0006* (2013.01); *H02J 13/0017* (2013.01); *Y02B 70/3266* (2013.01); *Y02E 60/722* (2013.01); *Y02E 70/30* (2013.01); *Y04S 10/14* (2013.01); *Y04S 20/242* (2013.01)

(56) References Cited

U.S. PATENT DOCUMENTS

| | | |
|---|---|---|
| 2014/0217989 A1 | 8/2014 | Kudo et al. |
| 2015/0012150 A1 | 1/2015 | Sakuma et al. |

FOREIGN PATENT DOCUMENTS

| | | |
|---|---|---|
| JP | 2001-37085 | 2/2001 |
| JP | 2006-94648 | 4/2006 |
| JP | 2010-146571 | 7/2010 |
| JP | 2012-50211 | 3/2012 |
| JP | 2013-106372 | 5/2013 |
| JP | 2013-258806 | 12/2013 |
| WO | WO 2013-031394 | 3/2013 |
| WO | WO 2013-128727 | 9/2013 |
| WO | WO 2014/123188 A1 | 8/2014 |
| WO | WO 2014/123189 A1 | 8/2014 |

OTHER PUBLICATIONS

Extended European Search Report from the European Patent Office dated Aug. 29, 2017, in counterpart European Patent Application No. 14844235.3.

Canadian Office Action issued by the Canadian Intellectual Property Office in counterpart Canadian Patent Application No. 2,924,006, dated Jan. 24, 2017.

Hill et al., "Battery Energy Storage for Enabling Integration of Distributed Solar Power Generation", IEEE Transactions on Smart Grid., vol. 3, No. 2, pp. 850-857, (2012).

International Search Report and Written Opinion dated Dec. 2, 2014 in corresponding PCT International Application.

Examination Report No. 1 for Standard Patent Application issued by the Australian Patent Office in counterpart Australian Patent Application No. 2014319347, dated Mar. 16, 2017.

Notice of Reasons for Refusal dated Jun. 12, 2018, issued by the Japanese Patent Office in counterpart Japanese Patent Apptication No. 2015-109889.

\* cited by examiner

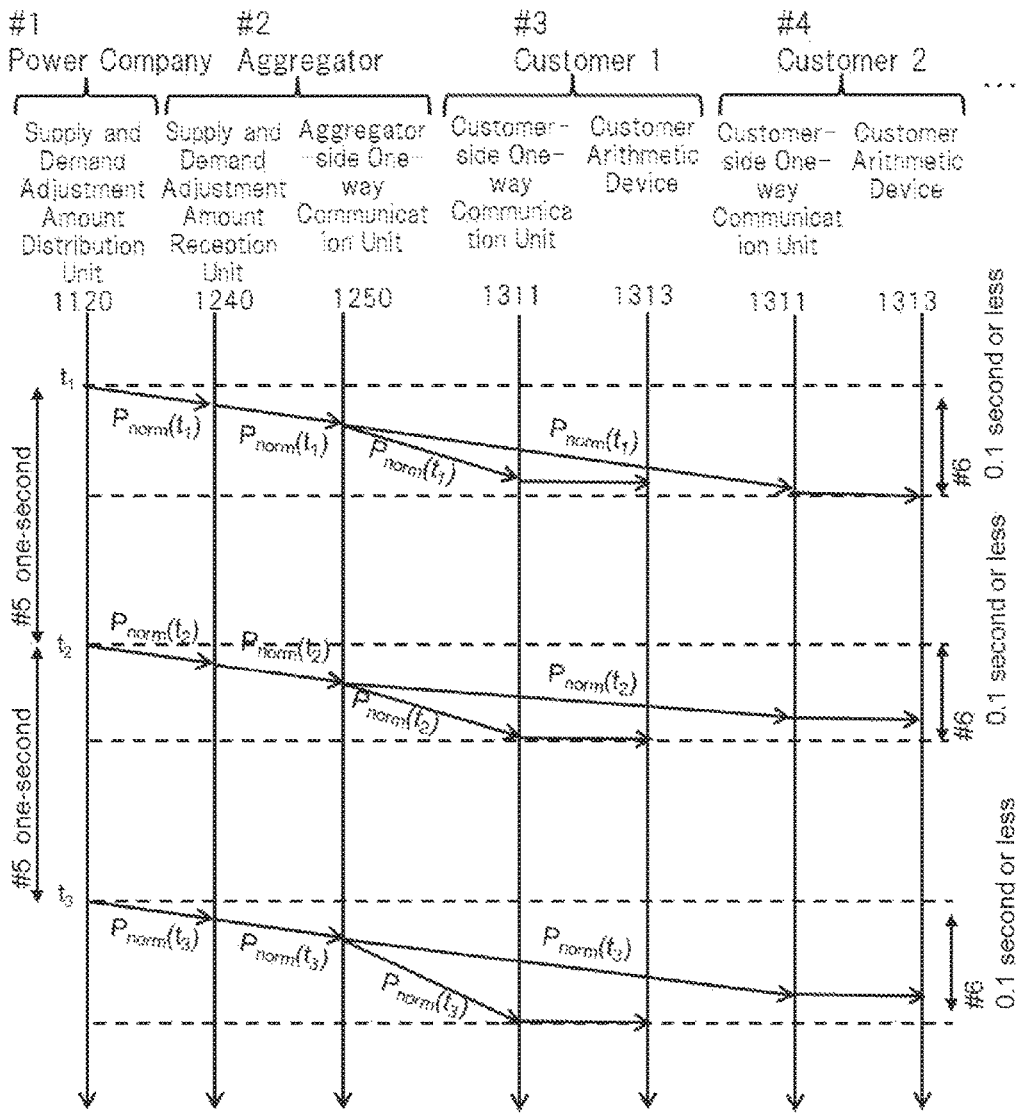

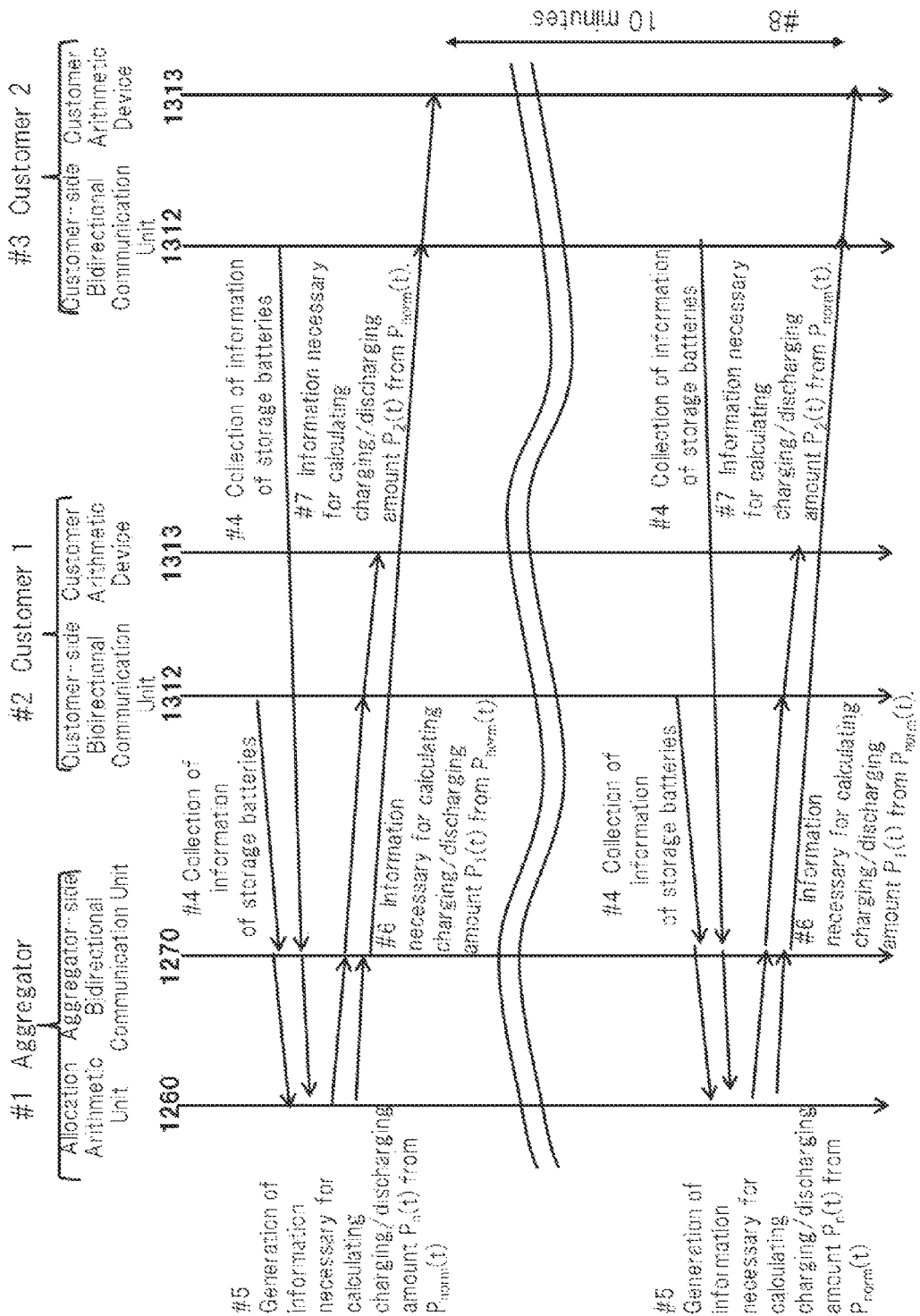

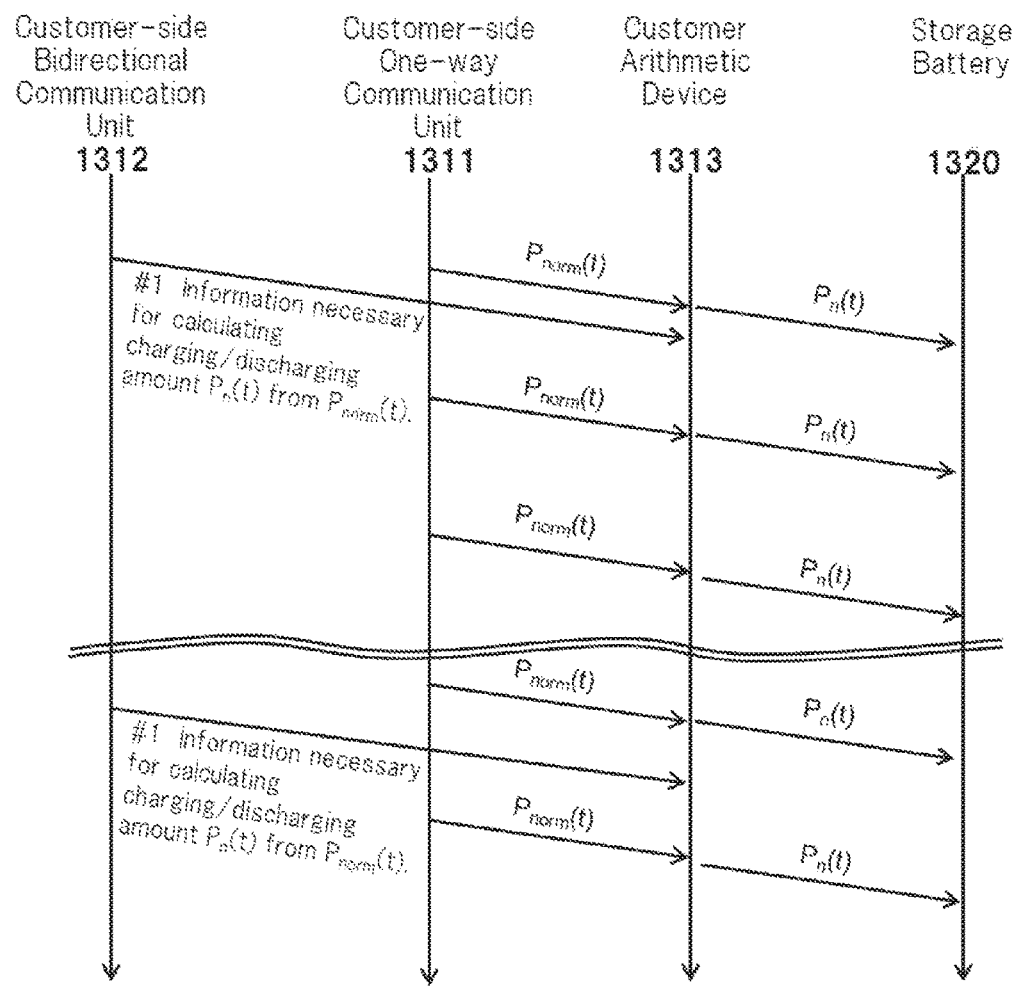

CONTROL DEVICE, POWER STORAGE DEVICE, BATTERY CONTROL SYSTEM, BATTERY CONTROL DEVICE, CONTROL METHOD, BATTERY CONTROL METHOD, AND RECORDING MEDIUM

CROSS-REFERENCE TO RELATED PATENT APPLICATIONS

This application is a National Stage Entry of International Application No. PCT/JP2014/074050, filed Sep. 11, 2014, which claims priority from Japanese Patent Application No. 2013-189240, filed Sep. 12, 2013. The entire contents of the above-referenced applications are expressly incorporated herein by reference.

TECHNICAL FIELD

The present invention relates to a control device, a power storage device, a battery control system, a battery control device, a control method, a battery control method, and a recording medium, and for example, relates to a control device, a power storage device, a battery control system, a battery control device, a control method, a battery control method, and a recording medium that control the discharging or charging of batteries that are connected to a power grid.

BACKGROUND ART

As a method of implementing the adjustment of the supply and demand of electric power in a power grid to date, a method has been adopted that gives priority to the use of the output control function of a thermal power generator of a thermal generation plant combined as appropriate with the output adjustment function of pumping-up electrical power generation.

In the future, however, with the widespread incorporation in power grids of renewable power sources as decentralized power sources, as represented by photovoltaic power generation and wind power generation for which the amount of power generation depends on the weather, the fluctuation of output of these decentralized power sources raises the concern that the balance between supply and demand of electric power will be even more adversely affected than in the past. As a result, there is the danger that an electrical power supply and demand adjustment method that focuses on thermal power generators to compensate for variations in the balance between supply and demand of electric power that arise from decentralized power sources will not be up to the task. As a result, a more effective electric power supply and demand adjustment technology has become necessary to supplement electric power supply and demand adjustment methods that focus on thermal power generators.

Technology that utilizes decentralized energy storage (hereinbelow energy storage is abbreviated "ES") such as "storage batteries" that are linked to the distribution network of a power grid holds promise as one electric power supply and demand adjustment technology that can meet this demand and that is expected to become extremely widespread in the future.

Patent Document 1 discloses a power grid control method that uses customer-side secondary batteries (ES) to implement adjustment of the supply and demand of electric power.

In the power grid control method disclosed in Patent Document 1, a power grid control device acquires the charged amount of the secondary batteries and further acquires from a central load dispatching office a schedule for supplying electric power to the power grid based on estimated electric power demand. The power grid control device determines the operation schedule of secondary batteries based on the charged amount of the secondary batteries and the electric power supply schedule.

Upon determining the operation schedule of the secondary batteries, the power grid control device transmits the operation schedule to the secondary battery control system that controls the operation of the secondary batteries.

The secondary battery control system, upon receiving the operation schedule from the power grid control device, controls the charging and discharging of the secondary batteries in accordance with the operation schedule regardless of the actual state of the power grid.

Patent Document 2 discloses a system in which a central controller acquires status information of a plurality of battery cells that have been sampled at the same time by way of local monitors or a higher-order controller.

RELATED ART LITERATURE

Patent Document

Patent Document 1: Japanese Unexamined Patent Application Publication No. 2006-094648
Patent Document 2: Japanese Unexamined Patent Application Publication No. 2010-146571

SUMMARY

Problem to be Solved by the Invention

The amount of electric power that is supplied to a power grid from renewable power sources fluctuates in short time intervals due to changes of the weather. For example, in a photovoltaic power generator, the amount of electric power supply changes even when a small cloud passes in front of the sun.

Settling on an electric power supply schedule that anticipates the portion of such short-term changes in the weather is substantially problematic.

As a result, in the power grid control method disclosed in Patent Document 1, it is substantially difficult to reflect variations in the electric power supply that accompany changes in the weather in short time intervals in an operation schedule (control information) of secondary batteries that is prepared by the power grid control device, which is a higher-order device, based on an electric power supply schedule.

Accordingly, in the power grid control method disclosed in Patent Document 1, the problem arises of the inability to cope with the actual changing state of the power grid that is not reflected in the control information from the higher-order device.

This problem obviously cannot be solved by the system disclosed in Patent Document 2, which does not control the charging and discharging of battery cells.

It is an object of the present invention to provide a control device, a power storage device, a battery control system, a battery control device, a control method, a battery control method, and a recording medium that can solve the above-described problem.

Means for Solving the Problem

The control device of the present invention is a control device that controls the operation of a supply and demand adjustment device that is connected to a power grid and includes:

detection means that detects the state of the supply and demand adjustment device;

communication means that transmits the detection result of the detection means to an external device and receives from the external device operation control information that controls the operation of the supply and demand adjustment device;

comprehension means that receives and comprehends an adjustment power amount that is transmitted by bidirectional communication or a one-way communication; and control means that, based on the adjustment power amount and the operation control information received by the communication means, controls the operation of the supply and demand adjustment device.

The control device of the present invention is a control device that controls the operation of supply and demand adjustment device that is connected to a power grid and that includes:

detection means that detects the state of the supply and demand adjustment device; communication means that transmits to an external device the detection result of the detection means and that receives from the external device operation control information that controls the operation of the supply and demand adjustment device;

comprehension means that receives and comprehends an adjustment power amount; and control means that, based on the adjustment power amount, the operation control information that was received by the communication means and the state of the supply and demand adjustment device that was detected by the detection means, controls the operation of the supply and demand adjustment device.

The control device of the present invention is a control device that controls the operation of a supply and demand adjustment device that is connected to a power grid and that includes:

detection means that detects the state of the supply and demand adjustment device;

communication means that transmits to an external device the detection result of the detection means and that receives from the external device operation control information that controls the operation of the supply and demand adjustment device;

comprehension means that receives and comprehends an adjustment power amount that was transmitted from an external device that differs from the external device; and control means that, based on the adjustment power amount and the operation control information that was received by the communication means, controls the operation of the supply and demand adjustment device.

The control device of the present invention is a control device that controls the operation of a supply and demand adjustment device that is connected to a power grid and that includes:

detection means that detects the state of the supply and demand adjustment device;

communication means that transmits to an external device the detection result of the detection means and that receives from the external device operation control information that controls the operation of the supply and demand adjustment device;

comprehension means that receives and comprehends an adjustment power amount that is determined based on the power flow of an interconnection line that connects the power grid and another power grid and based on the grid frequency of the power grid; and control means that, based on the adjustment power amount and the operation control information that was received by the communication means, controls the operation of the supply and demand adjustment device.

The control device of the present invention is a control device that controls the operation of a supply and demand adjustment device that is connected to a power grid and that includes:

detection means that detects the state of the supply and demand adjustment device;

comprehension means that receives and comprehends an adjustment power amount;

communication means that transmits to an external device the detection result of the detection means and that receives from the external device correspondence relation information that indicates the correspondence relation between the adjustment power amount and an allotted amount of each supply and demand adjustment device with respect to the amount of electric power that is allotted to all supply and demand adjustment devices that are controlled by N (where N is a number equal to or greater than 2) of the control devices and; and control means that uses the correspondence relation information to specify the allotted amount of the supply and demand adjustment device that corresponds to the adjustment power amount and causes the supply and demand adjustment device to charge or discharge at the allotted amount.

The control device of the present invention is a control device that controls the operation of a supply and demand adjustment device that is connected to a power grid and that includes:

detection means that detects the degree of tendency for the supply and demand adjustment device to deteriorate;

communication means that transmits to an external device the detection result of the detection means and that receives from the external device operation control information that controls the operation of the supply and demand adjustment device;

comprehension means that receives and comprehends an adjustment power amount; and control means that, based on the adjustment power amount and operation control information that was received by the communication means, controls the operation of the supply and demand adjustment device;

wherein the control means reduces the operating load of the supply and demand adjustment device in proportion to the tendency of the supply and demand adjustment device to deteriorate.

The power storage device of the present invention is a power storage device that contains a battery that is connected to a power grid and that includes:

detection means that detects the state of the battery;

communication means that transmits to an external device the detection result of the detection means and that receives from the external device operation control information that controls the operation of the battery;

comprehension means that receives and comprehends an adjustment power amount that was transmitted by bidirectional communication or one-way communication; and control means that, based on the adjustment power amount and the operation control information that was received by the communication means, controls the operation of the battery.

The power storage device of the present invention is a power storage device that contains a battery that is connected to a power grid and that includes:

detection means that detects the state of the battery;

communication means that transmits to an external device the detection result of the detection means and receives from the external device operation control information that controls the operation of the battery;

comprehension means that receives and comprehends an adjustment power amount; and control means that, based on the adjustment power amount, the operation control information that was received by the communication means and the state of the battery that was detected by the detection means, controls the operation of the battery.

The power storage device of the present invention is a power storage device that contains a battery that is connected to a power grid and that includes:

detection means that detects the state of the battery;

communication means that transmits to an external device the detection result of the detection means and that receives from the external device operation control information that controls the operation of the battery;

comprehension means that receives and comprehends an adjustment power amount transmitted from an external device that differs from the external device; and control means that, based on the adjustment power amount and the operation control information that was received by the communication means, controls the operation of the battery.

The power storage device of the present invention is a power storage device that contains a battery that is connected to a power grid and that includes:

detection means that detects the state of the battery;

communication means that transmits to an external device the detection result of the detection means and that receives from the external device operation control information that controls the operation of the battery;

comprehension means that receives and comprehends an adjustment power amount that is determined based on the power flow of an interconnection line that connects the power grid to another power grid and based on the grid frequency of the power grid; and control means that, based on the adjustment power amount and the operation control information that was received by the communication means, controls the operation of the battery.

The power storage device of the present invention is a power storage device that contains a battery that is connected to a power grid and that includes:

detection means that detects the state of the battery;

comprehension means that receives and comprehends an adjustment power amount;

communication means that transmits to an external device the detection result of the detection means and that receives from the external device correspondence relation information that indicates the correspondence relation between the adjustment power amount and an allotted amount of each battery with respect to the amount of electric power that is allotted to all batteries controlled by N (where N is a number equal to or greater than 2) of the power storage devices; and control means that uses the correspondence relation information to specify the allotted amount of the battery that corresponds to the adjustment power amount and causes the battery to charge or discharge at the allotted amount.

The power storage device of the present invention is a power storage device that contains a battery that is connected to a power grid and that includes:

detection means that detects the degree of tendency for a battery to deteriorate;

communication means that transmits to an external device the detection results of the detection means and that receives from the external device operation control information that controls the operation of the battery;

comprehension means that receives and comprehends an adjustment power amount; and control means that, based on the adjustment power amount and the operation control information that was received by the communication means, controls the operation of the battery;

wherein the control means reduces the operating load of the battery in proportion to the tendency of the battery to deteriorate.

The control method of the present invention is a control method performed by a control device that controls the operation of supply and demand adjustment devices that are connected to a power grid, the control method including steps of:

detecting the states of the supply and demand adjustment devices;

transmitting to an external device the states of the supply and demand adjustment devices and receiving from the external device operation control information that controls the operation of the supply and demand adjustment devices;

receiving an adjustment power amount that is transmitted by bidirectional communication or one-way communication; and controlling the operation of the supply and demand adjustment devices based on the adjustment power amount and the operation control information.

The control method of the present invention is a control method performed by a control device that controls the operation of a supply and demand adjustment device that is connected to a power grid, the control method including steps of:

detecting the state of the supply and demand adjustment device;

transmitting to an external device the state of the supply and demand adjustment device and receiving from the external device operation control information that controls the operation of the supply and demand adjustment device;

receiving an adjustment power amount; and controlling the operation of the supply and demand adjustment device based on the adjustment power amount, the operation control information and the state of the supply and demand adjustment device.

The control method of the present invention is a control method performed by a control device that controls the operation of a supply and demand adjustment device that is connected to a power grid, the control method including steps of:

detecting the state of the supply and demand adjustment device;

transmitting to an external device the state of the supply and demand adjustment device and receiving from the external device operation control information that controls the operation of the supply and demand adjustment device;

receiving an adjustment power amount that was transmitted from an external device that differs from the external device; and controlling the operation of the supply and demand adjustment device based on the adjustment power amount and the operation control information.

The control method of the present invention is a control method performed by a control device that controls the operation of a supply and demand adjustment device that is connected to a power grid, the control method including steps of:

detecting the state of the supply and demand adjustment device;

transmitting to an external device the state of the supply and demand adjustment device and receiving from the external device operation control information that controls the operation of the supply and demand adjustment device;

receiving an adjustment power amount that is determined based on power flow of an interconnection line that connects the power grid to another power grid and based on the grid frequency of the power grid; and controlling the operation of the supply and demand adjustment device based on the adjustment power amount and the operation control information.

The control method of the present invention is a control method performed by a control device that controls the operation of a supply and demand adjustment device that is connected to a power grid, the control method including steps of:

detecting the state of the supply and demand adjustment device;

receiving an adjustment power amount;

transmitting to an external device the state of the supply and demand adjustment device and receiving from the external device correspondence relation information that indicates the correspondence relation between the adjustment power amount and an allotted amount of each supply and demand adjustment device with respect to the electric power amount that is allotted to all supply and demand adjustment devices that are controlled by N (where N is a number equal to or greater than 2) of the control devices; and using the correspondence relation information to specify the allotted amount of the supply and demand adjustment device that corresponds to the adjustment power amount and causing the supply and demand adjustment device to charge or discharge at that allotted amount.

The control method of the present invention is a control method performed by a control device that controls the operation of a supply and demand adjustment device that is connected to a power grid, the control method including steps of:

detecting the degree of tendency for the supply and demand adjustment device to deteriorate;

transmitting to an external device the detection result and receiving from the external device operation control information that controls the operation of the supply and demand adjustment device;

receiving an adjustment power amount; and controlling the operation of the supply and demand adjustment device based on the adjustment power amount and the operation control information;

wherein the operating load of the supply and demand adjustment device is reduced in proportion to the tendency of the supply and demand adjustment device to deteriorate.

The recording medium of the present invention is a recording medium that can be read by a computer and on which a program has been recorded to cause a computer to execute:

a detection procedure of detecting the state of a supply and demand adjustment device that is connected to a power grid;

a communication procedure of transmitting to an external device the detection result of the detection procedure and receiving from the external device operation control information that controls the operation of the supply and demand adjustment device;

a comprehension procedure of receiving and comprehending an adjustment power amount that is transmitted by bidirectional communication or one-way communication; and a control procedure of controlling the operation of the supply and demand adjustment device based on the adjustment power amount and the operation control information.

The recording medium of the present invention is a recording medium that can be read by a computer and on which a program has been recorded to cause a computer to execute:

a detection procedure of detecting the state of a supply and demand adjustment device that is connected to a power grid;

a communication procedure of transmitting to an external device the detection result of the detection procedure and receiving from the external device operation control information that controls the operation of the supply and demand adjustment device;

a comprehension procedure of receiving and comprehending an adjustment power amount; and a control procedure of controlling the operation of the supply and demand adjustment device based on the adjustment power amount, the operation control information and the state of the supply and demand adjustment device.

The recording medium of the present invention is a recording medium that can be read by a computer and on which a program has been recorded to cause a computer to execute:

a detection procedure of detecting the state of supply and demand adjustment device that is connected to a power grid;

a communication procedure of transmitting to an external device the detection result of the detection procedure and receiving from the external device operation control information that controls the operation of the supply and demand adjustment device;

a comprehension procedure of receiving and comprehending an adjustment power amount that was transmitted from an external device that differs from the external device; and a control procedure of controlling the operation of the supply and demand adjustment device based on the adjustment power amount and the operation control information.

The recording medium of the present invention is a recording medium that can be read by a computer and on which is recorded a program for causing a computer to execute:

a detection procedure of detecting the state of a supply and demand adjustment device that is connected to a power grid;

a communication procedure of transmitting to an external device the detection result of the detection procedure and receiving from the external device operation control information that controls the operation of the supply and demand adjustment device;

a comprehension procedure of receiving and comprehending an adjustment power amount that is determined based on power flow of an interconnection line that connects the power grid to another power grid and based on the grid frequency of the power grid; and a control procedure of controlling the operation of the supply and demand adjustment device based on the adjustment power amount and the operation control information.

The recording medium of the present invention is a recording medium that can be read by a computer and on which is recorded a program for causing a computer to execute:

a detection procedure of detecting the state of a supply and demand adjustment device that is connected to a power grid;

a comprehension procedure of receiving and comprehending an adjustment power amount;

a communication procedure of transmitting to an external device the detection result of the detection procedure and receiving from the external device correspondence relation information that indicates the correspondence relation between the adjustment power amount and an allotted amount of each supply and demand adjustment device with respect to the electric power amount that is allotted to all supply and demand adjustment devices that are controlled by N (where N is a number equal to or greater than 2) of the computers; and a control procedure of using the correspondence relation information to specify the allotted amount of the supply and demand adjustment device that corresponds to the adjustment power amount and causing the supply and demand adjustment device to charge or discharge at that allotted amount.

The recording medium of the present invention is a recording medium that can be read by a computer and on which is recorded a program for causing a computer to execute:

a detection procedure of detecting the degree of tendency for a supply and demand adjustment device that is connected to a power grid to deteriorate;

a communication procedure of transmitting to an external device the detection result of the detection procedure and receiving from the external device operation control information that controls the operation of the supply and demand adjustment device;

a comprehension procedure of receiving and comprehending an adjustment power amount; and a control procedure of controlling the operation of the supply and demand adjustment device based on the adjustment power amount and the operation control information;

wherein the operating load of the supply and demand adjustment device is reduced in proportion to the tendency of the supply and demand adjustment device to deteriorate.

The battery control system of the present invention is a battery control system that includes a first control device that controls the operation of a battery that is connected to a power grid and a second control device that communicates with the first control device; wherein:

the first control device includes:

detection means that detects the state of the battery;

first communication means that transmits to the second control device the detection result of the detection means, and moreover, that receives from the second control device operation control information for controlling the operation of the battery;

first comprehension means that comprehends an adjustment power amount for adjusting the balance between supply and demand of electric power in the power grid; and control means that controls the operation of the battery based on the adjustment power amount and the operation control information that was received by the first communication means;

the second control device includes:

second communication means that communicates with the first control device and that receives the detection result of the detection means;

second comprehension means that comprehends the state of the power grid; and processing means that generates the operation control information based on the detection result of the detection means that was received by the second communication means and the state of the power grid that was comprehended by the second comprehension means, and that transmits the operation control information from the second communication means to the first control device.

The battery control device of the present invention is a battery control device that controls the operation of a battery that is connected to a power grid and that includes:

detection means that detects the state of the battery;

communication means that transmits to an external device the detection result of the detection means, and moreover, that receives from the external device operation control information for controlling the operation of the battery;

comprehension means that comprehends an adjustment power amount for adjusting the balance between supply and demand of electric power in the power grid; and control means that controls the operation of the battery based on the adjustment power amount and the operation control information that was received by the communication means.

The battery control method of the present invention is a battery control method performed by a battery control system that contains a first control device that controls the operation of a battery that is connected to a power grid and a second control device that communicates with the first control device; the method including:

a detection step of the first control device detecting the state of the battery;

a first comprehension step of the second control device comprehending the state of the power grid;

a first transmission step of the first control device transmitting the state of the battery to the second control device;

a first reception step of the second control device receiving the state of the battery;

a generation step of the second control device generating operation control information for controlling the operation of the battery based on the state of the battery and the state of the power grid;

a second transmission step of the second control device transmitting the operation control information to the first control device;

a second reception step of the first control device receiving the operation control information;

a second comprehension step of the first control device comprehending an adjustment power amount for adjusting the balance between supply and demand of electric power in the power grid; and a control step of the first control device controlling the operation of the battery based on the adjustment power amount and the operation control information.

The battery control method of the present invention is a battery control method performed by a battery control device that controls the operation of a battery that is connected to a power grid, the battery control method including:

a detection step of detecting the state of the battery;

a communication step of transmitting to an external device the state of the battery and receiving from the external device operation control information for controlling the operation of the battery;

a comprehension step of comprehending an adjustment power amount for adjusting the balance between supply and demand of electric power in the power grid; and a control step of controlling the operation of the battery based on the adjustment power amount and the operation control information.

The program of the present invention causes a computer to execute:

a detection procedure of detecting the state of a battery that is connected to a power grid;

a communication procedure of transmitting battery-relevant information to an external device, and moreover, receiving from the external device operation control information for controlling the operation of the battery;

a comprehension procedure of comprehending an adjustment power amount for adjusting the balance between supply and demand of electric power in the power grid; and a control procedure of controlling the operation of the battery based on the adjustment power amount and the operation control information.

Effect of the Invention

According to the present invention, by controlling the operation of a battery based on operation control information that is provided from an external device and an adjustment power amount that is comprehended by a control device, the control device is able to adjust the operation of the battery in accordance with actual changes of the state of the power grid while following operation control information.

BRIEF DESCRIPTION OF THE DRAWINGS

FIG. 20 shows an example of the information that is stored in database 1210.

FIG. 21 is a view for describing the distribution operation of supply and demand adjustment amount $P_{norm}(t)$ that has been normalized.

FIG. 22 is a view for describing the distribution procedures of bidirectional communication.

FIG. 23 is a view for describing the operation of determining the charging/discharging amount of a storage battery.

EXEMPLARY EMBODIMENT

Exemplary embodiments of the present invention are next described with reference to the accompanying drawings.

First Exemplary Embodiment

Figure 1:
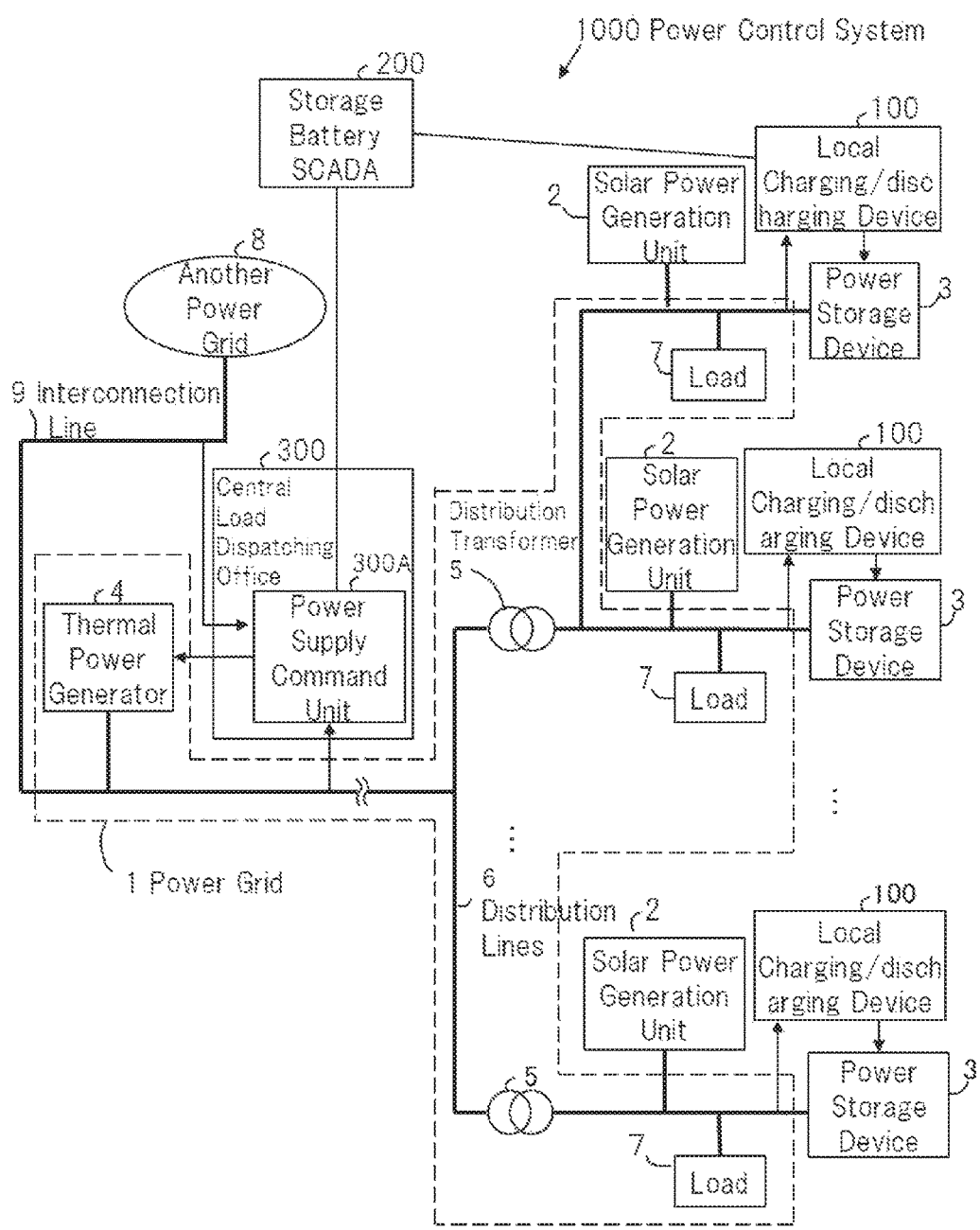
FIG. 1 shows power control system 1000 that adopts the battery control system of an exemplary embodiment of the present invention.

FIG. 1 shows power control system 1000 in which the battery control system of the first exemplary embodiment of the present invention is adopted.

In FIG. 1, power control system 1000 includes: power grid 1, solar power generation units 2, N (where N is an integer equal to or greater than 1) power storage devices 3, N local charging/discharging devices 100, storage battery SCADA (Supervisory Control And Data Acquisition) 200, and power supply command unit 300A in central load dispatching office 300. Power grid 1 includes thermal power generator 4, distribution transformers 5, and distribution lines 6. Solar power generation units 2 may be included in power grid 1. The N local charging/discharging devices 100 and storage battery SCADA 200 are included in the battery control system. Thermal power generator 4 is an example of an external electric power stabilizing device.

In power grid 1 that is linked to solar power generation units 2, concern has arisen regarding fluctuation of the balance between supply and demand of electric power that accompanies, for example, fluctuation of the amount of power generation of solar power generation units 2 that depends on the weather. Power control system 1000 reduces fluctuation of the balance between supply and demand of electric power in power grid 1 by controlling the power generation operations of thermal power generator 4 and the charging/discharging operations of N power storage devices 3.

Power grid 1 is a system for supplying electric power to customer-side loads 7. Power grid 1 also includes other equipment (for example, switches, higher-order transformers, SVR (Step Voltage Regulators) and pole transformers) but this equipment is omitted in the interest of simplifying the explanation.

Power grid 1 is linked to another power grid 8 by way of interconnection line 9. As a result, electric power is supplied from power grid 1 to another power grid 8 by way of interconnection line 9 or is supplied from another power grid 8 to power grid 1 by way of interconnection line 9.

Solar power generation units 2 are one example of renewable power sources. Renewable power sources are not limited to solar power generation units and can be modified as appropriate. For example, wind power generators, hydroelectric power generators (including small hydroelectric power generators that generate 1000 Kw or less of electric power), geothermal power generators, or a mixture of these power generators may be used as renewable power sources.

Power storage devices 3 are an example of batteries (storage batteries) and, for example, are lithium-ion batteries, nickel-hydrogen batteries, sodium-sulfur batteries, or redox-flow batteries.

In the present exemplary embodiment, N power storage devices 3 have a one-to-one correspondence with local charging/discharging devices 100. Power storage devices 3 may be incorporated into the corresponding local charging/discharging devices 100, or may not be incorporated into the corresponding local charging/discharging devices 100. In the present exemplary embodiment, each power storage device 3 is assumed to be incorporated into a corresponding local charging/discharging device 100 (see FIG. 2).

Each local charging/discharging device 100 controls the charging/discharging operations of the corresponding power storage device 3.

Storage battery SCADA 200 manages each local charging/discharging device 100 and each power storage device 3.

Power supply command unit 300A reduces fluctuation of the balance between the supply and demand of electric power in power grid 1 by regulating the power generation operations of thermal power generator 4 and the charging/discharging operations of N power storage devices 3.

Figure 2:
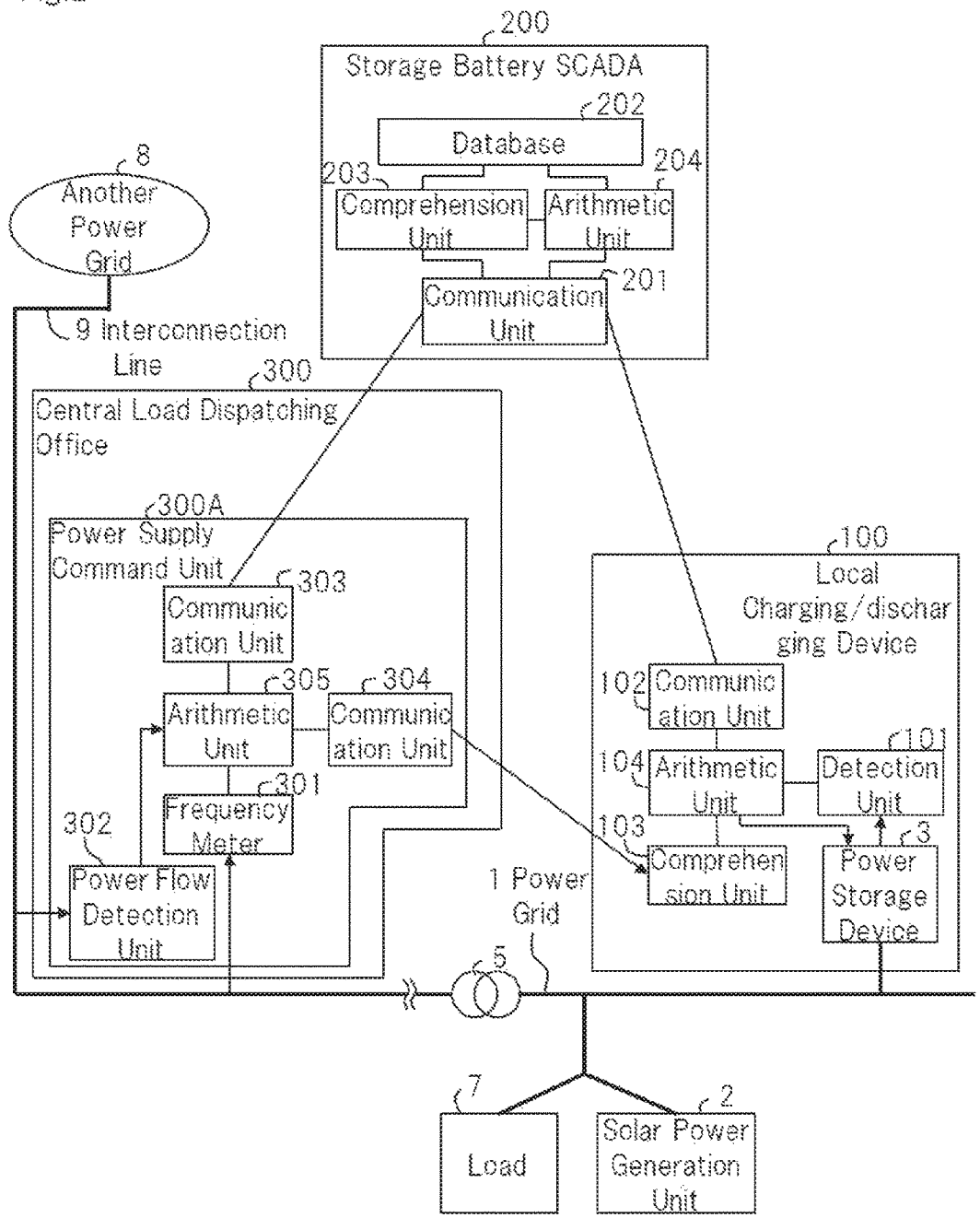
FIG. 2 shows an example of local charging/discharging device 100, storage battery SCADA 200, and power supply command unit 300A.

FIG. 2 shows an example of local charging/discharging device 100, storage battery SCADA 200, and power supply command unit 300A. In FIG. 2, constituent elements that are identical to elements in FIG. 1 are given the same reference numbers. In FIG. 2, of N power storage devices 3 and N local charging/discharging devices 100, one local charging/discharging device 100 that incorporates one power storage device 3 is shown in the interest of simplifying the explanation.

Local charging/discharging device 100 will first be described.

Local charging/discharging device 100 is one example of a first control device or a battery control device. Local charging/discharging device 100 controls the operation of power storage device 3 that is connected to power grid 1. Local charging/discharging device 100 includes detection unit 101, communication unit 102, comprehension unit 103, and arithmetic unit 104.

Detection unit 101 is one example of the detection means. Detection unit 101 detects the SOC (State Of Change) of power storage device 3. The SOC of power storage device 3 is assumed to be a value within the range of from 0 to 1. The SOC of power storage device 3 is one example of the state information that indicates the state of power storage device 3 or battery information for specifying the chargeable/dischargeable capacity of power storage device 3. The state information and battery information are not limited to the SOC of power storage device 3 and can be modified as appropriate. For example, the cell temperature, the amount of current, or the voltage of power storage device 3 may also be used.

Communication unit 102 is one example of the first communication means or communication means. Communication unit 102 communicates with storage battery SCADA 200.

Comprehension unit 103 is one example of the first comprehension means. Comprehension unit 103 comprehends the adjustment power amount W that is necessary for adjusting the balance between supply and demand of electric power in power grid 1 (hereinbelow referred to as simply "adjustment power amount"). Adjustment power amount W changes according to the state of the balance between supply and demand of electric power in power grid 1.

For example, adjustment power amount information for specifying the adjustment power amount W is transmitted from power supply command unit 300A, and comprehension unit 103 receives this adjustment power amount information and thus comprehends the adjustment power amount W.

The adjustment power amount information indicates, for example, adjustment power amount W and is transmitted from power supply command unit 300A by broadcast. The broadcast of the adjustment power amount information may be carried out by wireless communication, or may be carried out using a public network such as the Internet. Broadcast that uses FM (Frequency Modulation) broadcast may be used as the broadcast by wireless communication. A broadcast by wireless communication is not limited to broadcast that uses FM broadcast and can be modified as appropriate. The method of transmitting the adjustment power amount information is not limited to broadcast and can be modified as appropriate. For example, the adjustment power amount information may be transmitted by bidirectional communication.

Arithmetic unit 104 is one example of the control means.

Arithmetic unit 104 executes an information acquisition operation of acquiring allotment information that indicates the allotment of electric power supply and demand balance control from storage battery SCADA 200 (transmission/reception process) and a control operation of using the allotment information to control the charging/discharging operations of power storage device 3 (battery operation control process).

The allotment information is information relating to the charging/discharging operations of power storage device 3 allotted to local charging/discharging device 100 or power storage device 3 to reduce fluctuation of the balance between supply and demand of electric power.

Arithmetic unit 104 repeatedly executes an information acquisition operation at time intervals and repeatedly executes control operations at time intervals that are shorter than the time intervals of the information acquisition operations.

For example, arithmetic unit 104 repeatedly executes the information acquisition operation at a period T (for example, T=one minute) and repeatedly executes the control operation at a period $T_1$ (for example, T1=4 seconds). Period T is one example of a predetermined time interval. In the present exemplary embodiment, both the transmission and reception of adjustment power amount information are repeatedly executed at period $T_1$.

Period T and period $T_1$ are not limited to one minute and four seconds, but period T should be longer than period $T_1$.

In addition, the operation time interval of the information acquisition operation and the operation time interval of the control operation or either operation need not be fixed, but the shortest time of the operation time intervals of the information acquisition operation should be longer than the longest time of the operation time intervals of the control operation.

In addition, arithmetic unit 104 may execute an information acquisition operation in accordance with an information request indicating the request for SOC from storage battery SCADA 200, or may execute an autonomous information acquisition operation.

The information acquisition operation of arithmetic unit 104 is next described.

Arithmetic unit 104 transmits the SOC of power storage device 3 that was detected by detection unit 101 together with identification information (hereinbelow referred to as "ID") of power storage device 3 from communication unit 102 to storage battery SCADA 200.

The ID is stored in each of local charging/discharging devices 100 and storage battery SCADA 200. Storage battery SCADA 200 uses the ID that was transmitted together with the SOC of power storage device 3 to identify power storage device 3 whose SOC was reported.

After the SOC and ID of power storage device 3 have been transmitted to storage battery SCADA 200, communication unit 102 receives allotment information from storage battery SCADA 200.

The allotment information is set in accordance with the SOC of power storage device 3 and the state of imbalance between the supply and demand of electric power. In the present exemplary embodiment, an allotment coefficient K and the maximum value $W_{max}$ of the adjustment power amount are used as the allotment information. The allotment coefficient K is one example of the operation control information and is larger the higher the allotment proportion to power storage device 3.

The control operation of arithmetic unit 104 is next described.

Arithmetic unit 104 controls the charging/discharging operations of power storage device 3 based on the adjustment power amount that was comprehended by comprehension unit 103 and the allotment information that was received by communication unit 102.

In addition, arithmetic unit 104 may control the charging/discharging operations of power storage device 3 based on the SOC of power storage device 3 in addition to the adjustment power amount that was comprehended by comprehension unit 103 and allotment information that was received by communication unit 102.

Arithmetic unit 104 uses allotment coefficient K and adjustment power amount W to control the charging/discharging operations of power storage device 3 when the absolute value of adjustment power amount W is no greater than the maximum value $W_{max}$ of the adjustment power amount. On the other hand, when the absolute value of adjustment power amount W is greater than the maximum value $W_{max}$ of the adjustment power amount, arithmetic unit 104 uses allotment coefficient K and maximum value $W_{max}$ of the adjustment power amount to control the charging/discharging operations of power storage device 3.

Storage battery SCADA 200 is next described.

Storage battery SCADA 200 is one example of the second control device or a battery control support device. Storage battery SCADA 200 places N local charging/discharging devices 100 and N power storage devices 3 under its control. Storage battery SCADA 200 includes communication unit 201, database 202, comprehension unit 203, and arithmetic unit 204.

Communication unit 201 is one example of the second communication means or the support-side communication means. Communication unit 201 communicates with each local charging/discharging device 100 and power supply command unit 300A. For example, communication unit 201 receives the SOC and ID of power storage device 3 from each local charging/discharging device 100.

Database 202 holds the storage battery distribution factor curve that is used to find the chargeable/dischargeable capacity of power storage devices 3 from the SOC of power storage device 3 that was received by communication unit 201. Database 202 further holds the rated output P(n) of each power storage device 3 that is used to find the chargeable/dischargeable capacity. The rated output of power converters (AC/DC converters) (not shown) that are connected to power storage devices 3 is used as the rated output P(n) of power storage devices 3.

Figure 3A:
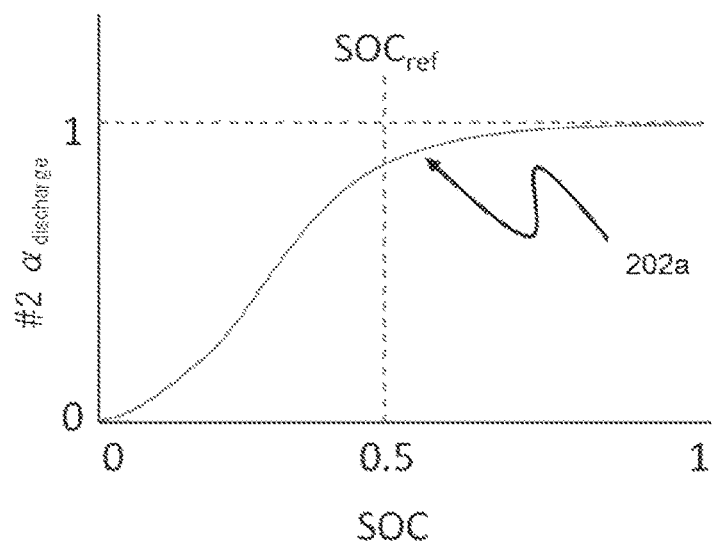
FIG. 3A shows an example of a storage battery distribution factor curve.
Figure 3B:
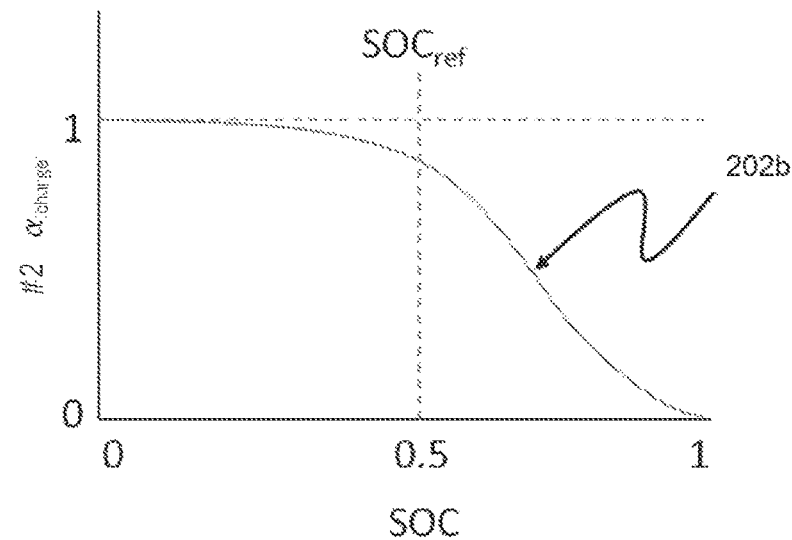
FIG. 3B shows an example of a storage battery distribution factor curve.

FIGS. 3A and 3B show examples of the storage battery distribution factor curve. FIG. 3A shows an example of storage battery distribution factor curve 202a at the time of discharging, and FIG. 3B shows an example of storage battery distribution factor curve 202b at the time of charging.

Comprehension unit 203 is one example of the second comprehension means. Comprehension unit 203 comprehends the electric power amount (hereinbelow referred to as the "allotted power amount") that is allotted to power storage device 3 that is under the control of storage battery SCADA 200 for adjusting the electric power amount on power grid 1. The allotted power amount is one example of the state of the power grid.

Comprehension unit 203 uses the storage battery distribution factor curve in database 202 to derive from the SOC of N power storage devices 3 the total adjustable capacity $P_{ES}$ that indicates the chargeable/dischargeable capacity of a storage battery group made up of N power storage devices 3. The total adjustable capacity $P_{ES}$ is one example of notification information.

Comprehension unit 203 transmits the total adjustable capacity $P_{ES}$ from communication unit 201 to power supply command unit 300A, and then receives by way of communication unit 201 the allotted power amount information that shows the allotted power amount that reflects the total adjustable capacity $P_{ES}$. Comprehension unit 203 comprehends the allotted power amount in the allotted power amount information.

In the present exemplary embodiment, the charging/discharging gain line, which shows LFC (Load Frequency Control) assignment capacity $LFC_{ES}$ that shows the maximum allotted power amount and maximum value $W_{max}$ of the adjustment power amount, is used as the allotted power amount information.

The "maximum value $W_{max}$ of the adjustment power amount" means the "maximum amount of deviation of the adjustment power amount" that can be handled by the total output $LFC_{ES}$ of a multiplicity of storage batteries under control, the $LFC_{ES}$ being difficult to cope with in the case of a value equal to or higher than this value.

Figure 4:
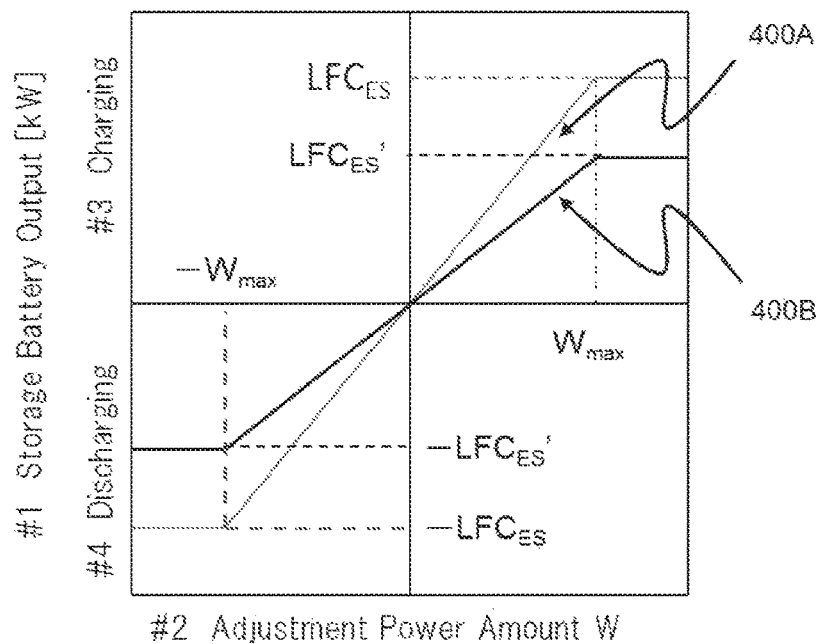
FIG. 4 shows an example of a charging/discharging gain line.

FIG. 4 shows an example of the charging/discharging gain line. Details regarding the charging/discharging gain line will be presented later.

Arithmetic unit 204 is one example of processing means. Arithmetic unit 204 generates allotment information (allotment coefficient K and maximum value $W_{max}$ of the adjustment power amount) based on the SOC of power storage devices 3 that were received by communication unit 201 and the charging/discharging gain line that was comprehended by comprehension unit 203. Arithmetic unit 204 transmits the allotment information (allotment coefficient K and the maximum value $W_{max}$ of the adjustment power amount) from communication unit 201 to each local charging/discharging device 100.

Power supply command unit 300A is next described.

Power supply command unit 300A is one example of an external control device and external communication device. Power supply command unit 300A includes frequency meter 301, power flow detection unit 302, communication units 303 and 304, and arithmetic unit 305.

Frequency meter 301 detects the grid frequency of power grid 1.

Power flow detection unit 302 detects the power flow in interconnection line 9.

Communication unit 303 communicates with storage battery SCADA 200 and each local charging/discharging device 100. For example, communication unit 303 receives the total adjustable capacity $P_{ES}$ from storage battery SCADA 200.

Communication unit 304 transmits the adjustment power amount information to each local charging/discharging device 100.

Arithmetic unit 305 controls the operation of power supply command unit 300A.

For example, arithmetic unit 305 uses the grid frequency that was detected by frequency meter 301 and the power flow of interconnection line 9 that was detected by power flow detection unit 302 to calculate the total supply and demand adjustment amount that is the output correction amount of the power plant. The total supply and demand adjustment amount means the adjustment power amount.

For example, when electric power is supplied from power grid 1 to another power grid 8 by way of interconnection line 9, arithmetic unit 305 calculates, as the total supply and demand adjustment amount, the result obtained by multiplying a predetermined constant by a value obtained by subtracting the grid frequency that was detected in frequency meter 301 from the reference frequency of the grid frequency, and then subtracting the power flow of interconnection line 9 (the electric power that is supplied from power grid 1 to another power grid 8 by way of interconnection line 9) from this multiplication result.

When electric power is supplied from another power grid 8 to power grid 1 by way of interconnection line 9, arithmetic unit 305 calculates, as the total supply and demand adjustment amount, the result obtained by multiplying a predetermined constant by the value obtained by subtracting the grid frequency detected by frequency meter 301 from the reference frequency of the grid frequency and then adding the power flow of interconnection line 9 (the electric power that is supplied from the other power grid 8 to power grid 1 by way of interconnection line 9) to this multiplication result.

Arithmetic unit 305 generates adjustment power amount information that shows the total supply and demand adjustment amount and transmits this adjustment power amount information from communication unit 304 by broadcast.

In addition, arithmetic unit 305 uses the total supply and demand adjustment amount, the LFC adjustment capacity of thermal power generator 4 that is the object of control, and total adjustable capacity $P_{ES}$ of the storage battery group that is the object of control to derive the LFC capacity. Arithmetic unit 305 acquires the LFC adjustment capacity of thermal power generator 4 from the thermal power generator control unit (not shown). The total adjustable capacity $P_{ES}$ is supplied from communication unit 303 to arithmetic unit 305.

Arithmetic unit 305 assigns to thermal power generator 4 the capacity of LFC capacity from which the sudden fluctuation component is eliminated and assigns to the storage battery group the remaining LFC capacity $LFC_{ES}$ (where $LFC_{ES} \leq P_{ES}$). For example, arithmetic unit 305 uses a high-pass filter that passes through, of the LFC capacity, only the fluctuation component having a frequency of 10 seconds or less to extract the sudden fluctuation component (capacity $LFC_{ES}$) from the LFC capacity.

Alternatively, arithmetic unit 305 assigns the LFC capacity to thermal power generator 4 and the storage battery group in accordance with an assignment ratio of LFC capacity to thermal power generator 4 and to the storage battery group.

Arithmetic unit 305 treats capacity $LFC_{ES}$ as LFC assignment capacity $LFC_{ES}$ and generates a charging/discharging gain line (see FIG. 4) that shows the LFC assignment capacity $LFC_{ES}$ and the maximum value $W_{max}$ of the adjustment power amount that was determined in advance.

Arithmetic unit 305 transmits the charging/discharging gain line from communication unit 303 to storage battery SCADA 200.

A summary of the operation is next described.

(1) Storage battery SCADA 200 collects the SOC of each power storage device 3 by receiving the SOC of each control-object power storage device 3 from each local charging/discharging device 100 at a period T. Period T is in the order of one minute.

(2) Storage battery SCADA 200 derives the total adjustable capacity $P_{ES}$ for each accumulation of the SOC of each power storage device 3 based on the SOC of each power storage device 3.

(3) Storage battery SCADA 200 next transmits the total adjustable capacity $P_{ES}$ to power supply command unit 300A at period $T_m$. Period $T_m$ is equal to or greater than period T, for example, four minutes.

(4) Power supply command unit 300A calculates the LFC assignment capacity $LFC_{ES}$ (where $LFC_{ES} \leq P_{ES}$) for the group of power storage devices 3 under the management of storage battery SCADA 200 for each reception of total adjustable capacity $P_{ES}$.

(5) Power supply command unit 300A, for each calculation of LFC assignment capacity $LFC_{ES}$, uses the LFC assignment capacity $LFC_{ES}$ and the maximum value $W_{max}$ of the adjustment power amount to create a charging/discharging gain line and transmits the charging/discharging gain line to storage battery SCADA 200.

(6) Storage battery SCADA 200 calculates allotment coefficient K in accordance with the most recent charging/discharging gain line from power supply command unit 300A.

(7) Storage battery SCADA 200 next transmits the allotment information (the allotment coefficient K and maximum value $W_{max}$ of the adjustment power amount) to each local charging/discharging device 100 at period T.

(8) Each local charging/discharging device 100 calculates the local charging/discharging gain line that stipulates the charging/discharging operation of power storage device 3 based on the allotment coefficient K and the maximum value $W_{max}$ of the adjustment power amount. The local charging/discharging gain line will be described later.

(9) Power supply command unit 300A creates adjustment power amount information that indicates the adjustment power amount (total supply and demand adjustment amount) at period $T_1$ and broadcast-transmits the adjustment power amount information at period $T_1$.

(10) Each local charging/discharging device 100 uses the adjustment power amount and the local charging/discharging gain line indicated by the adjustment power amount information to control the charging/discharging operation of power storage device 3.

The details of the operation are next described.

The operation in which storage battery SCADA 200 derives the total adjustable capacity $P_{ES}$ (hereinbelow referred to as the "$P_{ES}$ derivation operation") based on the SOC of power storage devices 3 is first described. The derivation of the total adjustable capacity $P_{ES}$ requires information such as the rated output P(n) of the storage battery of each ID (how many kWh the battery is, or the range of usable SOC, a range of, for example, 30%-90%). This information is basically static information, and in the present exemplary embodiment, it is assumed that storage battery SCADA 200 has acquired this information from each local charging/discharging device 100 beforehand.

Figure 5:
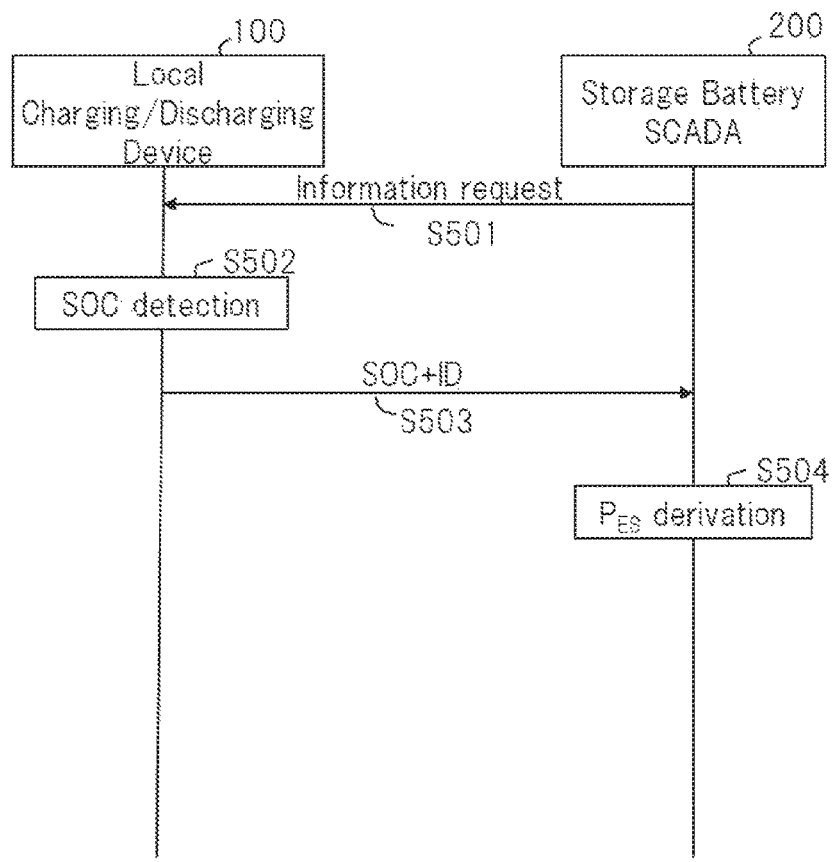
FIG. 5 is a sequence diagram for describing the $P_{ES}$ derivation operation.

FIG. 5 is a sequence diagram for describing the $P_{ES}$ derivation operation. In FIG. 5, the number of local charging/discharging devices 100 is assumed to be one for the sake of simplifying the explanation.

Communication unit 201 of storage battery SCADA 200 transmits an information request requesting SOC to each local charging/discharging device 100 (Step S501).

Arithmetic unit 104 in each local charging/discharging device 100, upon receiving an information request requesting SOC by way of communication unit 102, causes detection unit 101 to detect the SOC of power storage device 3 (Step S502).

Arithmetic unit 104 next transmits the SOC that was detected by detection unit 101 together with the ID from communication unit 102 to storage battery SCADA 200 (Step S503). In the following description, the ID is the sequential number (n) of "1" to "N."

Upon receiving the SOC to which an ID is appended (hereinbelow referred to as "SOC(n)") from each local charging/discharging device 100, storage battery SCADA 200 derives the total adjustable capacity $P_{ES}$ (Step S504).

Storage battery SCADA 200 and each local charging/discharging device 100 repeat the operations of Steps S501 to S504, i.e., the operations of deriving $P_{ES}$, at period T.

The method of deriving total adjustable capacity $P_{ES}$ is next described.

Communication unit 201 of storage battery SCADA 200 collects real-time SOC(n) from each local charging/discharging device 100.

Comprehension unit 203 of storage battery SCADA 200 next uses SOC(n) and storage battery distribution factor curves 202a and 202b (see FIGS. 3A and 3B) that are held in database 202 to derive the storage battery distribution factor $\alpha_{discharge}(n)$ when discharging and storage battery distribution factor $\alpha_{charge}(n)$ when charging each power storage device 3.

The storage battery distribution factor curves shown in FIGS. 3A and 3B use curves having the object of maintaining the SOC at basically approximately 50% during both charging and discharging. The storage battery distribution factor curves are not limited to those shown in FIGS. 3A and 3B and can be modified as appropriate.

Comprehension unit 203 next uses the storage battery distribution factor $\alpha_{discharge}(n)$ during discharging, storage battery distribution factor $\alpha_{charge}(n)$ during charging, the rated output P(n) of each of the total of N power storage devices 3 that are held in database 202, and the formula shown in numerical expression 1 or numerical expression 2 to derive $P_{ES,\ discharge}$ and $P_{ES,\ charge}$.

$$P_{ES,discharge} = \sum_{n=1}^{N} \alpha_{discharge}(n) \cdot P(n) \quad \text{[numerical expression 1]}$$

$$P_{ES,charge} = \sum_{n=1}^{N} \alpha_{charge}(n) \cdot P(n) \quad \text{[numerical expression 2]}$$

Comprehension unit 203 next adopts the smaller value of $P_{ES,\ discharge}$ and $P_{ES,\ charge}$ as the total adjustable capacity $P_{ES}$. This is because the frequency of charging and discharging in power storage device 3 must be on the same order to adjust the balance between supply and demand of electric power, and the total adjustable capacity, whereby both charging and discharging are carried out, is therefore necessary. This total adjustable capacity is a value that can be considered capable of continuing charging/discharging at least during period T.

The operation by which storage battery SCADA 200 communicates with power supply command unit 300A to comprehend the charging/discharging gain line (hereinbelow referred to as the "comprehension operation") is next described.

Figure 6:
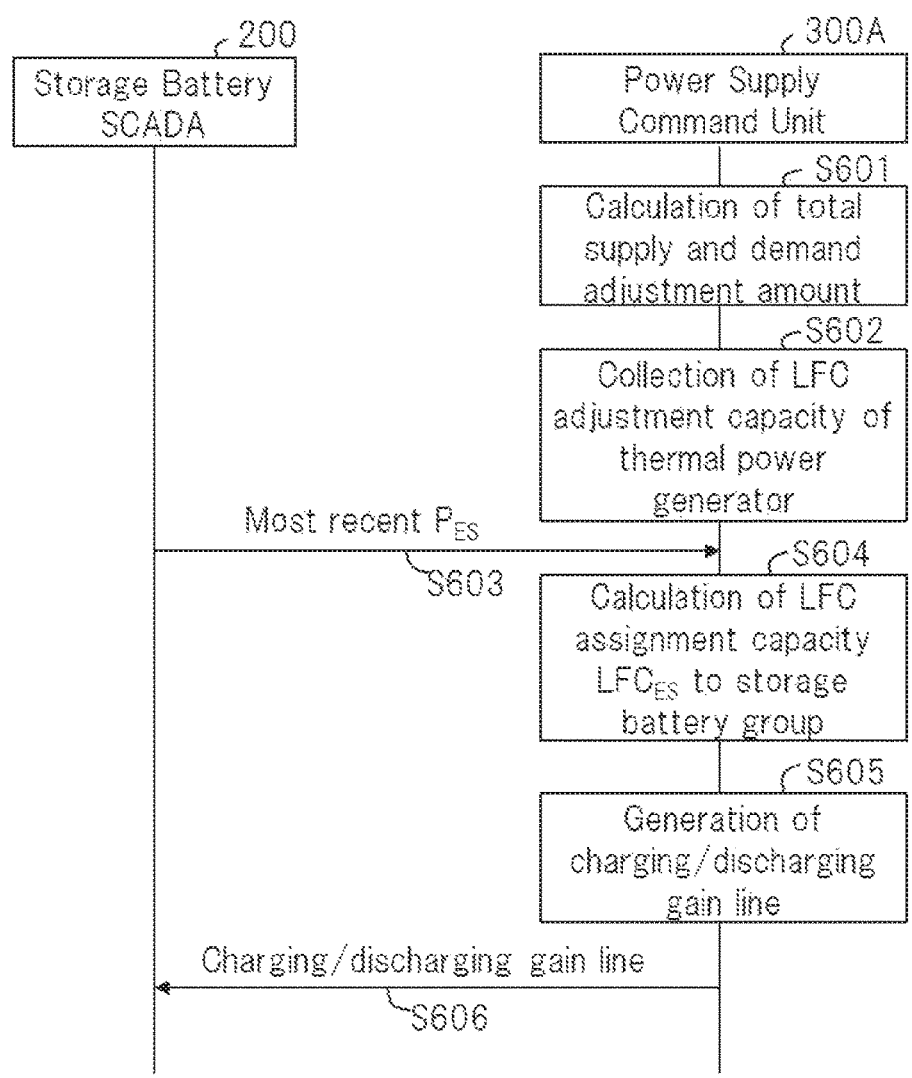
FIG. 6 is a sequence diagram for describing the comprehension operation.

FIG. 6 is a sequence diagram for describing the comprehension operation.

Arithmetic unit 305 of power supply command unit 300A uses the grid frequency that was detected by frequency meter 301 and the power flow in interconnection line 9 that was detected by power flow detection unit 302 to calculate the total supply and demand adjustment amount (adjustment power amount) (Step S601).

Arithmetic unit 305 next collects the LFC adjustment capacity of thermal power generator 4 from the thermal power generator control unit (not shown) (Step S602)

On the other hand, communication unit 201 of storage battery SCADA 200 transmits the most recent total adjustable capacity $P_{ES}$ of the calculated total adjustable capacity $P_{ES}$ to power supply command unit 300A (Step S603).

Communication unit 303 of power supply command unit 300A, having received the most recent total adjustable capacity $P_{ES}$ that was transmitted from communication unit 201 of storage battery SCADA 200, supplies this most recent total adjustable capacity $P_{ES}$ to arithmetic unit 305.

Upon receiving the most recent total adjustable capacity $P_{ES}$, arithmetic unit 305 uses the total supply and demand adjustment amount (adjustment power amount), the LFC adjustment capacity of thermal power generator 4, and the most recent total adjustable capacity $P_{ES}$ to derive the LFC capacity. Arithmetic unit 305 then assigns the capacity obtained by eliminating the sudden fluctuation component of the LFC capacity to thermal power generator 4, and assigns the remaining LFC capacity $LFC_{ES}$ (where $LFC_{ES} \le P_{ES}$) to the storage battery group as LFC assignment capacity $LFC_{ES}$ (Step S604).

In the present exemplary embodiment, arithmetic unit 305 determines the ratio of the assignment of LFC capacity to thermal power generator 4 and the assignment of LFC capacity to the storage battery group (LFC assignment capacity $LFC_{ES}$) by taking into consideration the viewpoint of economy while also considering the accepted EDC (Economic Dispatching Control) portion.

Arithmetic unit 305 next generates a charging/discharging gain line (see FIG. 4) that shows the LFC assignment capacity $LFC_{ES}$ and the maximum value $W_{max}$ of the adjustment power amount that was determined in advance (Step S605).

The charging/discharging gain line shows the amount of charging/discharging of the storage battery group with respect to the adjustment power amount. The charging/discharging gain line changes, becoming line 400A and then becoming line 400B, according to the size of the LFC assignment capacity $LFC_{ES}$ ($LFC_{ES}$ and $LFC_{ES}'$) within the range of "LFC assignment capacity $LFC_{ES} \le$ total adjustable capacity $P_{ES}$."

Arithmetic unit 305 next transmits the charging/discharging gain line from communication unit 303 to storage battery SCADA 200 (Step S606).

Storage battery SCADA 200 and power supply command unit 300A repeat the operations of Steps S601-S606, i.e., the comprehension operation, at period $T_m$ (for example, $T_m$=four minutes.).

Comprehension unit 203 of storage battery SCADA 200 receives the charging/discharging gain line by way of communication unit 201 and holds only the most recent charging/discharging gain line of the charging/discharging gain lines.

Operations are next described by which storage battery SCADA 200 generates allotment information and transmits the allotment information to each local charging/discharging device 100, and each local charging/discharging device 100, based on the allotment information, derives a local charging/discharging gain line to control the charging/discharging of power storage devices 3 (hereinbelow referred to as the "allotment operation").

Figure 7:
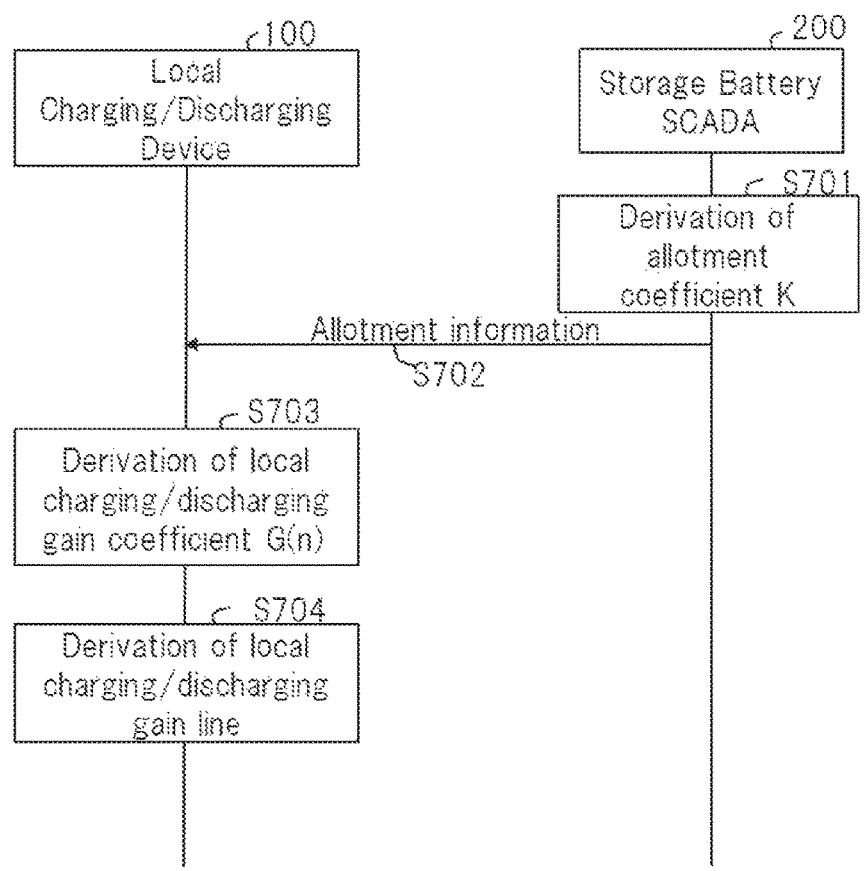
FIG. 7 is a sequence diagram for describing the allotment operation.

FIG. 7 is a sequence diagram for describing the allotment operation. In FIG. 7, the number of local charging/discharging devices 100 is here set to one in the interest in order to simplify the explanation.

Arithmetic unit 204 of storage battery SCADA 200 uses the LFC assignment capacity $LFC_{ES}$ that was indicated by the most recent charging/discharging gain line that is held in comprehension unit 203, the most recent total adjustable capacity $P_{ES}$ held by comprehension unit 203, and the formula shown in Numerical Expression 3 to derive allotment coefficient K (Step S701).

$$K = \frac{LFC_{ES}}{P_{ES}} \qquad \text{[Numerical Expression 3]}$$

Arithmetic unit 204 next transmits allotment information indicating the allotment coefficient K and the maximum value $W_{max}$ of the adjustment power amount indicated in the most recent charging/discharging gain line from communication unit 201 to each local charging/discharging device 100 (Step S702). Although Numerical Expression 3 is used as the allotment coefficient K in the present exemplary embodiment, flexible operations are possible whereby, when under pressure, individual batteries may be provided with values of the allotment coefficient K that force the batteries to supply output close to the limit.

In the present exemplary embodiment, the following processes are executed in Step S702.

Arithmetic unit 204 specifies as the storage battery distribution factor $\alpha(n)$ for each power storage device 3 the smaller of the storage battery distribution factor $\alpha_{discharge}(n)$ for times of discharging and storage battery distribution factor $\alpha_{charge}(n)$ for times of charging that were most recently derived by comprehension unit 203.

Arithmetic unit 204 next generates operation-relevant information for each power storage device 3 that shows the storage battery distribution factor $\alpha(n)$ and the rated output $P(n)$ that is held in database 202.

Arithmetic unit 204 then appends the allotment information to each item of operation-relevant information and transmits from communication unit 201 the allotment information to which the operation-relevant information is appended to local charging/discharging devices 100 that correspond to power storage devices 3 that correspond to the operation-relevant information.

In each local charging/discharging device 100, arithmetic unit 104 receives the allotment information with the appended operation-relevant information by way of communication unit 102.

Arithmetic unit 104 uses the allotment information with the appended operation-relevant information and the numerical expression shown in Numerical Expression 4 to derive the local charging/discharging gain coefficient $G(n)$ (Step S703).

$$G(n) = \frac{K \cdot \alpha(n) \cdot P(n)}{W_{max}} \qquad \text{[Numerical Expression 4]}$$

The values in numerical expression 4 are shown in the allotment information with the appended operation-relevant information.

Figure 8:
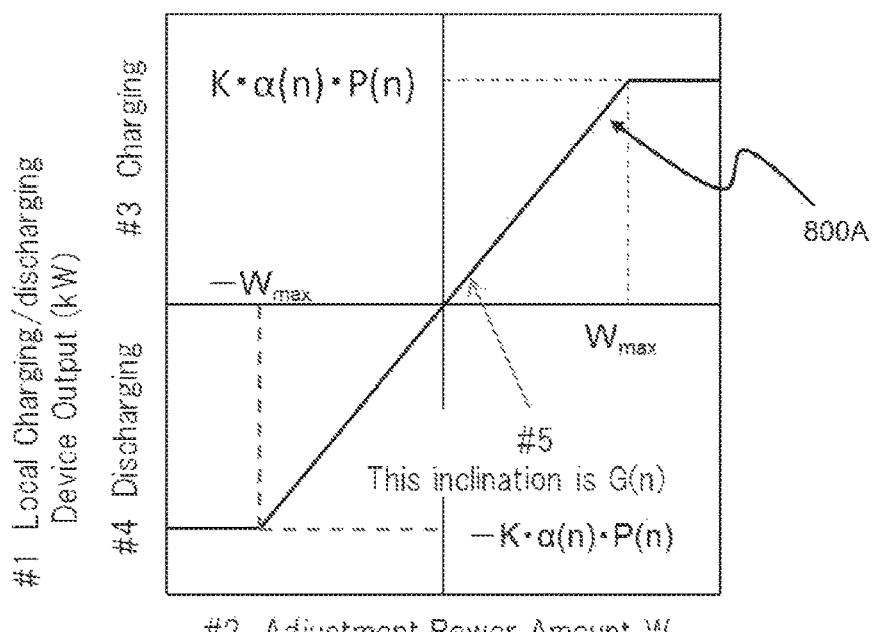
FIG. 8 shows a local charging/discharging gain line.

Arithmetic unit 104 next uses the local charging/discharging gain coefficient $G(n)$ and the maximum value $W_{max}$ of the adjustment power amount that is indicated in the allotment information with the appended operation-relevant information to derive the local charging/discharging gain line 800A shown in FIG. 8 (Step S704).

Local charging/discharging gain line 800A shown in FIG. 8 is a straight line that passes through the origin 0 with an inclination that is the local charging/discharging gain coefficient $G(n)$ in the range in which adjustment power amount W is $-W_{max} \le W \le W_{max}$, takes the fixed value of "$-K \cdot \alpha(n) \cdot P(n)$" (the minus sign indicating discharging) in the range in which the adjustment power amount W is $W < -W_{max}$, and takes the fixed value of "$K \cdot \alpha(n) \cdot P(n)$" in the range in which the adjustment power amount W is $W_{max} < W$.

Storage battery SCADA 200 and each local charging/discharging device 100 repeat the Steps S701-S704 at period T (where T is, for example, one minute).

Storage battery SCADA 200 may repeat Step S701 at period T and repeat Step S702 at a period that is shorter than period T. In this case, the allotment information with the appended operation-relevant information that was transmitted in Step S702 is updated at period T.

When Step S702 is repeated at a period that is shorter than period T, local charging/discharging device 100, even when unable to receive the allotment information with the appended operation-relevant information at a particular timing due to communication difficulties, is subsequently able to receive the allotment information with appended operation-relevant information that could not be received.

In each local charging/discharging device 100, arithmetic unit 104 proceeds to receive the allotment information with appended operation-relevant information by way of communication unit 102 and holds, of the allotment information with appended operation-relevant information, only the most recent allotment information with appended operation-relevant information.

The operations (hereinbelow referred to as "charging/discharging control operations") by which local charging/discharging device 100 controls the charging/discharging of power storage device 3 based on the allotment information with appended operation-relevant information and adjustment power amount W is next described.

Figure 9:
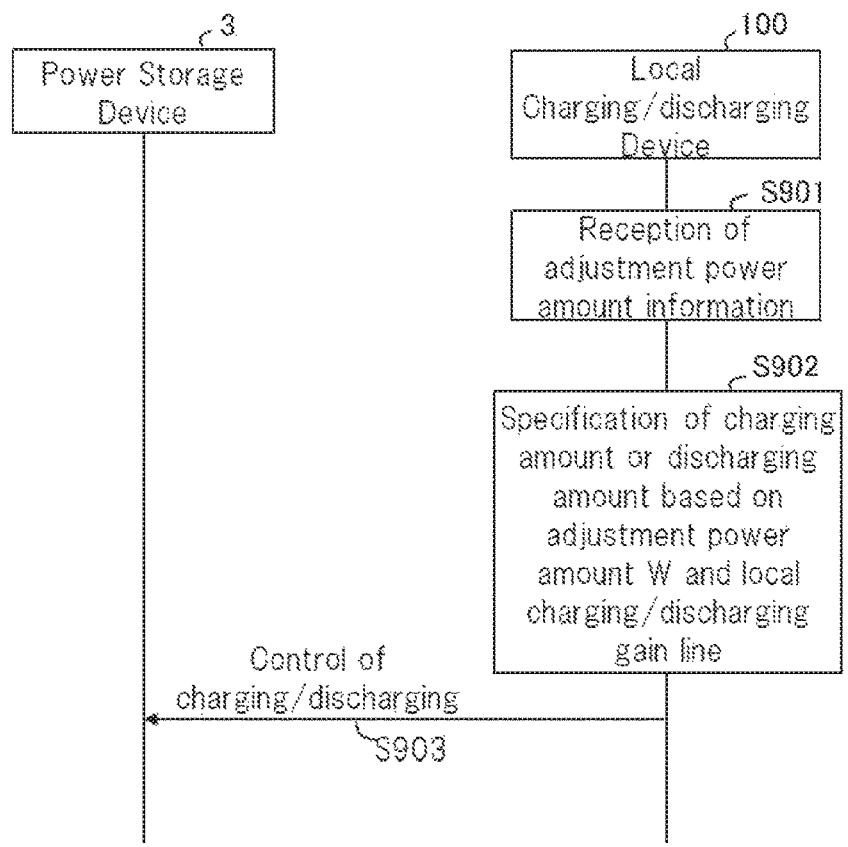
FIG. 9 is a sequence diagram for describing the charging/discharging control operation.

FIG. 9 is a sequence diagram for describing the charging/discharging control operations.

In power supply command unit 300A, arithmetic unit 305 generates adjustment power amount information that shows the adjustment power amount (total supply and demand adjustment amount) at period $T_1$ (for example, a period of four seconds) and broadcast-transmits this adjustment power amount information from communication unit 304 at period $T_1$.

In local charging/discharging device 100, arithmetic unit 104 receives the adjustment power amount information at period $T_1$ (Step S901).

Arithmetic unit 104 next calculates the charging amount or discharging amount of power storage device 3 in accordance with the local charging/discharging gain line and the adjustment power amount W shown by the adjustment power amount information (Step S902).

In the present exemplary embodiment, when the absolute value of the adjustment power amount W is equal to or less than the maximum value $W_{max}$ of the adjustment power amount, arithmetic unit 104 in Step S902 calculates, as the adjustment power amount, the absolute value of the value ($G(n) \cdot W$) obtained by multiplying the local charging/discharging gain coefficient $G(n)$ by the adjustment power amount W. On the other hand, when the absolute value of the adjustment power amount W is greater than the maximum value $W_{max}$ of the adjustment power amount, arithmetic unit 104 calculates the value ($K \cdot \alpha(n) \cdot P(n)$) obtained by multiplying allotment coefficient K, storage battery distribution factor $\alpha(n)$, and rated output $P(n)$ as the adjustment power amount. In this example, the inclination of $G(n)$ is identical on the charging side and the discharging side in FIG. 8, i.e., a case of point symmetry is exhibited, but in actuality, a case that is not point symmetry can also be assumed, and in such a case, $G(n)$ is determined by the same approach.

Arithmetic unit 104 next causes power storage device 3 to execute charging based on the adjustment power amount when adjustment power amount W is a positive value and causes power storage device 3 to execute discharging based on the adjustment power amount when adjustment power amount W is a negative value (Step S903).

Each local charging/discharging device 100 repeats Steps S901-S903 at period $T_1$ (for example, $T_1$=four seconds). As a result, charging/discharging takes place each time in accordance with $G(n) \cdot W$ regardless of change of the value of adjustment power amount W.

In addition, because a typical LFC capacity assumes values of both the charging direction and the discharging direction, the SOC of power storage device (battery) 3 preferably is not biased toward 0 or 1. When bias occurs, the electric power that can be charged or discharged decreases as in the examples of the storage battery distribution factor curves shown in FIG. 3, and the total adjustable capacity $P_{ES}$ becomes small.

Local charging/discharging device 100 may control the charging/discharging of power storage device 3 not only according to the charging/discharging amount that is calculated from information that shows the state of supply and demand of the entire power grid 1 that is measured in a short period (in the present exemplary embodiment, adjustment power amount W) and allotment information that is distributed at a long period from storage battery SCADA 200, but also according to the charging/discharging amount (SOC correction offset) for correcting the SOC.

Regarding the method of determining the value of the SOC correction offset (the SOC correction offset value), there is one method by which arithmetic unit 104 receives information (information relevant to SOC correction offset) that is necessary for determining the SOC correction offset value from storage battery SCADA 200 by way of communication unit 102, and arithmetic unit 104 determines the SOC correction offset value in accordance with the information relevant to the SOC correction offset. At this time, storage battery SCADA 200 may transmit the information relevant to the SOC correction offset at the same time as transmitting the allotment information. The information relevant to the SOC correction offset is one example of the correction information.

As an example of the information relevant to the SOC correction offset, information relevant to the SOC correction offset is offered that shows the SOC correction offset value itself, and storage battery SCADA 200 distributes this information relevant to the SOC correction offset to each of local charging/discharging devices 100.

In this case, arithmetic unit 204 of storage battery SCADA 200 refers to the SOC that was received from each local charging/discharging device 100 and distributes the information relevant to the SOC correction offset that shows the SOC correction offset value for charging, from among power storage devices 3, power storage devices 3 whose SOC is biased toward 0. In addition, arithmetic unit 204 of storage battery SCADA 200 distributes information relevant to the SOC correction offset that shows a SOC correction offset value for discharging, from among power storage devices 3, power storage devices 3 whose the SOC is biased toward 1.

In the following explanation, an example is described in which a positive-value SOC correction offset value is used as the SOC correction offset value for charging and a negative-value SOC correction offset value is used as the SOC correction offset value for discharging.

Power storage device 3 whose SOC is biased toward 0 is, for example, a power storage device whose SOC value is equal to or below a first threshold value that is greater than 0 but less than 0.5. Power storage device 3 whose SOC is biased toward 1 is, for example, a power storage device whose SOC value is equal to or greater than a second threshold value that is greater than 0.5 but less than 1.

Arithmetic unit 104 of local charging/discharging device 100 adds the SOC correction offset value to the adjustment power amount to calculate a corrected power amount when the adjustment power amount W is a positive value.

Alternatively, arithmetic unit 104 of local charging/discharging device 100 adds the SOC correction offset value to the result of multiplying the adjustment power amount by −1 to calculate the corrected power amount when the adjustment power amount W is a negative value.

Arithmetic unit 104 causes power storage device 3 to execute a charging operation using the corrected power amount when the corrected power amount is a positive value, causes power storage device 3 to execute a discharging operation using the corrected power amount when the corrected power amount is a negative value, and does not cause charging or discharging of power storage device 3 when the corrected power amount is 0.

Arithmetic unit 204 may determine each item of information relevant to the SOC correction offset such that the sum total of the SOC correction offset values (hereinbelow referred to as the "offset sum total") of all power storage devices 3 at the same time becomes 0. In this case, the SOC correction offset has no effect on capacity $LFC_{ES}$.

Arithmetic unit 204 may otherwise also determine each item of information relevant to the SOC correction offset such that the speed of change of the offset sum total (the speed of change of the offset sum total that accompanies the passage of time) is equal to or less than a speed threshold value (the speed threshold value being, for example, total adjustable capacity $P_{ES}$/30 minutes) without making the offset sum total 0. The upper limit of the response speed of a power stabilizing operation (LFC operation) that is carried out by an external power stabilizing device (for example, thermal power generator 4) that is connected to power grid 1 is used as the speed threshold value.

For example, the slow change in electric power supply and demand that is a long period greater than thirty minutes can be assigned by EDC as a change in power supply and demand that is absorbed by the power stabilizing operation of thermal power generator 4. As a result, the change in power supply and demand that is due to change in the offset sum total is highly likely to be absorbed by an external power stabilizing device. A change in power supply and demand that is due to the SOC correction offset value does not affect the relatively high-speed change of supply and demand that accompanies charging/discharging of power storage devices 3.

In addition, arithmetic unit 104 may control the charging/discharging of power storage device 3 by referring to the SOC by way of detection unit 101 and then, if the SOC has become the target value (for example, the reference SOC 0.5), autonomously invalidating the SOC correction offset.

When information relevant to the SOC correction offset is used that indicates the SOC correction offset value itself as described above, arithmetic unit 104 need not execute the process of calculating the SOC correction offset value, and an increase in the processing load of arithmetic unit 104 can thus be reduced.

As another example of the information relevant to the SOC correction offset, there is a method by which storage battery SCADA 200 distributes to each local charging/discharging device 100 parameters that are necessary when each local charging/discharging device 100 is determining the SOC correction offset value.

For example, the $n^{th}$ local charging/discharging device 100 uses the following Numerical Expression 5 to determine SOC correction offset value $P_{offset, n}(t)$.

$$P_{offset,n}(t) = (SOC_{target,n} - SOCn(t))/Tn \qquad \text{[Numerical Expression 5]}$$

Here, $SOC_{target, n}$ is the SOC value that is the target (the reference state of power storage device 3), SOCn(t) is the SOC value of power storage device 3 of the $n^{th}$ local charging/discharging device 100 at time t, Tn is a time constant (speed-relevant information).

Arithmetic unit 104 of local charging/discharging device 100 acquires the SOC value of power storage device 3 by way of detection unit 101, acquires $SOC_{target, n}$ and Tn from storage battery SCADA 200 by way of communication unit 102, and calculates SOC correction offset value $P_{offset, n}(t)$ by Numerical Expression 5.

In this case, SOC correction offset value $P_{offset, n}(t)$ can be changed as appropriate according to the actual change of the SOC. In addition, if, for example, a communication difficulty should occur and $SOC_{target, n}$ and Tn are not newly received, the already received $SOC_{target, n}$ and Tn can be used to continue to calculate SOC correction offset value $P_{offset, n}(t)$.

As an example of the method by which arithmetic unit 204 of storage battery SCADA 200 determines the $SOC_{target, n}$ of each power storage device, there is a method of determining, according to the bias of the charging direction and discharging direction of the LFC capacity. In most cases, $SOC_{target}$ is 0.5. In addition, Tn shows the speed of correcting the SOC, and as an example, arithmetic unit 204 sets Tn such that changes of the sum total of the SOC correction offset values of each power storage device 3 are long-cycle changes of more than 30 minutes so that changes between the power supply and demand that are due to the SOC correction offset value are absorbed by EDC.

$SOC_{target, n}$ and Tn are registered in arithmetic unit 104 of each local charging/discharging device 100 in advance, and each arithmetic unit 104 may use the registered $SOC_{target, n}$ and Tn to calculate the SOC correction offset value $P_{offset, n}(t)$.

In this case as well, arithmetic unit 104 of local charging/discharging device 100 calculates the corrected power amount by adding the SOC correction offset value to the adjustment power amount when the adjustment power amount W is a positive value. When the adjustment power amount W is a negative value, arithmetic unit 104 calculates the corrected power amount by adding the SOC correction offset value to the result of multiplying the adjustment power amount by −1.

When the corrected power amount is a positive value, arithmetic unit 104 causes power storage device 3 to execute the charging operation for the corrected power amount. When the corrected power amount is a negative value, arithmetic unit 104 causes power storage device 3 to execute the discharging operation for the corrected power amount. When the corrected power amount is 0, arithmetic unit 104 executes neither charging nor discharging of power storage device 3.

Another example of controlling the charging amount or discharging amount of power storage device 3 according to the SOC of power storage device 3 is next described.

Figure 10:
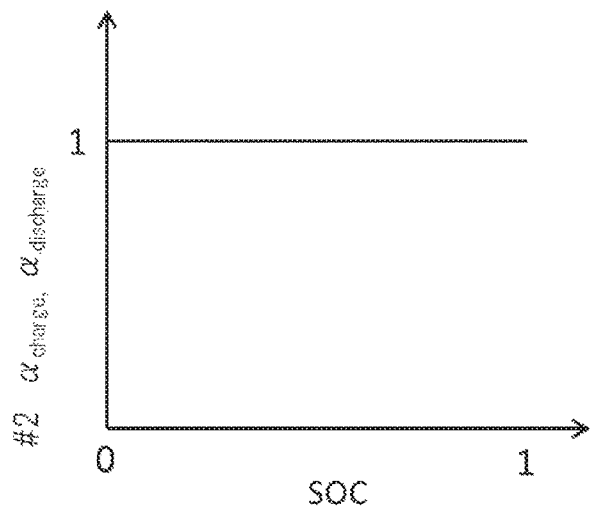
FIG. 10 shows the storage battery distribution factor curve in which the storage battery distribution factor is maintained at 1 regardless of the value of SOC.

In the interest of simplifying the explanation, a case will be described hereinbelow in which there are two power storage devices 3 having equal rated output. The rated output of the two power storage devices 3 is indicated by P(1) and P(2) (however, P(1)=P(2)). In addition, the storage battery distribution factor curve is assumed to keep the storage battery distribution factor at 1 regardless of the value of SOC, as shown in FIG. 10. In addition, arithmetic unit 204 of storage battery SCADA 200 specifies the local charging/discharging gain line of each local charging/discharging device 100 when the allotment coefficient K is 1 (hereinbelow referred to as the "reference local charging/discharging gain line"), i.e., the local charging/discharging gain line of each local charging/discharging device 100 when the allotment coefficient K is not taken into consideration.

Figure 11:
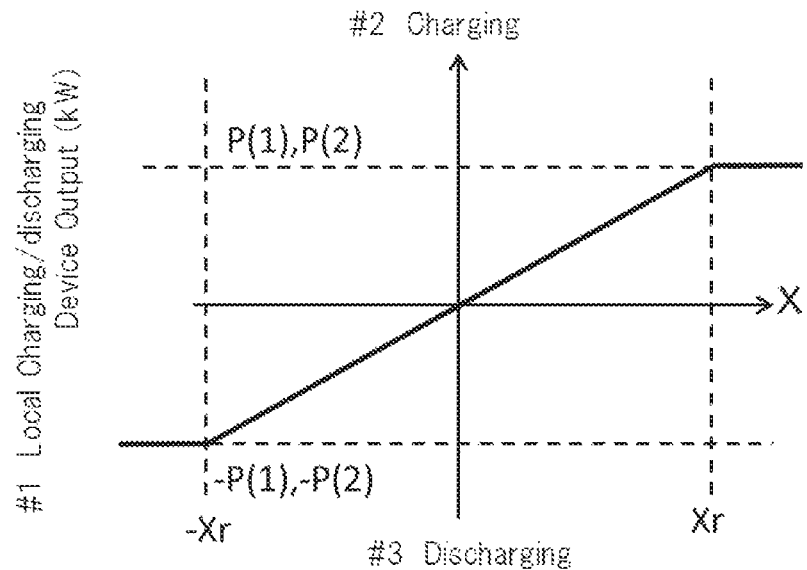
FIG. 11 shows the reference local charging/discharging gain line.

FIG. 11 shows the reference local charging/discharging gain line before the SOC correction offset is applied to each power storage device 3. In FIG. 11, the vertical axis shows the local charging/discharging device output that is the charging/discharging amount of each power storage device 3, and the horizontal axis is value X that represents the state of the total supply and demand balance of power grid 1. The adjustment power amount (total supply and demand adjustment amount) (W) is used as an example of X in the present exemplary embodiment.

In the reference local charging/discharging gain line shown in FIG. 11, the local charging/discharging device output is proportional to X at the inclination of the local charging/discharging gain coefficient G(n) in the region where X is equal to or greater than −Xr and equal to or less than Xr. In addition, power storage device 3 is unable to supply output equal to or greater than the rated output P(n), and the local charging/discharging device output is therefore the rated output in the regions outside the region in which X is equal to or greater than −Xr and equal to or less than Xr. Xr is the value of X when the local charging/discharging device output becomes the rated output P(n). Although the rated output of charging and the rated output of discharging are the same values with inverted minus and plus signs in this case, this is not necessarily always the case.

Figure 12:
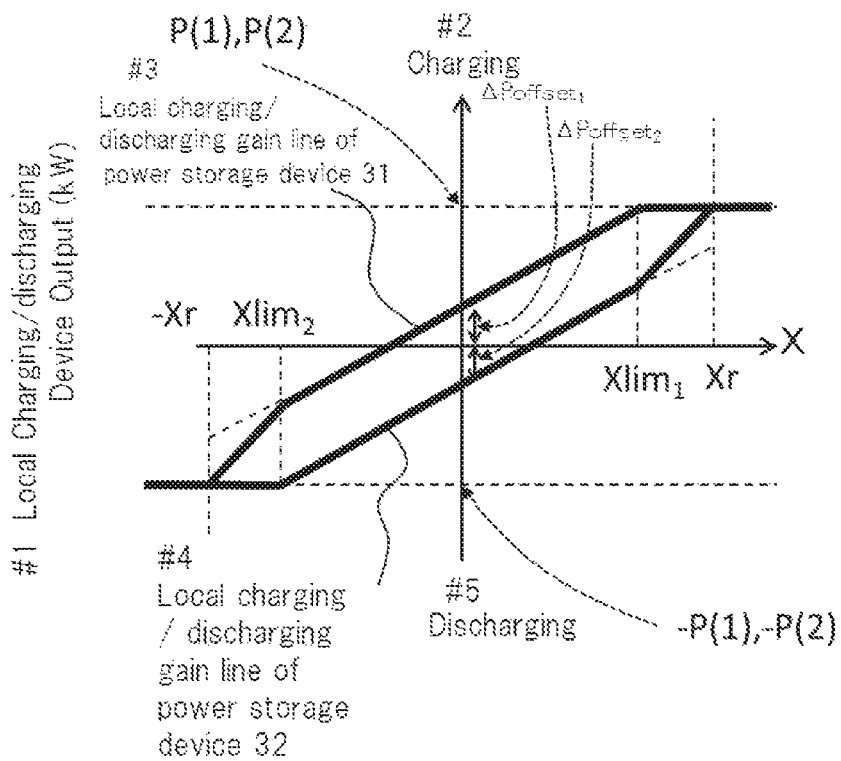
FIG. 12 shows an example of a corrected reference local charging/discharging gain line.

Here, the SOC of two power storage devices 3 are assumed to differ. Arithmetic unit 204 of storage battery SCADA 200, after acquiring the SOC values of each power storage device 3, calculates the SOC correction offset amount of each power storage device 3. The method of calculating the SOC correction offset amount will be described later. Arithmetic unit 204 corrects the reference local charging/discharging gain line such that the sum total of the charging/discharging amount of each power storage device 3 that further takes into consideration the SOC correction offset amount is the target functional form in the region of −Xr≤X≤Xr (for example, the sum total of the charging/discharging amount is linear with respect to X in the region of −Xr≤X≤Xr). Arithmetic unit 204 then transmits the corrected reference local charging/discharging gain line to each local charging/discharging device 100. FIG. 12 shows an example of the corrected reference local charging/discharging gain line.

Figure 13:
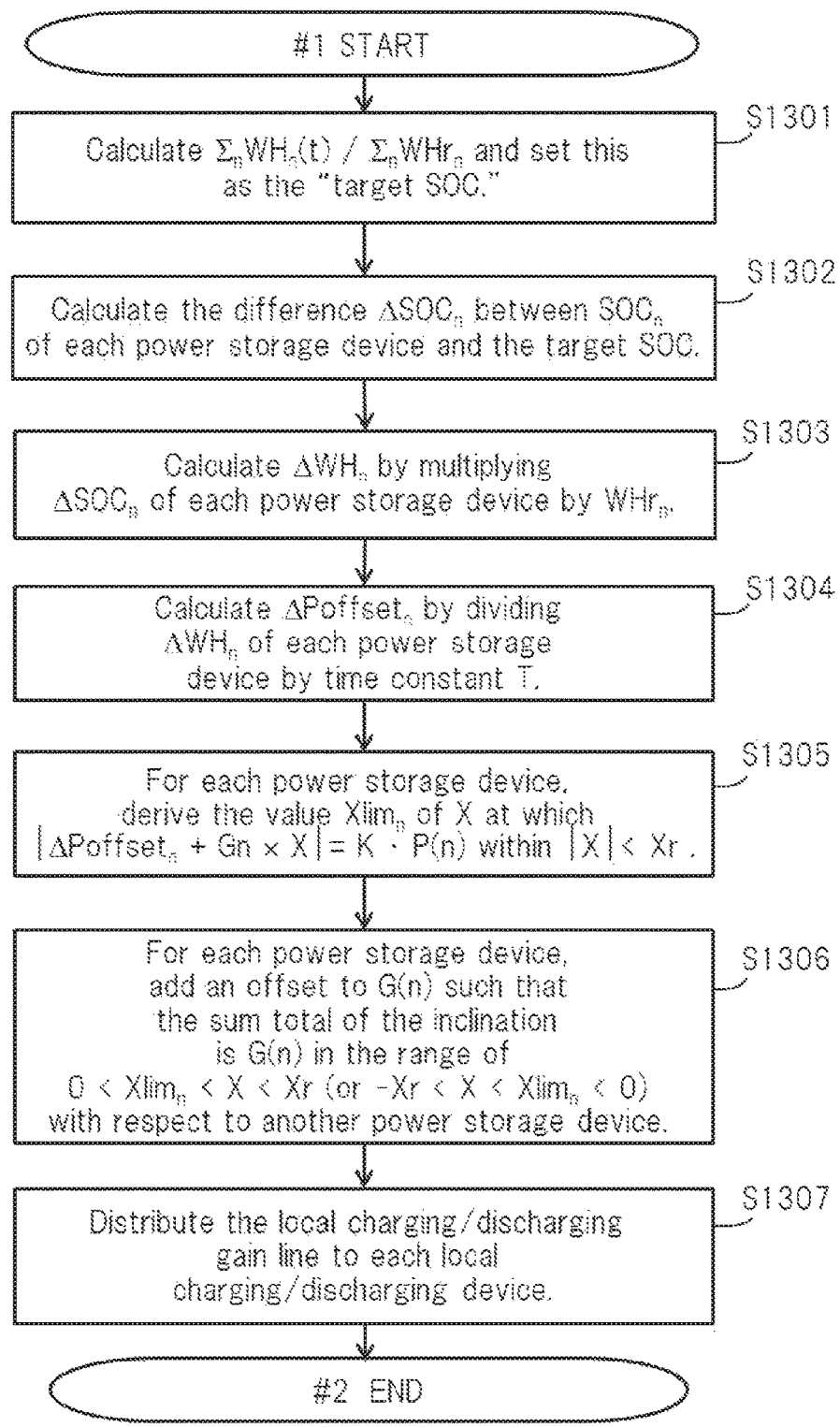
FIG. 13 is a flow chart for describing an example of the method of correcting the reference local charging/discharging gain line.

An example of the method by which arithmetic unit 204 of storage battery SCADA 200 corrects the reference local charging/discharging gain line is next described with reference to FIG. 13.

Arithmetic unit 204 first uses the SOC of each power storage device 3 that was collected to calculate a target SOC (Step S1301). As an example of one method of calculating the target SOC, arithmetic unit 204 calculates the target SOC as $\Sigma_n WH_n(t)/\Sigma_n WHr_n$. $WH_n(t)$ is the charging amount (Wh) of power storage device $3n$ at time t, and $WHr_n$ is the maximum charging amount (Wh) that is the rated output. $\Sigma_n$ means:

$$\Sigma_n = \sum_{n=1}^{N}$$ [Numerical Expression 6]

Arithmetic unit 204 next finds the difference ΔSOCn between the SOC value of each power storage device 3 and the target SOC (Step S1302).

Arithmetic unit 204 then calculates $\Delta WHn = WHr_n \times \Delta SOCn$ for each power storage device 3 (Step S1303) to find the amount of power ΔWHn (Wh) necessary to attain the target SOC.

Arithmetic unit 204 next divides ΔWHn by the time constant T (for example, five minutes) that was set in advance for each power storage device 3 and calculates the offset $\Delta Poffset_n$(W) (Step S1304). The time constant is not limited to five minutes and can be modified as appropriate.

The offset $\Delta Poffset_n$ is an offset amount by which the target SOC can be attained in time interval T when the future X is assumed to remain fixed at 0, and when the target SOC is set by the method shown in Step S1301, $\Sigma_n \Delta Poffset_n = 0$. In addition, time constant T prescribes the speed of correcting the SOC. For example, in order that the change between the electric power supply and demand due to the offset $\Delta Poffset_n$ be allotted to a power stabilizing device such as thermal power generator 4 by EDC and that this change be absorbed by the power-stabilizing operation of a power stabilizing device such as thermal power generator 4, arithmetic unit 204 sets T such that the change of the sum total of offset $\Delta Poffset_n$ of each power storage device 3 becomes a change having a long cycle greater than 30 minutes.

Arithmetic unit 204 first adds this value (offset $\Delta Poffset_n$) to the reference local charging/discharging gain line shown in FIG. 11.

Arithmetic unit 204 next adds a further correction in Steps S1305 and S1306 to the reference local charging/discharging gain line to which the offset $\Delta Poffset_n$ was added such that the sum total of the charging/discharging amounts of all power storage devices 3 at the same time becomes linear with respect to X in the region where −Xr≤X≤Xr despite the addition of offset $\Delta Poffset_n$ and the charging or discharging of each power storage device 3.

In Step S1305, arithmetic unit 204 finds for each power storage device 3 the value of X $Xlim_n$ at which the reference local charging/discharging gain line that follows the addition of $\Delta Poffset_n$ becomes the rated output within |X|≤Xr. At this time, in the region where $0<Xlim_n<Xr$ (or, $-Xr<X<Xlim_n<0$), the output of a power storage device is saturated with the rated output, and the linearity of the output of the power storage device with respect to X is lost.

In Step S1306, arithmetic unit 204 adds the offset to the inclination of the reference local charging/discharging gain line of another power storage device to place the sum total of the charging/discharging amount of each power storage device 3 in a linear relation with respect to X in the region −Xr<X<Xr. Even in a state in which $\Delta Poffset_n$ is not added, the total charging/discharging amount of each power storage device 3 in the region where −Xr<X<Xr was in a linear relation with respect to X, and as a result, placing the total charging/discharging amount of each power storage device 3 in a linear relation with respect to X in the region where −Xr<X<Xr means placing the sum total of the offset of each power storage device 3 in a linear relation with respect to X in the region where −Xr<X<Xr.

For example, in the example shown in FIG. 12, the output of power storage device 31 is saturated by the rated output in the region in which $Xlim_1 < X < Xr$. As a result, arithmetic unit 204 adds the offset to the inclination of the reference local charging/discharging gain line of power storage device 32 in the region where $Xlim_1 < X < Xr$, whereby the total charging/discharging amount of each power storage device 3 (power storage device 31 and power storage device 32) is placed in a linear relation with respect to X in the region where $Xlim_1 < X < Xr$. In addition, in the example shown in FIG. 12, the output of power storage device 32 is saturated by the rated output in the region where $-Xr < X < Xlim_2$. As a result, arithmetic unit 204 adds the offset to the inclination of the reference local charging/discharging gain line of power storage device 31 in the region $-Xr < X < Xlim_2$, whereby the total charging/discharging amount of each power storage device 3 (power storage device 31 and power storage device 32) is placed in a linear relation with respect to X in the region where $-Xr < X < Xlim_2$.

Arithmetic unit 204 next transmits the reference local charging/discharging gain line that was corrected to each local charging/discharging device 100 (Step S1307). The timing of this transmission may be synchronized with the timing at which the allotment information is transmitted.

The corrected reference local charging/discharging gain line is one example of the operation information and indicates the relation between X and the value obtained by adding the local charging/discharging device output when an offset is not applied to the offset value (information that indicates the operation content of a power storage device).

In each local charging/discharging device 100, arithmetic unit 104 uses the corrected reference local charging/discharging gain line to specify the power amount that corresponds to adjustment power amount W and the operation (charging operation or discharging operation) of power storage device 3 and causes power storage device 3 to execute the operation that was specified for the power amount of the multiplication result obtained by multiplying the power amount that corresponds to adjustment power amount W with the allotment coefficient K.

In this example, despite the execution of the operation of correcting SOC that controls the amount of charging or the amount of discharging of power storage device 3 that accords with the SOC of power storage device 3, the total charging/discharging amount of all power storage devices 3 can be placed in a linear relation with respect to X in the region in which $-Xr < X < Xr$, similar to a case in which the SOC correction operation is not executed. As a result, the total charging/discharging amount of power storage devices 3 can be highly accurately controlled based on X.

Yet another example of controlling the charging amount or discharging amount of power storage device 3 in accordance with the SOC of power storage device 3 is next described.

Figure 14:
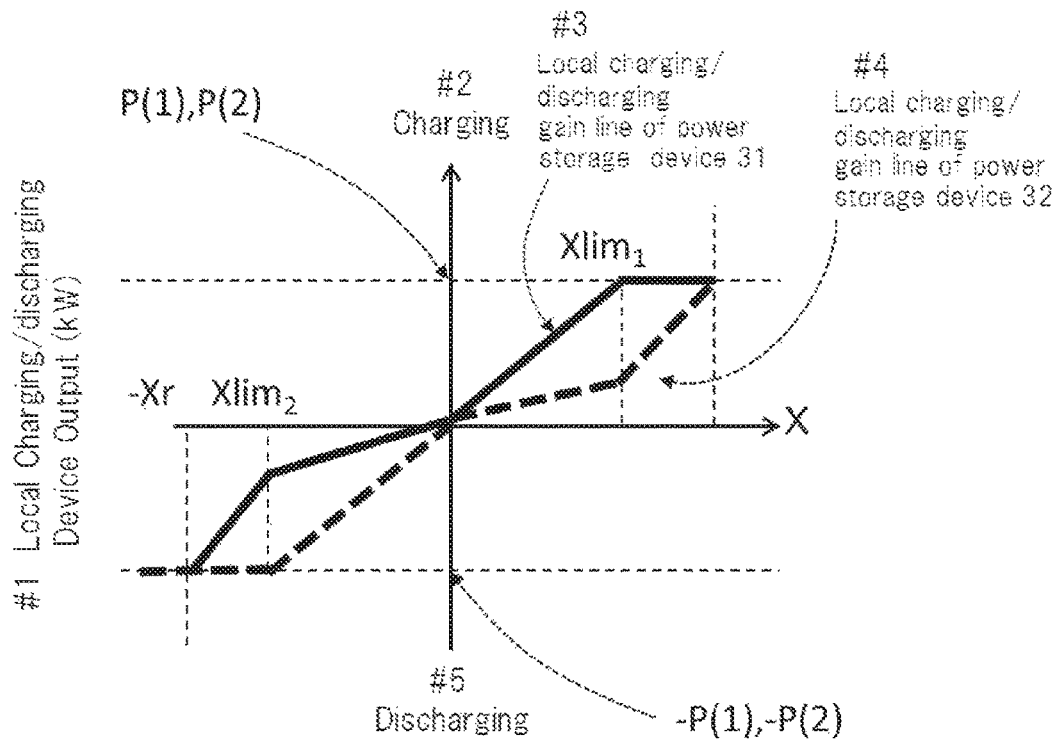
FIG. 14 is a view for describing another example of giving an offset.

FIG. 14 is a view for describing a method of giving an offset that differs from the previously described example. In this example, the offset is given to G(n).

When the SOC of power storage device 3 is higher than the target SOC, arithmetic unit 204 makes the charging-side G(n) smaller, and moreover, the discharging-side G(n) is made larger on the reference local charging/discharging gain line, and when the SOC of power storage device 3 is lower than the target SOC, arithmetic unit 204 makes the charging-side G(n) larger, and moreover, the discharging-side G(n) is made smaller.

Similar to the example shown in FIG. 12, in order to prevent the loss of linearity of the total charging/discharging amount with respect to X in the method of giving an offset shown in FIG. 14, when the output of a particular power storage device reaches the rated output at $|X| < Xr$, the output of another power storage device covers that portion of G(n).

In the example shown in FIG. 14, the output of power storage device 31 is saturated by the rated output in the region $Xlim_1 < X < Xr$. As a result, arithmetic unit 204 adds an offset to the inclination of the reference local charging/discharging gain line of power storage device 32 in the region where $Xlim_1 < X < Xr$ and thus places the total charging/discharging amount of each power storage device 3 (power storage device 31 and power storage device 32) in a linear relation with respect to X in the region where $Xlim_1 < X < Xr$. In the example shown in FIG. 14, the output of power storage device 32 is saturated by the rated output in the region where $-Xr < X < Xlim_2$. Arithmetic unit 204 therefore adds the offset to the inclination of the reference local charging/discharging gain line of power storage device 31 to place the total charging/discharging amount of each power storage device 3 (power storage device 31 and power storage device 32) in a linear relation with respect to X in the region where $-Xr < X < Xlim_2$.

In this example as well, despite the execution of the SOC correction operation that controls the charging amount or discharging amount of power storage device 3 in accordance with the SOC of power storage device 3, the total charging/discharging amount of each power storage device 3 can be placed in a linear relation with respect to X in the region where $-Xr < X < Xr$, similar to a case in which the SOC correction operation is not executed. As a result, the total amount of charging/discharging of each power storage device 3 can be controlled with high accuracy based on X. In this example, moreover, charging/discharging that uses power storage device 3 is not executed when X=0, whereby increase of the power consumed for causing operation of power storage device 3 can be limited.

Despite the occurrence of a communication problem midway for 20 seconds between power supply command unit 300A and storage battery SCADA 200 while N=1000 power, storage devices are being controlled in power control system 1000 that has been described hereinabove, and because this is a breakdown during a four-minute interval of the transmission of the charging/discharging gain line, no change occurred in the control state before and after the communication problem and stable control and limitation of fluctuation of the grid frequency could be realized.

From the standpoint of the overall optimization of thermal power generators and power storage devices on the grid side, the burden of allotment control that takes into consideration economy and the response speed of thermal power generators can be carried by a decentralized storage battery group.

The effect of the present exemplary embodiment is next described.

In local charging/discharging device 100, arithmetic unit 104 controls the operation of power storage device 3 based on the allotment information provided from storage battery SCADA 200 and the adjustment power amount that was comprehended by comprehension unit 103. As a result, the operation of power storage device 3 can be adjusted in accordance with not only the allotment information but also the actual changes of the state of the balance between power supply and demand in the power grid.

In addition, according to the present exemplary embodiment, customer apparatuses can obtain the total supply and demand adjustment amount even when the total supply and demand adjustment amount cannot be estimated based on a value that is measured at the linking point by the customer apparatuses (for example, the amount of deviation of the grid frequency from the reference frequency).

For example, there are cases in which a power company requests calculation of the total supply and demand adjustment amount using, in addition to the amount of deviation of the grid frequency from the reference frequency, a value that cannot be measured by a customer apparatus (for example, the amount of power that flows by way of interconnection line 9 from power grid 1 to another power grid 8).

To explain in detail, in a state in which a plurality of power grids are linked, the grid frequencies of each power grid are shared. As a result, when the grid frequency changes due to deterioration of the balance between supply and demand (mismatching of the amount of demand and the generated amount) in one power grid 1, the grid frequency changes in the other power grid 8 as well.

In a case in which power grid 1 and power grid 8 are operated by different power companies, when the balance between supply and demand in one power grid deteriorates, the balance between supply and demand must typically be recovered (the discordance between the amount of demand and the amount of generation must be solved) by adjustment of supply and demand of equipment within that power grid.

However, when each customer apparatus uses the amount of deviation of the grid frequency from the reference frequency to estimate the total supply and demand adjustment amount, a customer apparatus that is linked to another power grid 8 that maintains a balance between supply and demand (the amount of demand matches the amount of generation) mistakenly perceives that supply and demand adjustment is necessary based on the change in grid frequency.

As a result, the method of calculating the total supply and demand adjustment amount from the amount of deviation of the grid frequency from the reference frequency is preferably used in a state in which power grid 1 is like a solitary island, isolated from and not linked to another power grid 8.

One method of supply and demand adjustment when power grid 1 is linked to another power grid 8 is a method known as Tie line Bias Control (TBC).

In this method, the sum total of the total supply and demand adjustment amounts of power grid 1 and power grid 8 is calculated from the grid frequency, and the total supply and demand adjustment amounts of power grid 1 and power grid 8 are then each calculated from the amount of power that flows from power grid 1 to the other power grid 8 by way of interconnection line 9.

If this method is used, only power grid 1 in which the balance between supply and demand has deteriorated can be recognized as the grid to be adjusted even when another power grid 8 is linked.

In the present exemplary embodiment, a power company or an aggregator measures the grid frequency and the amount of electric power that flows by way of interconnection line 9, calculates the total supply and demand adjustment amount of each of power grid 1 and power grid 8, and distributes the calculation result to customer apparatuses, whereby the customer apparatuses are able to obtain the total supply and demand adjustment amount.

If the reference frequency of the grid frequency is not used, the total supply and demand adjustment amount may be calculated by another method such as a method that is freely determined by a power company and that does not use the amount of power that flows through interconnection line 9.

The above-described effects are also exhibited by local charging/discharging device 100 that is made up of detection unit 101, communication unit 102, comprehension unit 103, and arithmetic unit 104. Further, the above-described effects are also exhibited by storage battery SCADA 200 that is made up of communication unit 201, comprehension unit 203, and arithmetic unit 204. In addition, the above-described effects are exhibited by a battery control system that is made up of local charging/discharging device 100 that is composed of detection unit 101, communication unit 102, comprehension unit 103, and arithmetic unit 104 and storage battery SCADA 200 that is composed of communication unit 201, comprehension unit 203, and arithmetic unit 204.

Figure 15:
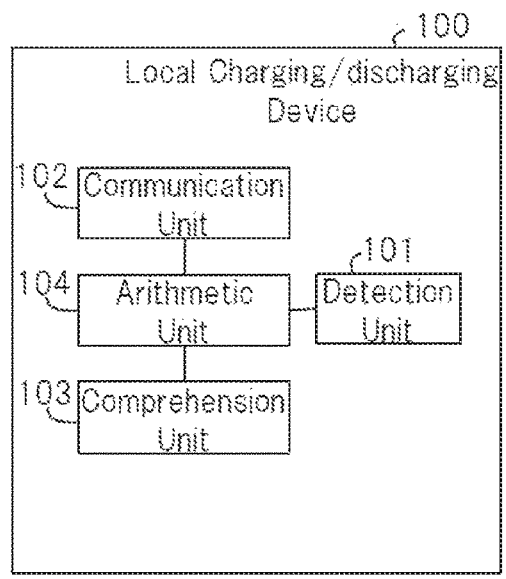
FIG. 15 shows a local charging/discharging device that is made up of detection unit 101, communication unit 102, comprehension unit 103, and arithmetic unit 104.

FIG. 15 shows a local charging/discharging device that is composed of detection unit 101, communication unit 102, comprehension unit 103, and arithmetic unit 104.

Figure 16:
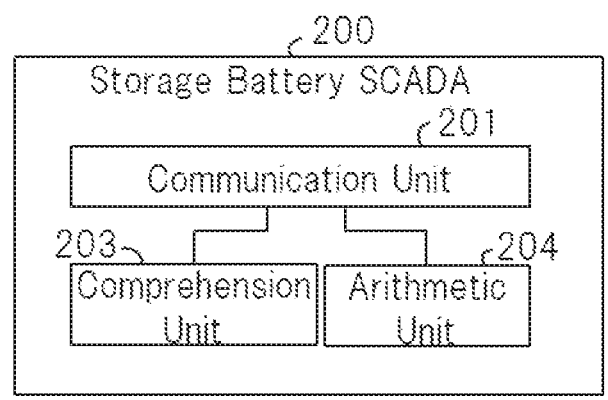
FIG. 16 shows storage battery SCADA 200 that is made up of communication unit 201, comprehension unit 203, and arithmetic unit 204.

FIG. 16 shows storage battery SCADA 200 that is made up of communication unit 201, comprehension unit 203, and arithmetic unit 204.

In addition, comprehension unit 103 receives from power supply command unit 300A adjustment power amount information for specifying the adjustment power amount and thus comprehends the adjustment power amount. As a result, the adjustment power amount can be easily comprehended.

Further, adjustment power amount information is transmitted by one-way communication (for example, broadcast communication) from the transmission origin of the adjustment power amount information to the transmission destination of the adjustment power amount information. As a result, the delay relating to communication of the adjustment power amount information can be reduced.

When the amount of information of the adjustment power amount information is less than the amount of information of the operation control information, the adjustment power amount information may be transmitted from the transmission origin of the adjustment power amount information to the transmission destination of the adjustment power amount information by bidirectional communication between the transmission origin of the adjustment power amount information and the transmission destination of the adjustment power amount information. In this case, information (for example, ACK) indicating that the adjustment power amount information has been received is used as the information that is transmitted from the transmission destination of adjustment power amount information to the transmission origin of adjustment power amount information.

In addition, instead of transmitting the adjustment power amount information from communication unit 304 by broadcast, arithmetic unit 305 may transmit the adjustment power amount information to storage battery SCADA 200 from communication unit 303. In this case, communication unit 201 receives the adjustment power amount information in storage battery SCADA 200, and arithmetic unit 204 transmits the adjustment power amount information from communication unit 201 to local charging/discharging device 100. In this case, the operation control information and the adjustment power amount information can be reported using the same communication unit.

The adjustment power amount information that is simultaneously transmitted to each local charging/discharging device 100 shows the same content, and as a result, there is no need to alter the adjustment power amount information for each transmission destination, and the load imposed upon the transmitting side regarding the adjustment power amount information can be limited.

The transmission origin of the adjustment power amount information is not limited to command unit 300A and can be altered as appropriate.

Storage battery SCADA 200 receives the charging/discharging gain line that is used for generating allotment information from power supply command unit 300A that controls power grid 1. As a result, a charging/discharging gain line can be obtained that takes into consideration the operation of thermal power generator 4 on the grid side. As a result, the control of the balance between power supply and demand by means of power storage devices 3 and thermal power generator 4 on the grid side can be implemented with high accuracy.

Storage battery SCADA 200 further receives from power supply command unit 300A a charging/discharging gain line that reflects total adjustable capacity $P_{ES}$. The load of power storage devices 3 can therefore be adjusted in accordance with the total adjustable capacity of power storage devices 3.

The time intervals at which local charging/discharging devices 100 acquire allotment information from storage battery SCADA 200 are longer than the time intervals of the operations by which local charging/discharging devices 100 use the allotment information to control power storage devices 3. As a result, the process of acquiring allotment information is less likely to be adversely affected by communication problems that can occur between local charging/discharging device 100 and storage battery SCADA 200 than a case in which the time intervals of acquiring allotment information are equal to or less than the intervals of the operation of power storage devices 3.

Arithmetic unit 104 further controls the operation of power storage device 3 based on the SOC and the SOC correction offset value of power storage device 3. As a result, bias toward 0 or 1 of the SOC of power storage device 3 can be prevented, electric power that can be charged or discharged using power storage device 3 can be prevented from decreasing, and total adjustable capacity $P_{ES}$ can be prevented from becoming small.

Arithmetic unit 104 specifies the corrected amount of power, for which the amount of power for stabilizing the electric power of power grid 1 that is specified according to the adjustment power amount W was adjusted based on allotment coefficient K and SOC, and causes power storage devices 3 to implement charging or discharging at the corrected amount of power. As a result, the operation of power storage device 3 can be adjusted according to not only the allotment information but also the actual changes in the state of the balance between power supply and demand in the power grid while preventing the bias toward 0 or 1 of the SOC of power storage device 3.

Arithmetic unit 204 may further, based on the SOC of power storage devices 3, generate information relevant to correction of the SOC offset that indicates the amount of charging or the amount of discharging to cause the SOC of power storage devices 3 to approach the reference SOC, and arithmetic units 104 may use the amount of charging or the amount of discharging indicated in the information relevant to the correction of the SOC offset to control power storage devices 3. In this case, arithmetic units 104 no longer need to execute the process of calculating the SOC correction offset value, and the load imposed upon arithmetic units 104 can therefore be limited.

When the SOC correction offset value for charging is a positive value and the SOC correction offset value for discharging is a negative value, arithmetic unit 204 may generate each item of information relevant to the correction of the SOC offset such that the sum total of the SOC correction offset values for charging and the SOC correction offset values for discharging is 0. In this case, influence of the SOC correction offset upon the capacity $LFC_{ES}$ can be prevented.

Arithmetic unit 204 may also generate each item of information relevant to the correction of the SOC offset such that the speed of change of the sum total of the offset that accompanies the passage of time does not surpass the upper limit of the response speed of the power-stabilizing operation carried out by thermal power generator 4. This raises the potential that change of the power supply and demand that is due to change of the offset sum total will be absorbed by the power stabilizing operation of thermal power generator 4. As a result, the change of power supply and demand that is due to the SOC correction offset value will be less likely to affect the relatively high-speed change of the supply and demand that accompanies charging/discharging of power storage devices 3.

Arithmetic unit 204 may specify the amount of charging or the amount of discharging for each power storage device 3 based on the SOC of power storage devices 3 to cause the SOC to approach the target SOC, and moreover, correct the amount of charging or the amount of discharging such that the sum total of the amount of charging or the amount of discharging of each power storage device 3 in a state in which the adjustment power amount W is within a predetermined range is in a linear relation with adjustment power amount W. Arithmetic unit 204 may further use the amount of charging or the amount of discharging that follows correction to generate a corrected reference local charging/discharging gain line. Arithmetic units 104 may then control the operation of power storage devices 3 based on the corrected reference local charging/discharging gain line. In this case, the total charging/discharging amount of power storage devices 3 can be highly accurately controlled based on X.

Arithmetic units 104 may also generate a SOC correction offset value based on the difference between $SOC_{target, n}$ that was received from storage battery SCADA 200 and the SOC of power storage devices 3. In this case, the SOC correction offset value can be altered as appropriate in accordance with the actual changes of the SOC of power storage devices 3. Even if, for example, a communication problem should occur and $SOC_{target, n}$ cannot be newly received, arithmetic units 104 can use the already received $SOC_{target, n}$ to continue to calculate the SOC correction offset value.

Arithmetic units 104 may also generate the SOC correction offset value that indicates the amount of charging or the amount of discharging that causes the SOC of power storage devices 3 to approach $SOC_{target, n}$ by correcting the difference between $SOC_{target, n}$ that was received from storage battery SCADA 200 at Tn and the SOC of power storage devices 3. In this case, the speed of change of the sum total of the offset can be adjusted by Tn. As a result, change of the power supply and demand that is due to change of the offset sum total can be absorbed by the power stabilizing operation of thermal power generator 4.

In the present exemplary embodiment, when control of effective power P and reactive power Q in power storage devices 3 is taken into consideration, the maximum value of the portion of the output of power storage device 3 that is assigned to the control of the effective power P may be used instead of the rated output P(n) (essentially, consideration is given to the effect that, when the separate output of Q is used in parallel, the maximum value of P output is lower than the rated output of the Q output).

In the present exemplary embodiment, local charging/discharging devices 100 may halt control of the charging/discharging of power storage devices 3 when communication with storage battery SCADA 200 is interrupted.

When communication with any local charging/discharging device 100 is interrupted, storage battery SCADA 200 preferably communicates with local charging/discharging devices 100 other than local charging/discharging device 100 with which communication was interrupted.

When power grid 1 is not linked to another power grid 8 (when there is no interconnection line 9), arithmetic unit 305 multiplies a value obtained by subtracting the grid frequency that was detected by frequency meter 301 from the reference frequency of the grid frequency by a predetermined constant and calculates this multiplication result as the total supply and demand adjustment amount.

In the above-described exemplary embodiment, components such as storage battery SCADA 200 and local charging/discharging devices 100 carry out timely collection and delivery of time synchronization information in the process of information communication and thus realize time synchronization among the apparatuses.

In addition, local charging/discharging device 100 may be realized by a computer. In this case, the computer reads and executes a program that is recorded on a recording medium such as a CD-ROM (Compact Disk Read Only Memory) that can be read by a computer and executes each of the functions belonging to local charging/discharging device 100. The recording medium is not limited to a CD-ROM and can be modified as appropriate.

In addition, storage battery SCADA 200 may be realized by a computer. In this case, the computer reads and executes a program that is recorded on a recording medium that can be read by the computer and executes each of the functions belonging to storage battery SCADA 200.

Still further, a small-scale EMS (Energy Management System) that is installed in the vicinity of a distributing substation may be used in place of power supply command unit 300A.

Second Exemplary Embodiment

The second exemplary embodiment of the present invention is next described.

The assumed state of the present exemplary embodiment is first described.

An aggregator is assumed to, by controlling the consumed power of a plurality of customers, provide supply and demand adjustment power to a business (hereinbelow assumed to be a power company for the sake of simplicity) that takes on the responsibility of establishing the balance between supply and demand of a power grid.

The supply and demand adjustment power is the capability of covering without delay a deviation between the total amount of demand and the total amount of supply within a power grid that is managed by a power company. Consequently, the capability that is demanded of an aggregator is the capability of adjusting supply and demand without delay according to the demands of the power company, i.e., the capability of changing power consumption or power generation.

In order to provide supply and demand adjustment power, an aggregator is assumed to directly control apparatuses belonging to customers to perform supply and demand adjustment.

Typically, the entity that provides supply and demand adjustment power is the owner of a thermal power generation plant, and in such cases, the supply and demand adjustment power that is provided to the power company is in units of at least MW or more. As a result, an individual customer is not able to make a contract to provide supply and demand adjustment power to a power company as would the owner of a thermal power plant. However, by directly controlling the apparatuses of a multiplicity of customers and linking these apparatuses, an aggregator is able to provide the supply and demand adjustment power held by customers to a power company.

Examples that can be offered of supply and demand adjustment devices that an aggregator controls include devices that, while their power consumption may change, can go for some time before there is any effect on the convenience to a customer, examples being storage batteries, heat pump water heaters, air conditioners, and electric automobiles. Among such devices, devices that are able to store energy are particularly preferable as the supply and demand adjustment devices that an aggregator controls. Devices that are able to store energy have a buffer of energy storage such that, despite temporary changes in power consumption, will not have a particularly large influence on the convenience to a customer over a short interval.

An aggregator makes a contract with a power company by the day before the day that supply and demand adjustment power is to be provided and determines the supply and demand adjustment power to be provided by the aggregator and the time slot in which the supply and demand adjustment power is to be provided.

The supply and demand adjustment power sought by the power company is divided into a plurality of types by differences of the spacing at which the supply and demand adjustment power is instructed and the fluctuation cycle, which is the time until the integrated value of the supply and demand adjustment power becomes 0 (assuming, for example, that increase in demand is positive and decrease in demand is negative). The power company calculates the necessary supply and demand adjustment power from among the plurality of types of supply and demand adjustment power by the day preceding the day the supply and demand adjustment power will be necessary and secures the necessary capacity (the supply and demand adjustment power) by prior contract. As an example of the method of securing the necessary supply and demand adjustment power, there is a method of accepting bids for the supply and demand adjustment power until the necessary supply and demand adjustment power arrives by way of the market. In this case, the aggregator calculates in advance the supply and demand adjustment power that the aggregator itself can provide and takes this calculation result into consideration when tendering a bid.

The supply and demand adjustment power that the aggregator provides to the power company is preferably supply and demand adjustment power in which the supply and demand adjustment amount has a short change cycle (for example, a change cycle with a one-second interval), and moreover, in which fluctuation has a short cycle (for example, a fluctuation cycle on the order of 30 minutes), i.e., power referred to as short-term supply and demand adjustment power. This point is further explained hereinbelow.

Thermal power generation that has conventionally provided supply and demand adjustment power is not suited for supply and demand adjustment in which the supply and demand adjustment amount is changed at a short cycle, but has the feature of having few restrictions regarding the sum total of the fixed time intervals of the supply and demand adjustment amounts.

In thermal power generation, the amount of introduced fuel must be altered to change the generated amount. As a result, in thermal power generation, changing output by several tens of percent takes a fixed time interval (for example, several tens of seconds even when short). Accordingly, in thermal power generation, when the supply and demand adjustment amount is changed at one-second intervals, the changes become difficult to follow. In thermal power generation, however, varying only the amount of introduced fuel allows the supply and demand adjustment power to be provided regardless of the value of the time integral of the supply and demand adjustment amount.

In the case of supply and demand adjustment that uses customer apparatuses, however, most customer apparatuses are able to follow the commanded value of changes of consumed power that changes each second according to changes in the supply and demand adjustment amount.

However, in the case of customer apparatuses, the problem arises that, when the time integral of change of the consumed power over the long term does not become 0, the previously described buffer of energy storage becomes saturated, and thus adversely affects convenience.

The supply and demand adjustment power that has become necessary with the popularization of renewable power sources is fast-changing supply and demand adjustment power for which the commanded value of changes of consumed power is changed in short intervals of, for example, one second. Because the amount of generated power of a renewable power source fluctuates at high speed in accordance with the weather, supply and demand adjustment power for absorbing these changes is in particular demand.

As a result, adjustment power that is provided by means of direct control of customer apparatuses is preferably short-term supply and demand adjustment power.

When an aggregator apparatus receives the supply and demand adjustment amount $P_{ES}(t)$ requested by a power company, even if the aggregator apparatus directly controls customer apparatuses and attempts to cause the sum total of consumption of power of the customer apparatuses to change in the amount of supply and demand adjustment amount $P_{ES}(t)$ without the sum total of the consumption of power of the customer apparatuses deviating from supply and demand adjustment amount $P_{ES}(t)$, the sum total will deviate from the supply and demand adjustment amount $P_{ES}(t)$ if the customer apparatuses fail to follow the commands for supply and demand adjustment due to communication delays or interruptions or due to changes in the state of the customer apparatuses. This point is explained hereinbelow.

Under conditions in which an aggregator apparatus performs bidirectional communication with customer apparatuses and issues a command for supply and demand adjustment to each customer apparatus, the aggregator apparatus operates, for example, as described below.

When the aggregator apparatus receives a supply and demand adjustment amount $P_{ES}(t)$ from a power company, the aggregator apparatus allots supply and demand adjustment amount $P_{ES}(t)$ to the supply and demand adjustment amount $P_n(t)$ of each customer apparatus. The "n" of $P_n(t)$ is a number that indicates the apparatus and is represented by an integer 1, 2, 3 . . . . A positive $P_n(t)$ indicates increasing demand, i.e., charging in the case of a storage battery, and a negative $P_n(t)$ indicates decreasing demand, i.e., discharging in the case of a storage battery.

The aggregator apparatus when making an allotment must allot the supply and demand adjustment amount $P_n(t)$ of each apparatus n in accordance with the state of each apparatus n under the limitation condition that $P_{ES}(t)=P_1(t)+P_2(t)+ \ldots +P_N(t)$. It is here assumed that the total number of customer apparatuses controlled by the aggregator apparatus is N. The significance of the aggregator apparatus allotting the supply and demand adjustment amount $P_n(t)$ of each apparatus n in accordance with the state of each apparatus n is next explained. When, for example, a customer apparatus is a storage battery, when saturation or depletion of the SOC of the storage battery occurs, the storage battery is unable to respond even when a command is received. The aggregator apparatus therefore assigns the supply and demand adjustment amount $P_n(t)$ of each apparatus n in accordance with the state of each apparatus n in order to avoid this situation.

However, when the aggregator apparatus carries out bidirectional communication with massive numbers of customer apparatuses greater than several tens of thousands, the potential rises for delays or interruptions of communication.

For example, if the aggregator apparatus makes inquiries regarding the states of customer apparatuses in order, assigns the supply and demand adjustment amount $P_n(t)$ of each apparatus n in accordance with the responses, and distributes assignment results, the several tens of milliseconds that is the delay time that typically occurs on the Internet will be used for each apparatus. As a result, the aggregator apparatus will spend a time interval of more than several hundred seconds to complete communication with all of 10,000 apparatuses.

Alternatively, if the aggregator apparatus makes inquiries to all customer apparatuses and each apparatus responds, congestion will occur at the time of response and there is a possibility of temporary interruptions of communication or substantial delays that accompany resending.

As a result, the constant implementation of bidirectional communication by an aggregator apparatus with large numbers of several tens of thousands or more of customer apparatuses results in the occurrence of delays or interruptions of communication, and it is therefore difficult for an aggregator apparatus to constantly control customer apparatuses by bidirectional communication or, in the case of storage batteries, to command charging or discharging with the desired absolute minimum of delay in the control of the customer apparatuses.

In order to realize the assignment of direct control amounts (supply and demand adjustment amounts of each apparatus n) $P_n(t)$ that accord with the state of each apparatus while satisfying $P_{ES}(t)=P_1(t)+P_2(t)+ \ldots +P_N(t)$ without delays in the present exemplary embodiment, the information that is communicated between an aggregator apparatus and customer apparatuses is separated into two types of information for which the required "information indicating the allotment of each apparatus" (in the following explanation, explanation regards "batteries" as an example of the apparatuses)) and the method of communicating each item of information is made different, thereby both enabling the reduction of communication delays or interruptions and enabling the reduction of deviation of the change of the demand of each customer apparatus from a target value.

Each customer apparatus, instead of receiving a direct control amount $P_n(t)$ from the aggregator apparatus, receives the two types of information, "supply and demand adjustment amount $P_{ES}(t)$" and "information indicating allotment of each battery," calculates its own direct control amount (allotted amount) $P_n(t)$ by combining the two types of information, and carries out the supply and demand adjustment in accordance with the calculation result.

While supply and demand adjustment amount $P_{ES}(t)$ must be received by each customer apparatus without delays (for example, every one second), only the same information (supply and demand adjustment amount $P_{ES}(t)$) need be distributed to each customer apparatus, and one-way communication may be used. As a result, the communication method having the lowest level of delay and the highest reliability can be selected as the method of communicating supply and demand adjustment amount $P_{ES}(t)$. For example, a distribution method that uses wireless communication such as FM broadcast, an application layer broadcast, or UDP (User Datagram Protocol) may be used as the method of distributing supply and demand adjustment amount $P_{ES}(t)$. Alternatively, the aggregator apparatus and each customer apparatus may measure the deviation of the grid frequency from the reference frequency, this deviation reflecting the balance between the overall grid supply and demand, and then estimate the supply and demand adjustment amount $P_{ES}(t)$ on the basis of the measurement result.

On the other hand, because the "information indicating the allotment of each battery" changes according to the state of the apparatus, the aggregator apparatus must receive the state of the apparatuses from each customer apparatus, determine the "information indicating the allotment of each battery" in accordance with the states of these apparatuses, and distribute this "information indicating the allotment of each battery" to each customer apparatus. In other words, in order to determine the "information indicating the allotment of each battery" and distribute the "information indicating the allotment of each battery," bidirectional communication must be used between the aggregator apparatus and each customer apparatus.

However, the bidirectional communication necessary for determining the "information indicating the allotment of each battery" and distributing the "information indicating the allotment of each battery" is of low frequency of occurrence (an interval of more than several minutes), and further, can tolerate delays or interruptions of less than several tens of seconds to several minutes, which is shorter than the communication interval, and therefore can employ inexpensive communication such as the Internet. This is because changes of the state of an apparatus that relate to supply and demand adjustment do not take place in units of seconds in most apparatuses, and the information indicating allotments therefore may be of low frequency without raising problems.

Figure 17:
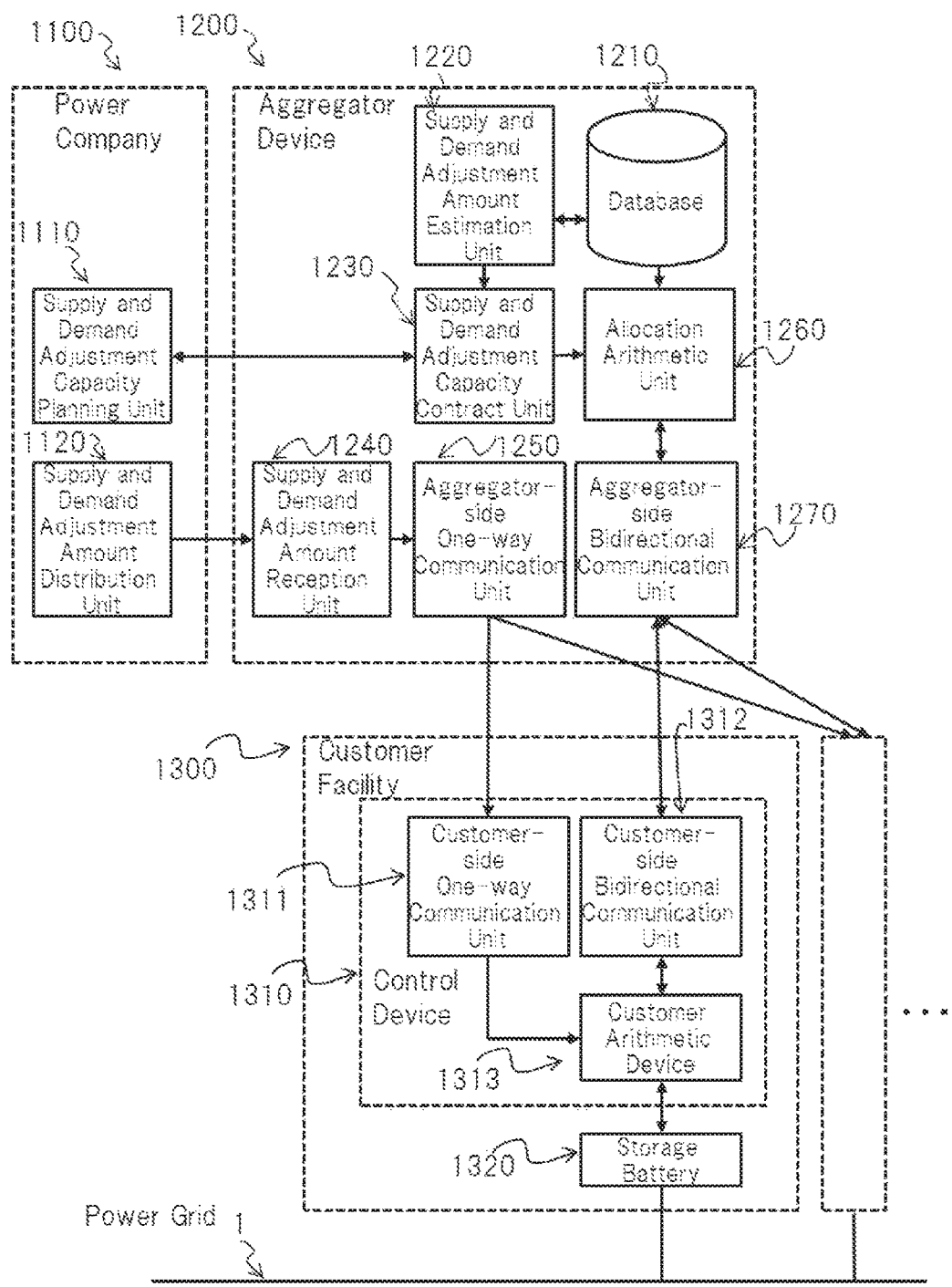
FIG. 17 shows an example of the configuration of the second exemplary embodiment of the present invention.

The configuration of the present exemplary embodiment is next described. FIG. 17 shows an example of the configuration of the present exemplary embodiment.

In FIG. 17, control device 1310 in customer facility 1300 is one example of the first control device, and aggregator device 1200 is one example of the second control device.

Power company 1100 is equipped with supply and demand adjustment capacity planning unit 1110 and supply and demand adjustment amount distribution unit 1120.

Before implementing supply and demand adjustment, for example, on the previous day, supply and demand adjustment capacity planning unit 1110 estimates the supply and demand adjustment capacity that will be necessary for each time, for example, in one-hour units, and in accordance with this estimate assigns supply and demand adjustment capacity to, for example, aggregator device 1200, other aggregators (not shown), and thermal power plants (not shown). Here, the supply and demand adjustment capacity indicates the maximum value of demand or load that will change according to requests. When implementing supply and demand adjustment, supply and demand adjustment amount distribution unit 1120 distributes to aggregators and thermal power plants (not shown) supply and demand adjustment amounts that have been normalized according to allotments, for example, for every second.

From the standpoint of function, aggregator device 1200 is made up of three parts.

The first part includes database 1210, supply and demand adjustment amount estimation unit 1220, and supply and demand adjustment capacity contract unit 1230 for realizing the function of determining the supply and demand adjustment capacity that is to be provided to power company 1100 before (for example, the previous day) carrying out supply and demand adjustment.

Database 1210 stores, for each customer apparatus that is under contract with the aggregator, the supply and demand adjustment capacity that can be provided and other restrictions (for example, in the case of a storage battery, the inverter ratings).

Supply and demand adjustment amount estimation unit 1220, based on the information stored in database 1210, estimates the supply and demand adjustment capacity that can be provided using the apparatuses of all customers that are under contract and determines the supply and demand adjustment capacity that aggregator device 1200 can provide to power company 1100 by way of supply and demand adjustment capacity contract unit 1230.

The second part includes supply and demand adjustment amount reception unit 1240 and aggregator-side one-way communication unit 1250 for realizing the functions of, when performing supply and demand adjustment, receiving the supply and demand adjustment amounts that are transmitted in by power company 1100, for example, each second and distributing these supply and demand adjustment amounts to the apparatuses (batteries) of customers.

The third part includes allocation arithmetic unit 1260 that determines the allotment of each battery on the basis of the supply and demand adjustment capacity that was contracted beforehand and the state of each customer apparatus, and aggregator-side bidirectional communication unit 1270 that collects the state of each customer apparatus and that transmits the allotment of each battery to each customer apparatus.

The spacing of the series of operations by which aggregator-side bidirectional communication unit 1270 collects the states of each customer apparatus and transmits the allotment of each battery that was determined by allocation arithmetic unit 1260 to each customer apparatus is longer, for example, every ten minutes.

In aggregator device 1200, supply and demand adjustment capacity contract unit 1230 is one example of the second comprehension means. Aggregator-side one-way communication unit 1250 is one example of the external communication device. Allocation arithmetic unit 1260 is one example of the processing means. Aggregator-side bidirectional communication unit 1270 is one example of the second communication means.

Customer facility 1300 is provided with storage battery 1320 as an example of the device that is the object of control of control device 1310 and aggregator device 1200.

Storage battery 1320 determines the amount of charging/discharging in accordance with a command from control device 1310 and implements the supply and demand adjustment by discharging electric power to or absorbing electric power from power grid 1.

Although a storage battery is here assumed to be the device that is the object of control of aggregator device 1200, the device that is the object of the control of aggregator device 1200 may also be a heat pump water heater, an air conditioner, or an electric automobile.

In FIG. 17, although there is one control device 1310 in customer facility 1300 and only one storage battery 1320 is connected to the single control device 1310, there may also be a plurality of control devices 1310 in one customer facility 1300, and a plurality of storage batteries 1320 may be connected to a single control device 1310.

Although configuration other than the load that aggregator device 1200 controls has been omitted for the sake of simplifying the explanation, there may also be other loads in customer facility 1300.

In addition, in the interest of simplifying the explanation, only one customer facility 1300 is shown in FIG. 17, but there may be a plurality, for example, 10,000 or more of customer facilities 1300.

Control device 1310 in customer facility 1300 includes customer-side one-way communication unit 1311, customer-side bidirectional communication unit 1312, and customer arithmetic device 1313.

Customer-side one-way communication unit 1311 receives normalized supply and demand adjustment amounts, for example, every second from aggregator-side one-way communication unit 1250.

Customer-side bidirectional communication unit 1312 collects the states (for example, the SOC) of each customer apparatus (in the present exemplary embodiment, storage battery 1320) by way of customer arithmetic device 1313, and transmits the state of each customer apparatus to aggregator-side bidirectional communication unit 1270. In addition, customer-side bidirectional communication unit 1312 receives the allotment of the battery (storage battery 1320) from aggregator-side bidirectional communication unit 1270. These operations of transmitting and receiving that are carried out by customer-side bidirectional communication unit 1312 are carried out at long intervals of, for example, ten minutes.

Customer arithmetic device 1313 uses a normalized supply and demand adjustment amount that is received at short intervals of, for example, one second and information of the allotment that is received at long intervals of, for example, every ten minutes to determine the charging/discharging amount that is instructed to storage battery 1320 at short intervals of, for example, one second.

The normalized supply and demand adjustment amounts are distributed from power company 1100 to control devices 1310 in customer facilities 1300 by way of aggregator device 1200, but the method of communication in this case is as described below.

First, because there are a multiplicity of control devices 1310 that are the transmission destinations, the methods of transmitting the normalized supply and demand adjustment amounts to customer-side one-way communication units 1311 from aggregator-side one-way communication unit 1250 include, for example, distribution that uses a wireless communication medium such as FM broadcast that is relatively inexpensive, and moreover, highly reliable, as well as application layer broadcast and UDP.

On the other hand, because the number of aggregator devices 1200 is far fewer than the number of customers (the number of control devices 1310), a method of communication that uses dedicated lines and that has high reliability may be used as the method by which supply and demand adjustment amount distribution unit 1120 of power company 1100 communicates with supply and demand adjustment amount reception units 1240 of aggregator devices 1200.

A communication method that uses the normal Internet or a carrier network is used as the method of communication between aggregator-side bidirectional communication unit 1270 and customer-side bidirectional communication units 1312 because this method is not prone to delay or interruptions.

In control device 1310, customer-side one-way communication unit 1311 is one example of the first comprehension means, customer-side bidirectional communication unit 1312 is one example of the first communication means, and customer arithmetic device 1313 is one example of the detection means and control means.

The operation of the present exemplary embodiment shown in FIG. 17 is next described.

The operation of the present exemplary embodiment can be divided between the procedures of contracting the supply and demand adjustment capacity beforehand and the procedures of the supply and demand adjustment operation.

In the procedures of contracting the supply and demand adjustment capacity beforehand, power company 1100 estimates the supply and demand adjustment capacity that will be necessary, while on the other hand, aggregator device 1200 estimates supply and demand adjustment capacity $P_{ES,\ rated\_max}$ that can be provided using storage batteries 1320 of a plurality of contract customers, and aggregator device 1200 contracts supply and demand adjustment capacity $P_{ES,\ max}$ that is provided to power company 1100 for each time.

In the procedures of the supply and demand adjustment operation, the supply and demand adjustment amount $P_{ES}(t)$ that is transmitted to aggregator device 1200 each second by power company 1100 is apportioned out to charging/discharging amount $P_n(t)$ of storage battery 1320 of each contract customer.

The contracting operations of the supply and demand adjustment capacity beforehand are first described.

Figure 18:
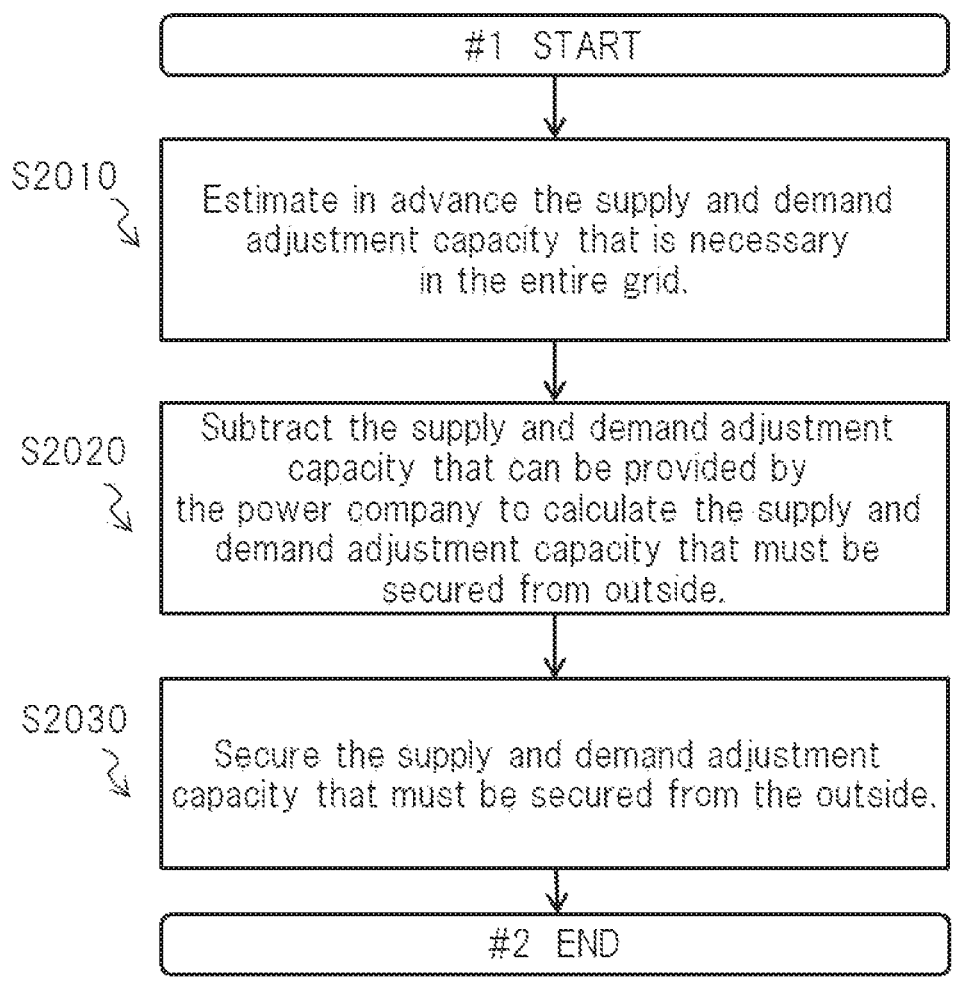
FIG. 18 is a flow chart for describing the operations of supply and demand adjustment capacity planning unit 1110.

FIG. 18 is a flow chart for describing the operations of supply and demand adjustment capacity planning unit 1110 of power company 1100.

In Step S2010, supply and demand adjustment capacity planning unit 1110 estimates the supply and demand adjustment amount that will be necessary in, for example, one-hour time units at each time of the next 24-hour period before, for example, the day preceding the day that supply and demand adjustment is to be carried out. The supply and demand adjustment capacity refers to the maximum value of demand or load that changes according to requests. Supply and demand adjustment capacity planning unit 1110 uses, for example, the next day's weather forecast to estimate the customer load and the range of fluctuation of the generated amount of the renewable power sources and calculates the supply and demand adjustment capacity that will be necessary for the entire grid.

Next, in Step S2020, supply and demand adjustment capacity planning unit 1110 subtracts the supply and demand adjustment capacity that can be provided at each time by thermal power generators (not shown) belonging to power company 1100 itself from the estimated supply and demand adjustment capacity that is required by the entire grid and uses the subtraction result to calculate the supply and demand adjustment capacity that must be secured from outside of power company 1100 at each time such as from aggregators or businesses having in-house power generators.

In Step S2030, supply and demand adjustment capacity planning unit 1110 next secures the supply and demand adjustment capacity that must be secured from the outside. The method of securing the power may be realized by supply and demand adjustment capacity planning unit 1110 that provides a price and the supply and demand adjustment capacity to secure the supply and demand adjustment capacity that must be secured from outside from aggregators or businesses having in-house power generators, or by setting up a power market typically referred to as an ancillary market to secure the supply and demand adjustment capacity that must be secured from the outside.

Figure 19:
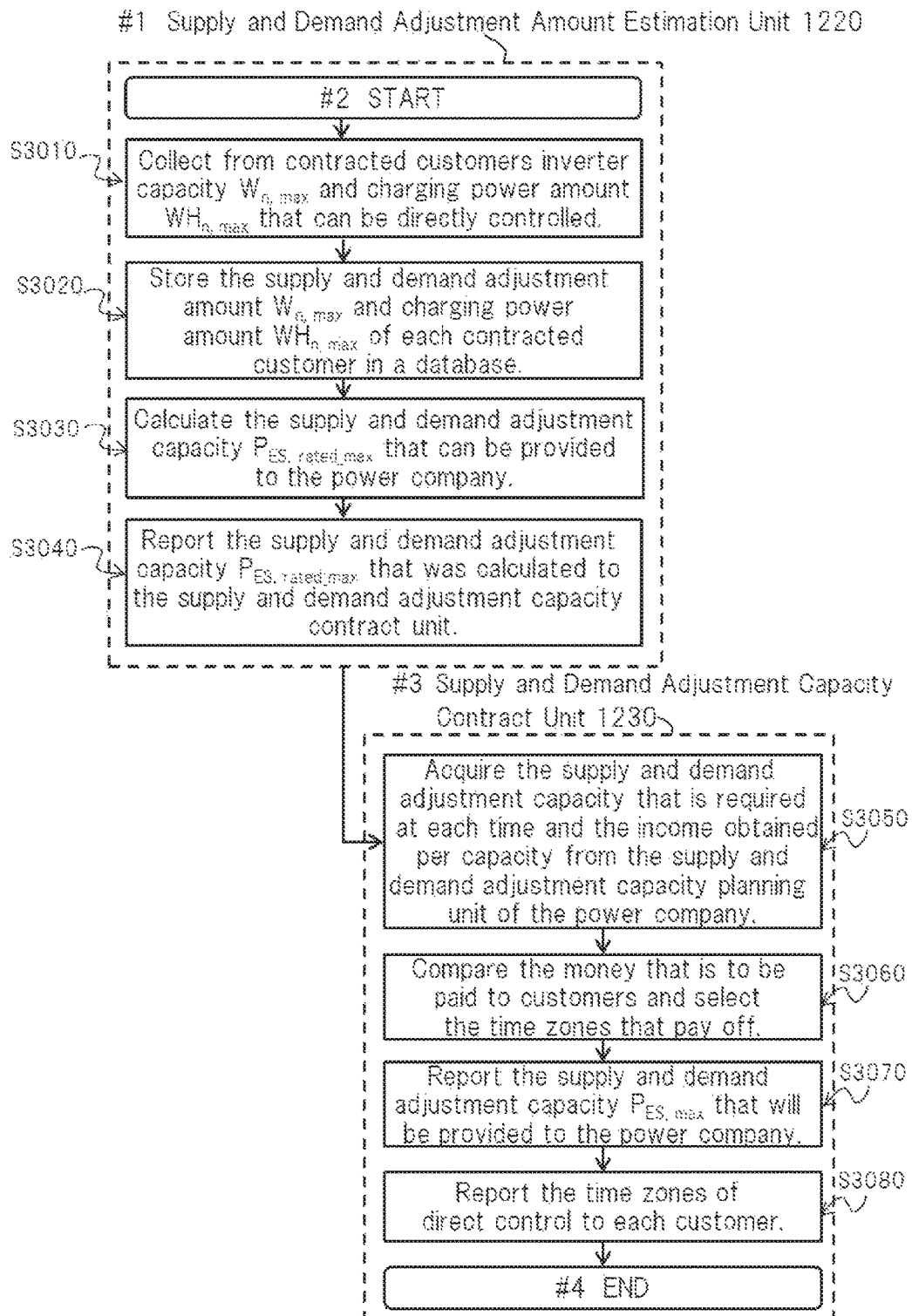
FIG. 19 is a flow chart showing the operations of supply and demand adjustment amount estimation unit 1220 and supply and demand adjustment capacity contract unit 1230.

FIG. 19 is a flow chart showing the operations of supply and demand adjustment amount estimation unit 1220 and supply and demand adjustment capacity contract unit 1230 belonging to aggregator device 1200.

The operations shown in FIG. 19 are the procedures by which aggregator device 1200 estimates the supply and demand adjustment capacity $P_{ES,\ rated\_max}$ that can be provided using storage batteries 1320 of a plurality of contracted customers and contracts the supply and demand adjustment capacity $P_{ES,\ max}$ that aggregator device 1200 provides to power company 1100 at each time. The operations shown in FIG. 19 are implemented before supply and demand adjustment is carried out, for example, during the day previous to the day of carrying out supply and demand adjustment.

In Step S3010, supply and demand adjustment amount estimation unit 1220 first collects the inverter capacity (supply and demand adjustment capacity) $W_{n,\ max}$ and charging power amount $WH_{n,\ max}$ of storage batteries 1320 that can be directly controlled by aggregator device 1200 by means of control device 1310 of each customer, and then stores the inverter capacity $W_{n,\ max}$ and charging power amount $WH_{n,\ max}$ in database 1210.

In Step S3010, for example, customer arithmetic device 1313 in control device 1310 acquires the inverter capacity $W_{n,\ max}$ and charging power amount $WH_{n,\ max}$ of storage battery 1320 and transmits the result of this acquisition to aggregator-side bidirectional communication unit 1270 by way of customer-side bidirectional communication unit 1312, and aggregator-side bidirectional communication unit 1270 provides this result of acquisition to supply and demand adjustment amount estimation unit 1220.

As the means (not shown) for collecting inverter capacity $W_{n,\ max}$ and charging power amount $WH_{n,\ max}$, for example, supply and demand adjustment amounts may be recruited on the Internet, and customers that respond may be caused to apply as input the inverter capacity $W_{n,\ max}$ and charging power amount $WH_{n,\ max}$ of storage batteries 1320 that aggregator device 1200 can directly control. In some cases, a fixed-term contract may be formed between a customer and an aggregator, for example, such that a fixed inverter capacity $W_{n,\ max}$ and charging power amount $WH_{n,\ max}$ are to provided to the aggregator for one month, and in such cases, Step S3010 may be skipped.

FIG. 20 shows an example of the information that is stored in database 1210.

In Step S3030, supply and demand adjustment amount estimation unit 1220 next calculates the maximum supply and demand adjustment capacity $P_{ES,\ rated\_max}$ that aggregator device 1200 can provide at each time to power company 1100.

Supply and demand adjustment amount estimation unit 1220, when determining the supply and demand adjustment capacity $P_{ES,\ rated\_max}$ for which supply can be guaranteed at each time by the direct control of customers' storage batteries, must avoid saturating or depleting the SOC of each storage battery 1320 of customers.

To this end, supply and demand adjustment amount estimation unit 1220 determines supply and demand adjustment capacity $P_{ES,\ rated\_max}$ on the basis of, for example, the distribution of inverter capacity $W_{n,\ max}$ and charging power amount $WH_{n,\ max}$ and the maximum period of the fluctuation component contained in the supply and demand adjustment amount that is instructed by power company 1100.

As an example of the method of determining supply and demand adjustment capacity $P_{ES,\ rated\_max}$, one method assumes that $P_{ES,\ rated\_max} = \Sigma_n W_{n,\ max}$ when the variation of inverter capacity $W_{n,\ max}$ and charging power amount $WH_{n,\ max}$ is smaller than a prescribed variation, and further, the maximum period of the fluctuation component contained in the supply and demand adjustment amount instructed from power company 1100 is smaller than $\Sigma_n WH_{n,\ max}/(2 \times \Sigma_n W_{n,\ max})$. By means of this setting, the supply and demand adjustment capacity $P_{ES,\ rated\_max}$ that the aggregator provides to power company 1100 can be maximized, and further, the saturation or depletion of the SOC of batteries can be limited even when charging and discharging are repeated at the maximum period of the fluctuation component that is contained in the supply and demand adjustment amount that is instructed from power company 1100. It is assumed that an estimated value of the long-term fluctuation component contained in the supply and demand adjustment amount is made public by the power company.

In Step S3040, supply and demand adjustment amount estimation unit 1220 next communicates the supply and the supply and demand adjustment capacity $P_{ES,\ rated\_max}$ at each time that was calculated in Step S3030 to supply and demand adjustment capacity contract unit 1230.

In Step S3050, supply and demand adjustment capacity contract unit 1230 then acquires the required supply and demand adjustment capacity and income obtained per capacity at each time by supply and demand adjustment capacity planning unit 1110 of power company 1100.

In Step S3060, supply and demand adjustment capacity contract unit 1230 then compares the income from power company 1100 and the amount of money that is paid to the customers that provide the supply and demand adjustment capacity, selects the time slots at which sufficient profit is obtained, and determines supply and demand adjustment capacity $P_{ES,\ max}$ that is provided in that time slot. The supply and demand adjustment capacity $P_{ES,\ max}$ is one example of the amount of power that is allotted to all storage batteries of each customer.

In Step S3070, supply and demand adjustment capacity contract unit 1230 communicates to power company 1100 the supply and demand adjustment capacity $P_{ES,\ max}$ that is to be provided in the selected time slots.

The supply and demand adjustment capacity $P_{ES,\ max}$ may be equal to or less than the supply and demand adjustment capacity $P_{ES,\ rated\_max}$.

When the supply and demand adjustment capacity sought by power company 1100 from the aggregator is more than the supply and demand adjustment capacity $P_{ES,\ rated\_max}$, supply and demand adjustment capacity contract unit 1230 must take the supply and demand adjustment capacity $P_{ES,\ max}$ as equal to the supply and demand adjustment capacity $P_{ES,\ rated\_max}$ and power company 1100 must secure the deficit from different supply and demand adjustment power.

When the supply and demand adjustment capacity that is sought by power company 1100 from the aggregator is equal to or less than supply and demand adjustment capacity $P_{ES,\ rated\_max}$, supply and demand adjustment capacity contract unit 1230 causes supply and demand adjustment capacity $P_{ES,\ max}$ to match the supply and demand adjustment capacity that is sought from the power company and, because a portion of the batteries need not be used, deletes the information of the storage batteries that will not be used from database 1210.

In Step S3080, supply and demand adjustment capacity contract unit 1230 next reports to control device 1310 of each customer the time slots of directly controlling storage batteries 1320 (the time slots determined in Step S3060).

The preceding explanation completes the explanation of the operation of contracting the supply and demand adjustment capacity beforehand.

The operation of supply and demand adjustment is next described.

In the interest of simplifying the explanation, explanation regards, of the supply and demand adjustment capacity $P_{ES, max}$ of each time, for example, each hour, for which aggregator device 1200 has concluded a contract with power company 1100, a supply and demand adjustment capacity $P_{ES, max}$ that is limited to a fixed interval of, for example, one hour. The same process is carried out at other times.

Supply and demand adjustment amount reception unit 1240 of aggregator device 1200 receives supply and demand adjustment amount $P_{norm}(t)$ that has been normalized each second from supply and demand adjustment amount distribution unit 1120 of power company 1100 as shown in FIG. 21, and transmits the supply and demand adjustment amount $P_{norm}(t)$ that has been normalized by way of aggregator-side one-way communication unit 1250 to customer-side one-way communication unit 1311 of all customer facilities 1300.

The supply and demand adjustment amount $P_{ES}(t)$ that is sought by the power company is $P_{ES}(t)=P_{norm}(t) \times P_{ES, max}$.

Further, the delay when typically transmitting the same information by one-way communication is less than the maximum value of the amount of delay sought in supply and demand adjustment, for example, 0.5 seconds, while in the case of the Internet, 98% is within 50 msec, and substantially 0 sec in the case of FM broadcast.

The normalized supply and demand adjustment amount $P_{norm}(t)$ is a value between −1 and 1, a positive value being a request for increasing demand, i.e., for charging in a storage battery, and a negative value being a request for decreasing demand, i.e., for discharging in a storage battery. The normalized supply and demand adjustment amount $P_{norm}(t)$ is one example of the adjustment power amount information.

As shown in FIG. 22, aggregator-side bidirectional communication unit 1270 collects information of storage batteries 1320 of each contracted customer at long intervals of, for example, every ten minutes, calculates in allocation arithmetic unit 1260 the information necessary for calculating charging/discharging amount $P_n(t)$ from $P_{norm}(t)$ and distributes $P_n(t)$ that was calculated to storage battery 1320 of each contracted customer.

As shown in FIG. 23, customer arithmetic device 1313 receives $P_{norm}(t)$ at short intervals of, for example, every one second and receives information necessary for calculating charging/discharging amount $P_n(t)$ from normalized supply and demand adjustment amount $P_{norm}(t)$ at a long intervals of, for example, every ten minutes. Customer arithmetic device 1313 then calculates charging/discharging amount $P_n(t)$ every one second on the basis of the most recent information necessary for calculating charging/discharging amount $P_n(t)$ from the normalized supply and demand adjustment amount $P_{norm}(t)$ and instructs the charging/discharging amount to storage batteries 1320 in accordance with this calculation result.

Explanation next regards the procedure by which allocation arithmetic unit 1260 of aggregator device 1200 generates information necessary for calculating charging/discharging amount $P_n(t)$ from the normalized supply and demand adjustment amount $P_{norm}(t)$ on the basis of the information of storage batteries 1320 of each contracted customer, i.e., the function form for converting the normalized supply and demand adjustment amount $P_{norm}(t)$ to charging/discharging amount $P_n(t)$. A function form is one example of correspondence relation information and operation control information.

Customer arithmetic device 1313 carries out the processes of acquiring this function form every ten minutes from allocation arithmetic unit 1260 of aggregator device 1200 as the information necessary for calculating charging/discharging amount $P_n(t)$ from the normalized supply and demand adjustment amount $P_{norm}(t)$, generating charging/discharging amount $P_n(t)$ from the normalized supply and demand adjustment amount $P_{norm}(t)$ and giving a charging/discharging command to storage batteries 1320 in accordance with the charging/discharging amount $P_n(t)$.

In the following explanation, the method by which allocation arithmetic unit 1260 determines the function form for converting to charging/discharging amount $P_n(t)$ from the normalized supply and demand adjustment amount $P_{norm}(t)$ for each storage battery on the basis of the information of storage batteries 1320 of contracted customers is described using FIGS. 24, 25, 26, and 27. In the interest of simplifying the explanation in these figures, a case is shown in which there are two storage batteries, but the function form can be determined using a similar method when there are three or more storage batteries.

Figure 24:
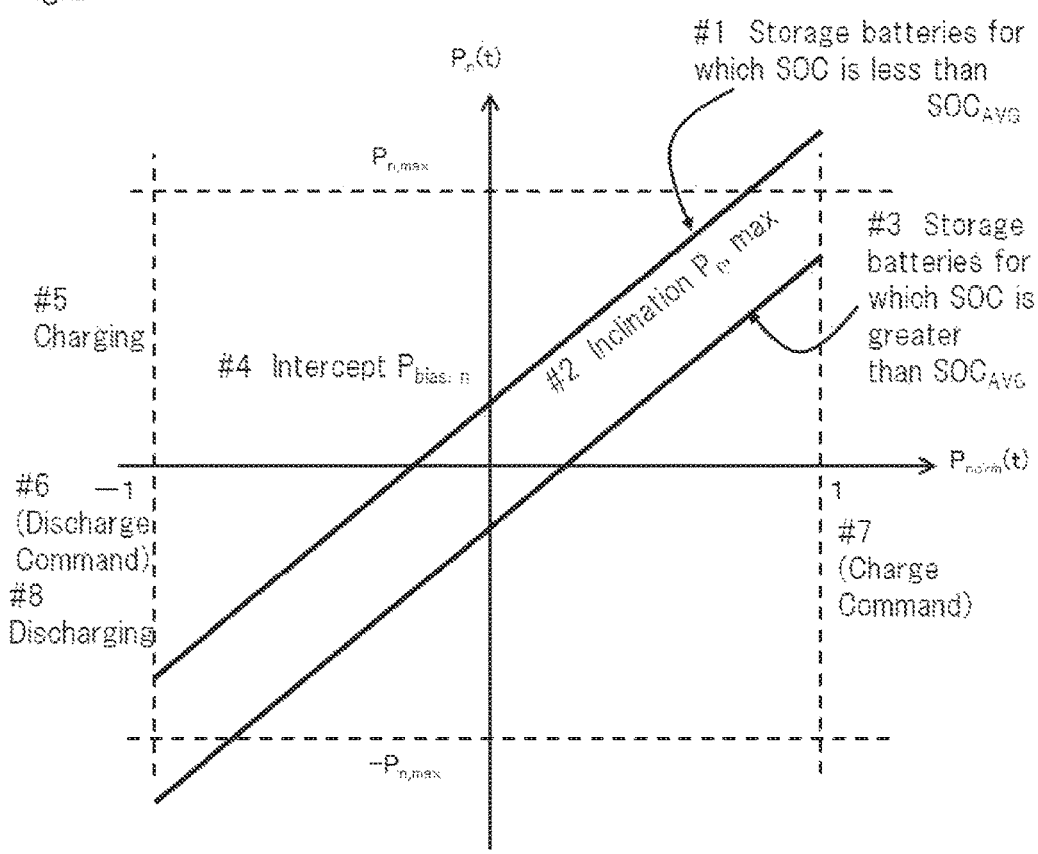
FIG. 24 shows an example of a functional form for converting the normalized supply and demand adjustment amount $P_{norm}(t)$ to charging/discharging amount $P_n(t)$.

The example shown in FIG. 24 is first described.

This example has the object of solving bias of the SOC among the storage batteries to avoid saturation or depletion of the SOC.

Allocation arithmetic unit 1260 acquires SOC as the information of storage batteries 1320 of contracted customers. Allocation arithmetic unit 1260 then defines for storage battery n the supply and demand adjustment capacity $P_{n, max}$ that is to be provided by each storage battery such that $\Sigma_n P_{n, max} = P_{ES, max}$. It is here assumed that {supply and demand adjustment capacity $P_{n, max}$} is defined as a value realized by dividing $P_{ES, max}$ that is weighted by $W_{n, max}$, which is the controllable inverter capacity of storage battery 1320, i.e., such that when expressed as a numerical expression, $P_{n, max} = P_{ES, max} \times W_{n, max} / \Sigma_{n'} W_{n', max}$.

Allocation arithmetic unit 1260 next calculates the bias $P_{bias, n}$ on the basis of the value of the SOC of each storage battery that was previously acquired. The SOC value that is collected by each storage battery n is assumed to be $SOC_n$.

Allocation arithmetic unit 1260 acquires inverter capacity $WH_{n, max}$ from database 1210 and then calculates $SOC_{avg} = \Sigma_n (SOC_n \times WH_{n', max}) / \Sigma_{n'} WH_{n', max}$ that is the SOC when all batteries are viewed as a single battery.

Allocation arithmetic unit 1260 next calculates the difference of SOC $\Delta SOC_n = SOC_{avg} - SOC_n$ for each storage battery, and then apportions offset values in proportion to the difference $\Delta SOC_n$ of SOC such that $\Sigma_n P_{bias, n} = 0$. Allocation arithmetic unit 1260 then creates linear function forms of inclination $P_{n, max}$ and intercept $P_{bias, n}$ such as shown in FIG. 24 for each storage battery and distributes by way of aggregator-side bidirectional communication unit 1270 these function forms to each control device 1310 that control each storage battery n.

The distribution period of the function forms may be shorter than that of the creation period (for example, 10 minutes) of the function forms. In this case, the function forms that are distributed are updated each time a new function form is created. When the function forms are transmitted at a shorter period than the creation period of the function forms, even when control device 1310 is unable to receive a function form due to a communication problem at a particular time, control device 1310 is subsequently able to receive the functional form that could not be received.

Figure 25:
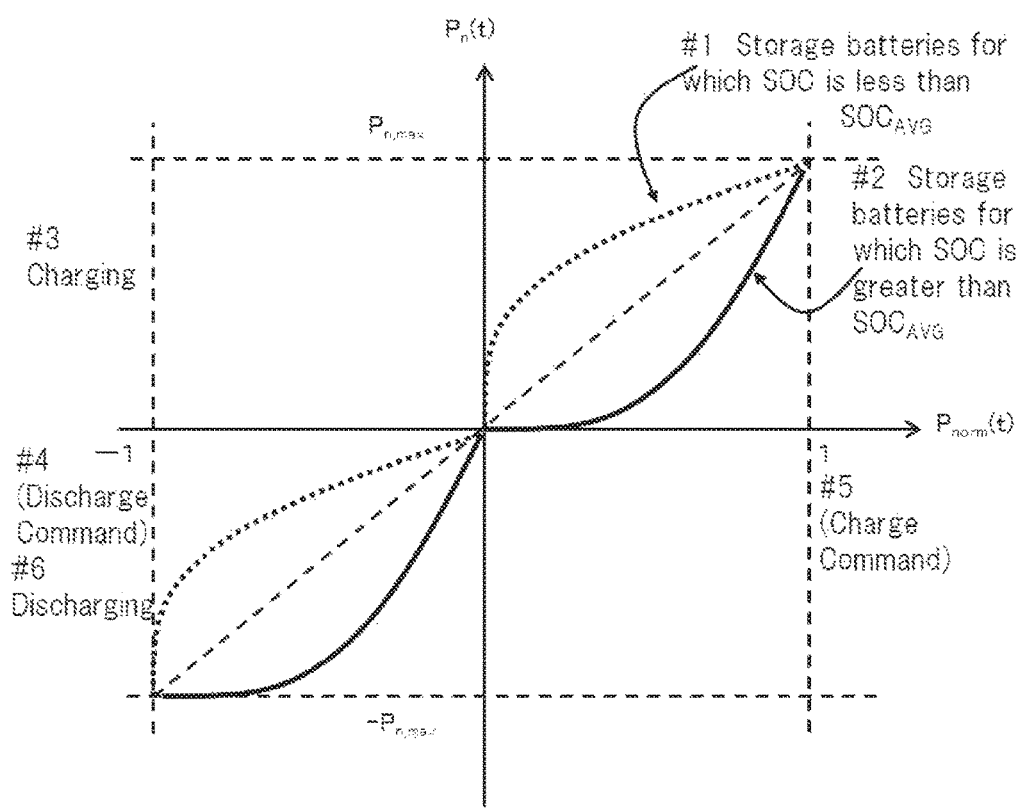
FIG. 25 shows another example of a functional form for converting the normalized supply and demand adjustment amount $P_{norm}(t)$ to charging/discharging amount $P_n(t)$.

As the next example, there is also a method of giving a functional form that does not involve adding a bias and, as shown in FIG. 25, is not linear.

In this example, allocation arithmetic unit 1260, by changing the weighting of charging and discharging, makes the sensitivity relatively low for storage batteries in which the SOC is greater than $SOC_{AVG}$ when the normalized supply and demand adjustment amount $P_{norm}(t)$ is positive, i.e., when charging is requested, and thus compensates to this degree by means of storage batteries for which the SOC is smaller than $SOC_{AVG}$. As a result, although each charging/discharging amount $P_n(t)$ is nonlinear with respect to normalized supply and demand adjustment amount $P_{norm}(t)$, $\Sigma_n P_n(t)$ becomes linear with respect to normalized supply and demand adjustment amount $P_{norm}(t)$ and $P_{ES}(t)=P_{norm}(t) \times P_{ES,\ max}$ can be realized.

As another example, there is also an allotment method for, apart from avoiding saturation and depletion of the SOC as described above, reducing deterioration.

Allocation arithmetic unit 1260 acquires, as the information of storage batteries 1320 of contracted customers, information relating to the deterioration of storage batteries (in the present exemplary embodiment, battery information that represents the degree of tendency toward deterioration of the batteries), for example, SOC and temperature. Allocation arithmetic unit 1260 further decreases the charging/discharging allotment to storage batteries having a tendency to deteriorate due to charging/discharging and increases the charging/discharging allotment to storage batteries having little tendency to deteriorate due to charging/discharging. One example of a storage battery that tends to deteriorate is a storage battery having a temperature that is equal to or greater than a predetermined temperature, and one example of a storage battery that tends not to deteriorate is a storage battery having a temperature below the predetermined temperature. A storage battery tends to deteriorate to the degree that its temperature exceeds a predetermined temperature.

Figure 26:
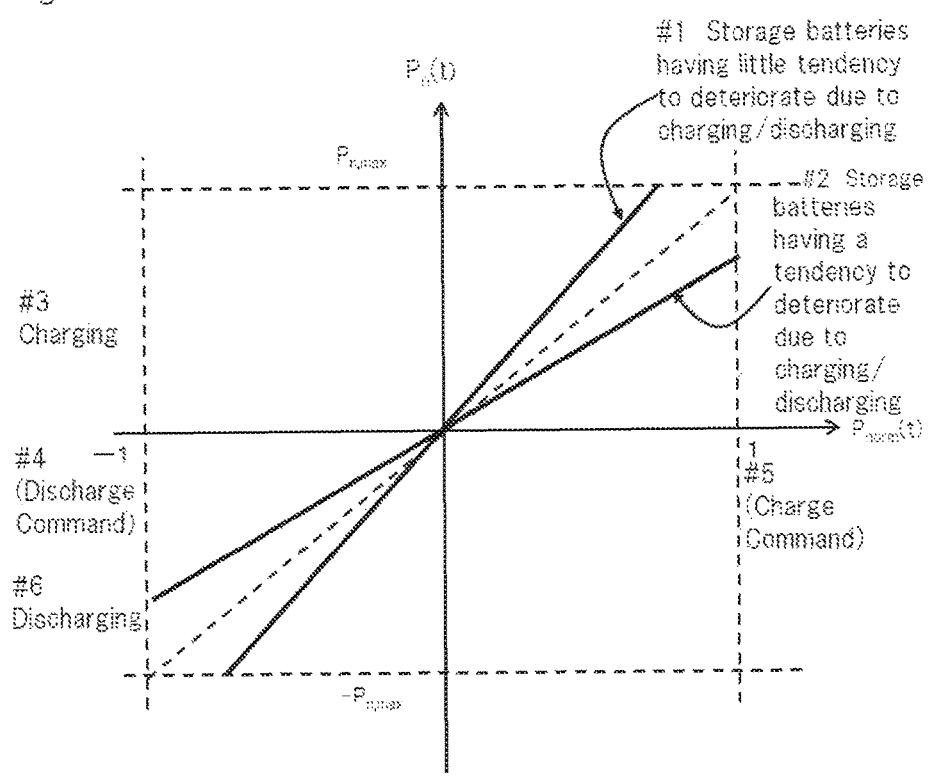
FIG. 26 shows yet another example of a functional form for converting the normalized supply and demand adjustment amount $P_{norm}(t)$ to charging/discharging amount $P_n(t)$.
Figure 27:
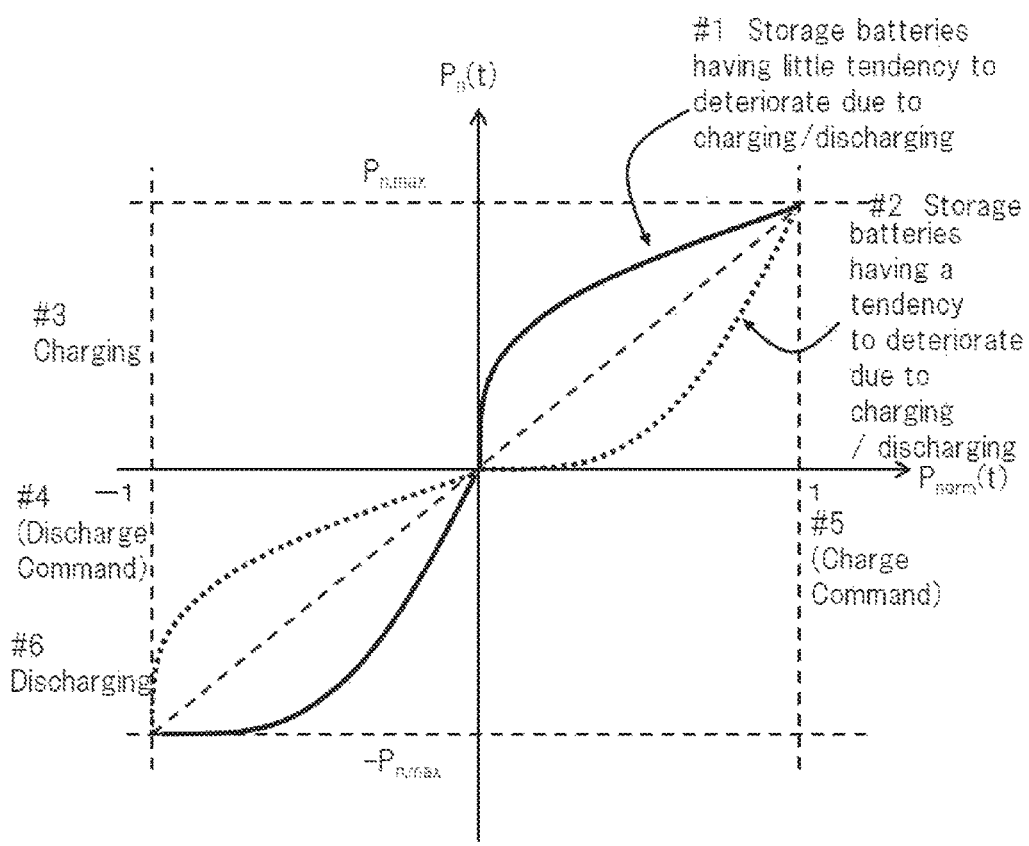
FIG. 27 shows another example of a functional form for converting the normalized supply and demand adjustment amount $P_{norm}(t)$ to charging/discharging amount $P_n(t)$.

As this method, allocation arithmetic unit 1260 changes the inclination as shown in FIG. 26, decreasing the inclination to less than the reference inclination for storage batteries having a tendency to deteriorate due to charging/discharging and increasing the inclination to greater than the reference inclination for storage batteries having little tendency to deteriorate due to charging/discharging. Alternatively, as shown in FIG. 27, there is also a method according to which allocation arithmetic unit 1260, by changing the sensitivity of the charging amount/discharging amount with respect to the normalized supply and demand adjustment amount $P_{norm}(t)$, changes the weighting of charging/discharging of the normalized supply and demand adjustment amount of storage batteries having a tendency to deteriorate due to charging/discharging and storage batteries having little tendency to deteriorate due to charging/discharging.

Figure 28:
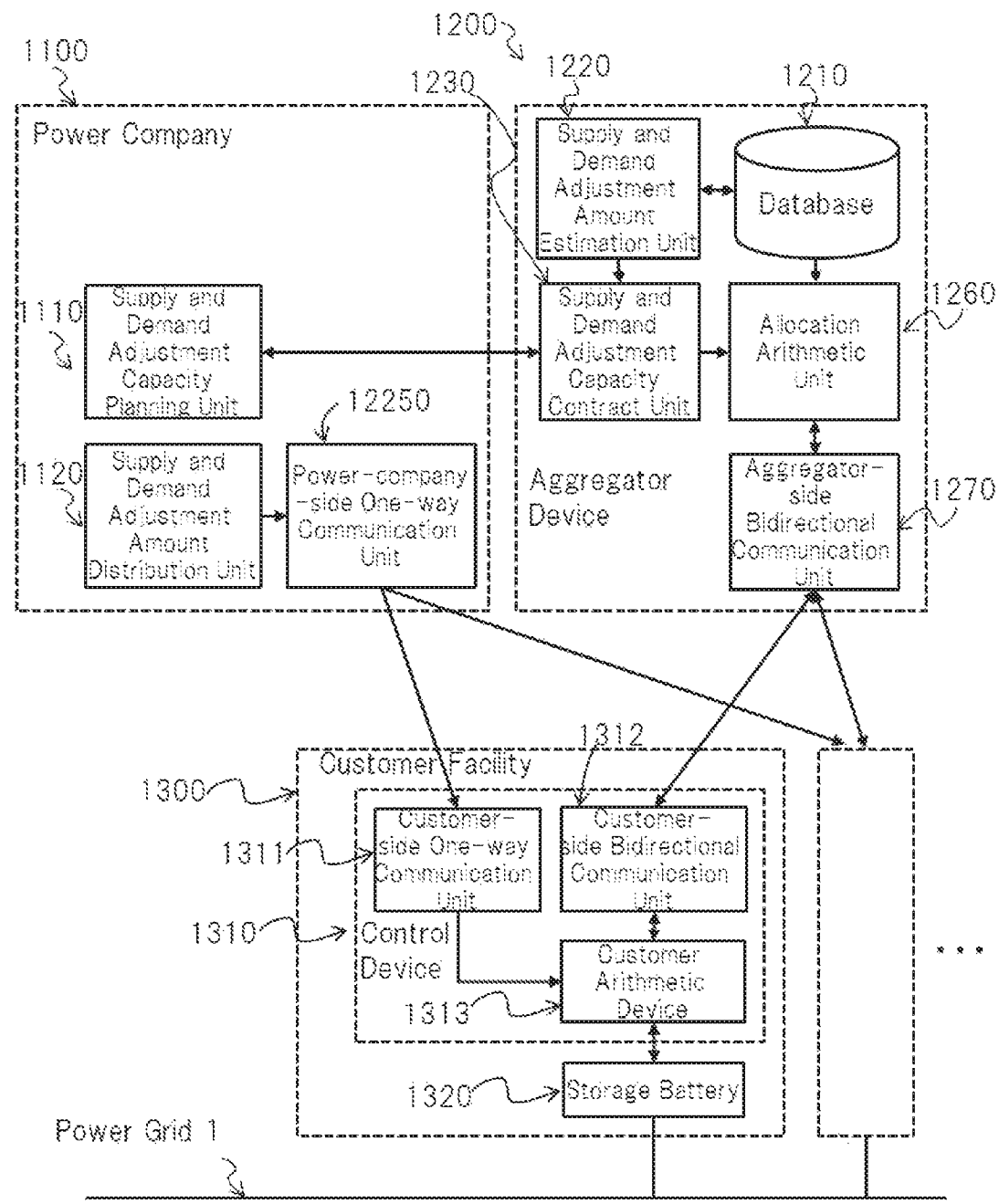
FIG. 28 shows an example of a modification of the configuration of the second exemplary embodiment of the present invention.

In the present exemplary embodiment shown in FIG. 17, aggregator device 1200 distributes the normalized supply and demand adjustment amount $P_{norm}(t)$ to control devices 1310 in customer facilities 1300, but this signal itself is a signal that is common to the provider of other supply and demand adjustment power, for example, a different aggregator or a business having an electric power generator. As a result, the power company itself may be provided with power-company-side one-way communication unit 12250 as shown in FIG. 28, and power-company-side one-way communication unit 12250 may distribute the normalized supply and demand adjustment amount $P_{norm}(t)$ directly to the customer control device 1310 without passing by way of aggregator device 1200. In this case, supply and demand adjustment amount reception unit 1240 and aggregator-side one-way communication unit 1250 become unnecessary.

Figure 29:
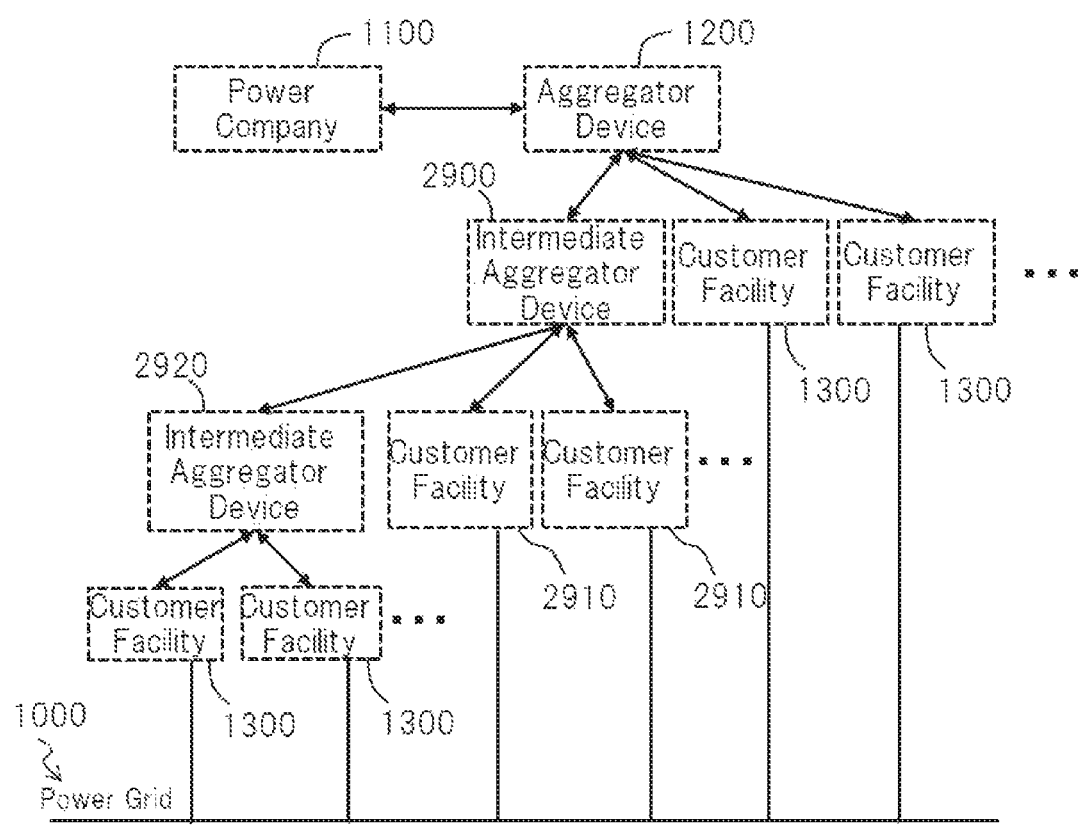
FIG. 29 shows an example of a modification of the configuration of the second exemplary embodiment of the present invention.

FIG. 29 shows an example of a modification of the second exemplary embodiment.

In the configurations shown in FIGS. 17 and 28, the aggregator performs communication with only the control device in one or more customer facilities 1300, collects the states of apparatuses of each customer, and distributes correspondence relation information that is information necessary for calculating charging/discharging amount $P_n(t)$ from the normalized supply and demand adjustment amount $P_{norm}(t)$.

In addition to cases in which a single aggregator communicates with control devices 1310 in all customer facilities 1300, there are also cases in which an aggregator contracts with an intermediate aggregator in addition to customers, as shown in FIG. 29.

In this case, intermediate aggregator device 2900 belonging to an intermediate aggregator collects the states of apparatuses in each contracted customer facility 2910, transmits the collection result to aggregator device 1200, receives correspondence relation information from aggregator device 1200, and transmits the correspondence relation information in accordance with the states of apparatuses in customer facility 2910.

For example, intermediate aggregator device 2900 shrinks the states of apparatuses of each contracted customer facility 2910 to cause resemblance to a single apparatus and transmits the result to aggregator device 1200 as the state of a single apparatus. Aggregator device 1200 is thus able to treat intermediate aggregator device 2900 similarly to customer facility 1300. In this case, intermediate aggregator device 2900 divides and distributes to contracted customer facility 2910 the correspondence relation information for customer facility 1300 that was distributed by aggregator device 1200.

As the method by which intermediate aggregator device 2900 shrinks the states of apparatuses of each contracted customer facility 2910 as if for a single apparatus, there is a method by which, when the apparatuses are storage batteries, the average SOC of all storage batteries is made the state of the apparatus.

In addition, there is also a case in which intermediate aggregator devices 2900 are stratified and intermediate aggregator devices 2900 further form a contract with intermediate aggregator device 2920. There are further cases in which intermediate aggregators are also customers.

In the present exemplary embodiment, allocation arithmetic unit 1260 generates function forms that represent the correspondence relation between the normalized supply and demand adjustment amount $P_{norm}(t)$ and charging/discharging $P_n(t)$ on the basis of supply and demand adjustment capacity $P_{ES,\ max}$ and the SOC of storage batteries 1320. Customer arithmetic device 1313 uses the function forms to specify charging/discharging amount $P_n(t)$ that corresponds to the normalized supply and demand adjustment amount $P_{norm}(t)$. Customer arithmetic device 1313 causes storage batteries 1320 to execute charging or discharging at this charging/discharging amount $P_n(t)$.

As a result, charging/discharging amount $P_n(t)$ can be set for each storage battery 1320.

In addition, allocation arithmetic unit 1260 is able to reduce deterioration of all storage batteries if the allotted amount is reduced to the degree of the tendency toward deterioration of the storage battery.

Aggregator device 1200 may be realized by a computer. In this case, the computer reads and executes a program that is recorded on a recording medium that can be read by the computer and executes each of the functions belonging to aggregator device 1200.

Still further, control device 1310 may be realized by a computer. In this case, the computer reads and executes a program that is recorded on a recording medium that can be read by the computer and executes each of the functions belonging to control device 1310.

Third Exemplary Embodiment

The third exemplary embodiment of the present invention is next described.

Figure 30:
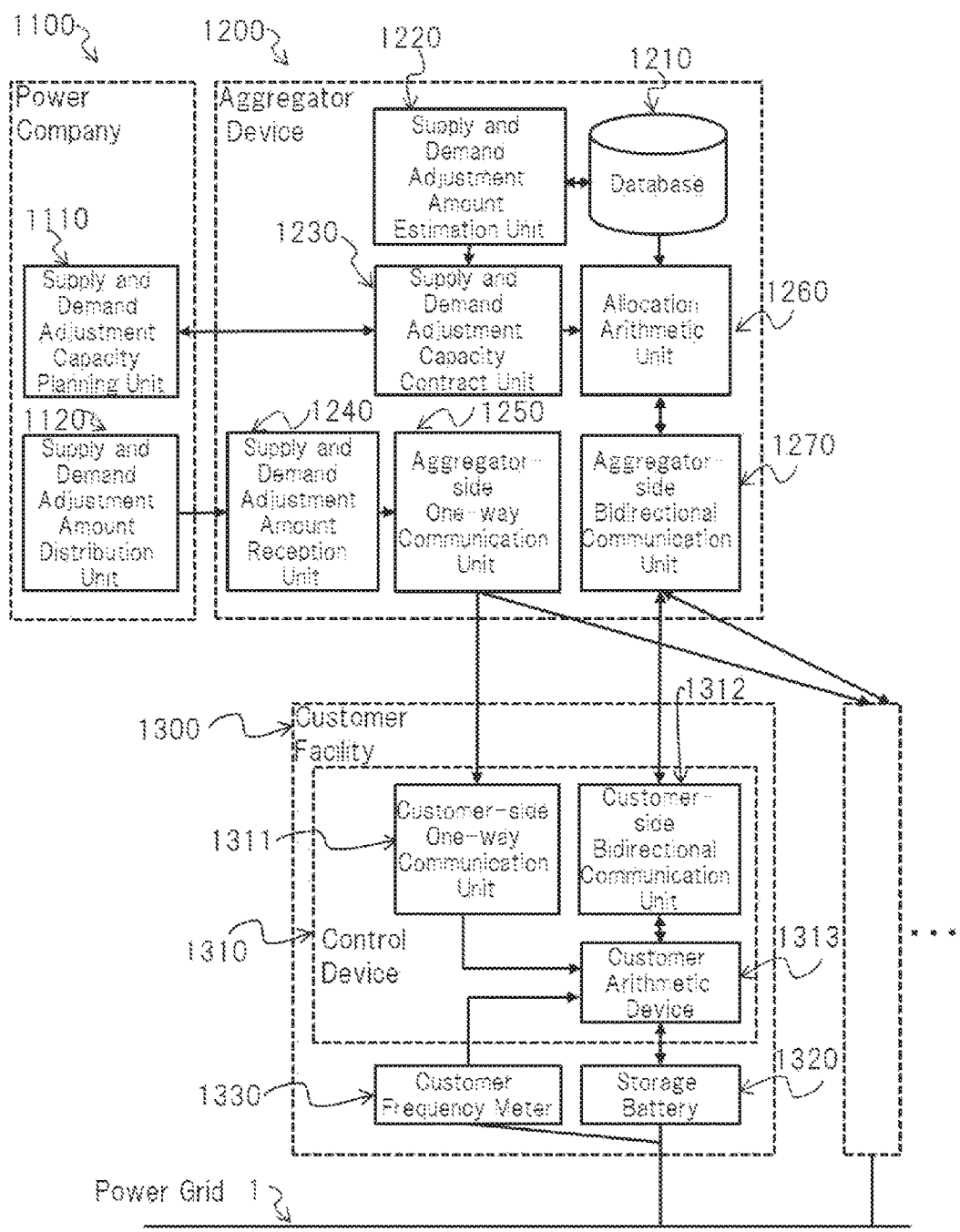
FIG. 30 shows an example of the configuration of the third exemplary embodiment of the present invention.

FIG. 30 shows an example of the configuration of the present exemplary embodiment.

The system of the present exemplary embodiment is of a configuration in which customer frequency meter 1330 has been added to the system of the second exemplary embodiment shown in FIG. 17. Functions as will be described hereinbelow relating to customer arithmetic device 1313 are added. Functions other than these functions are identical to the functions shown in FIG. 17.

Customer frequency meter 1330 measures the grid frequency of a power grid that is connected to storage batteries 1320, for example, values in the vicinity of 50 Hz or in the vicinity of 60 Hz.

The system of the present exemplary embodiment is assumed to be used in conditions of lower communication reliability.

The system of the present exemplary embodiment has the object of enabling storage batteries 1320 to perform charging/discharging for the supply and demand adjustment of power grid 1 even under conditions in which problems occur in the one-way communication between aggregator-side one-way communication unit 1250 and customer-side one-way communication unit 1311, and customer-side one-way communication unit 1311 cannot receive normalized supply and demand adjustment amount $P_{norm}(t)$ every second.

The operations of this system are next described.

The following explanation focuses on the operations of customer arithmetic device 1313 and the operations of customer frequency meter 1330. The functions of other parts are similar to functions belonging to the second exemplary embodiment shown in FIG. 17.

To calculate charging/discharging amount $P_n(t)$ of storage batteries 1320 belonging to customers in the second exemplary embodiment shown in FIG. 17, customer arithmetic device 1313 used normalized supply and demand adjustment amount $P_{norm}(t)$ that is received by way of communication every second and function forms (illustrated in FIGS. 24, 25, 26, and 27) for calculating charging/discharging amount $P_n(t)$ from the normalized supply and demand adjustment amount $P_{norm}(t)$.

In the system of the present exemplary embodiment shown in FIG. 30, in addition to the acquisition of $P_{norm}(t)$ by way of customer-side one-way communication unit 1311, customer arithmetic device 1313 calculates $P_{norm}(t)$ from the grid frequency that is measured by customer frequency meter 1330 by a method that will be described hereinbelow.

When able to acquire the normalized supply and demand adjustment amount $P_{norm}(t)$ by way of customer-side one-way communication unit 1311, customer arithmetic device 1313 uses this value as the supply and demand adjustment amount $P_{norm}(t)$.

On the other hand, when unable to acquire the normalized supply and demand adjustment amount $P_{norm}(t)$ by way of customer-side one-way communication unit 1311 for a fixed time interval (for example, equal to or greater than 2 seconds), customer arithmetic device 1313 determines an abnormality. Upon determining an abnormality, customer arithmetic device 1313 uses the grid frequency that was measured by customer frequency meter 1330 to calculate the normalized supply and demand adjustment amount. Customer arithmetic device 1313 next uses this calculation result (normalized supply and demand adjustment amount $P_{norm}(t)$) to calculate the charging/discharging amount $P_n(t)$.

A method is here shown by which customer arithmetic device 1313 calculates the normalized supply and demand adjustment amount $P_{norm}(t)$ from the grid frequency that was measured by customer frequency meter 1330.

The imbalance between supply and demand of a power grid is typically proportional to the amount of deviation from the reference frequency (50 Hz or 60 Hz) of power grid 1.

As a result, customer arithmetic device 1313, having settled beforehand with power company 1100 what type of control over supply and demand adjustment is to be executed by storage batteries 1320, calculates the normalized supply and demand adjustment amount $P_{norm}(t)$ by a calculation method that accords with the supply and demand adjustment function.

For example, when the control of supply and demand adjustment that was contracted with the power company is governor-free control, which is proportional control of imbalance, customer arithmetic device 1313 calculates the normalized supply and demand adjustment amount $P_{norm}(t)$ by multiplying the amount of deviation from the reference frequency by a coefficient. When the control of supply and demand adjustment that was contracted with the power company is load frequency control, which is integral control of imbalance, customer arithmetic device 1313 calculates the normalized supply and demand adjustment amount $P_{norm}(t)$ by multiplying the integral value of the amount of deviation from the reference frequency by a coefficient. Because the coefficient used here changes slowly according to the load of the grid and the state of electric power generators, the coefficient is transmitted to customer facility 1300 simultaneous with the distribution of the function form that uses the normalized supply and demand adjustment amount $P_{norm}(t)$ to calculate charging/discharging amount $P_n(t)$.

The value of normalized supply and demand adjustment amount $P_{norm}(t)$ that is transmitted by way of communication in some cases differs from the value of normalized supply and demand adjustment amount $P_{norm}(t)$ that is estimated by the grid frequency. The reason for this difference is as follows. The normalized supply and demand adjustment amount $P_n(t)$ that is estimated from the grid frequency represents the imbalance between demand and supply in the entire power grid. As a result, when the power grid of the contracted power company is connected to the power grid of another power company, imbalance that occurs in the power grid of the other power company also appears in the grid frequency. However, this difference can be ignored because the difference is small, and the reaction to imbalance that occurs on the power grid of the other power company also leads to supply and demand stabilization of the grid.

According to the present exemplary embodiment, when customer-side one-way communication unit 1311 cannot receive the normalized supply and demand adjustment amount $P_{norm}(t)$, customer arithmetic device 1313 calculates the normalized supply and demand adjustment amount $P_{norm}(t)$ from the grid frequency that was measured by customer frequency meter 1330. Customer arithmetic device 1313 then uses the calculation result (the normalized supply and demand adjustment amount $P_{norm}(t)$) and the function form for calculating the charging/discharging amount $P_n(t)$ from the normalized supply and demand adjustment amount $P_{norm}(t)$ to calculate charging/discharging amount $P_n(t)$.

As a result, charging/discharging amount $P_n(t)$ can be calculated even when the normalized supply and demand adjustment amount $P_{norm}(t)$ cannot be received by one-way communication. In addition, controlling the operation (charging and discharging) of storage batteries 1320 in accordance with the calculation result (charging/discharging amount $P_n(t)$) enables the adjustment of the balance between supply and demand of electric power.

Fourth Exemplary Embodiment

The fourth exemplary embodiment of the present invention is next described.

Figure 31:
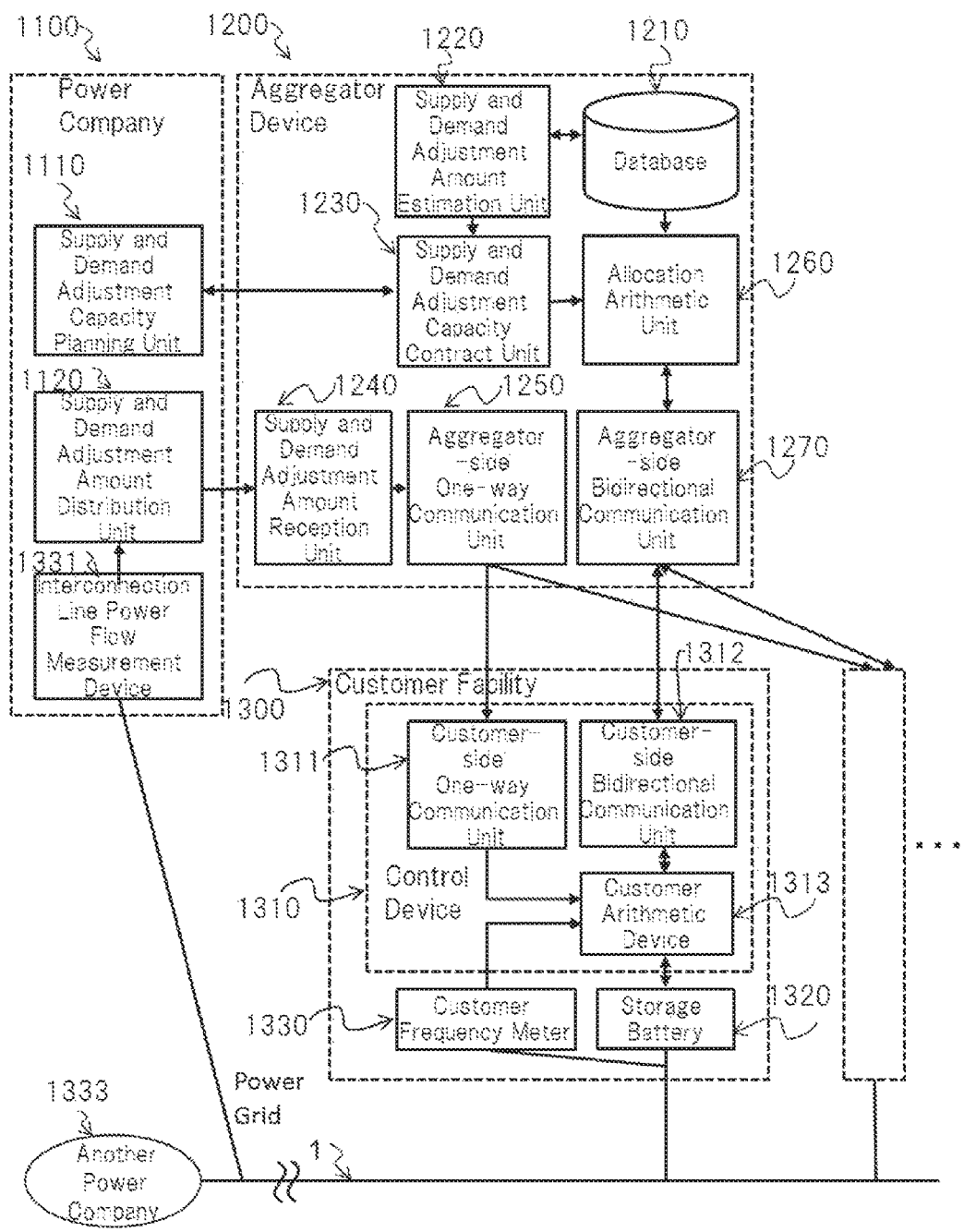
FIG. 31 shows an example of the configuration of the fourth exemplary embodiment of the present invention.

FIG. 31 shows an example of the configuration of the present exemplary embodiment.

The system of the present exemplary embodiment is realized by the addition of interconnection line power flow measurement device 1331 and another power company 1333 to the system of the third exemplary embodiment shown in FIG. 30. Regarding supply and demand adjustment amount distribution unit 1120 and customer arithmetic device 1313, the operations differ as described hereinbelow. The functions are otherwise identical to the functions of the configurations shown in FIG. 30 and FIG. 17.

The system of the present exemplary embodiment, by decreasing dependence upon communication, allows storage batteries of customers to be used with high reliability to correct imbalance between supply and demand of power grid 1 even under conditions of low communication reliability.

The operations of this system are next described.

The following explanation focuses on the operations of supply and demand adjustment amount distribution unit 1120 and the operations of customer arithmetic device 1313. The functions of other parts are similar to the functions belonging to the second exemplary embodiment shown in FIG. 17 and the third exemplary embodiment shown in FIG. 30.

An example is first described of the methods by which supply and demand adjustment amount distribution unit 1120 calculates the supply and demand adjustment amount in the second exemplary embodiment shown in FIG. 17 and the third exemplary embodiment shown in FIG. 30.

Supply and demand adjustment amount distribution unit 1120 first calculates the imbalance between supply and demand of the overall power grid from the measured value of the grid frequency.

Supply and demand adjustment amount distribution unit 1120 next subtracts the portion of imbalance between the demand and supply in the power grid of the other power company that is measured using an interconnection line power flow measurement device (not shown in the figure) from the calculation result (the imbalance between the demand and supply of the overall power grid) to calculate the normalized supply and demand adjustment amount $P_{norm}(t)$.

Supply and demand adjustment amount distribution unit 1120 next distributes the normalized supply and demand adjustment amount $P_{norm}(t)$ to aggregator 1200.

On the other hand, in the system of the present exemplary embodiment shown in FIG. 31, supply and demand adjustment amount distribution unit 1120 distributes to aggregator 1200, in place of the normalized supply and demand adjustment amount $P_{norm}(t)$, the power flow $P_{tie}(t)$ on the interconnection line with another power company 1333 that is the measured value in interconnection line power flow measurement device 1331.

Supply and demand adjustment amount reception unit 1240, aggregator-side one-way communication unit 1250, and customer-side one-way communication unit 1311 similarly communicate the power flow $P_{tie}(t)$ on the interconnection line in place of the normalized supply and demand adjustment amount $P_{norm}(t)$, and customer arithmetic device 1313 receives from customer-side one-way communication unit 1311 the power flow $P_{tie}(t)$ on the interconnection line.

Customer arithmetic device 1313 calculates the imbalance between demand and supply in the overall grid from the grid frequency that was measured by customer frequency meter 1330 and subtracts the power flow $P_{tie}(t)$ on the interconnection line from this calculation result (carries out subtraction).

Customer arithmetic device 1313 next multiplies this subtraction result by the coefficient that was used when calculating the normalized supply and demand adjustment amount $P_{norm}(t)$ from the grid frequency as was shown in the third exemplary embodiment to calculate the normalized supply and demand adjustment amount $P_{norm}(t)$.

In the present exemplary embodiment, customer arithmetic device 1313 obtains the normalized supply and demand adjustment amount $P_{norm}(t)$ on the basis of the grid frequency that was measured by customer frequency meter 1330 and the power flow $P_{tie}(t)$ on the interconnection line that was received by customer-side one-way communication unit 1311.

Compared to the fluctuation of the grid frequency, the fluctuation of the power flow $P_{tie}(t)$ on the interconnection line is usually extremely slow. As a result, compared to the fluctuation of the normalized supply and demand adjustment amount $P_{norm}(t)$ that fluctuates in accordance with the grid frequency, the fluctuation of the power flow $P_{tie}(t)$ on the interconnection line is usually extremely slow. The frequency of updating the value of power flow $P_{tie}(t)$ on the interconnection line by carrying out communication (one-way communication) can therefore be made far lower than the frequency of updating the value of the normalized supply and demand adjustment amount $P_{norm}(t)$.

Accordingly, decreasing the frequency of communication between aggregator-side one-way communication unit 1250 and customer-side one-way communication unit 1311 (for example, once every minute) enables a reduction of communication traffic and raises the resistance to delays.

Fifth Exemplary Embodiment

The fifth exemplary embodiment of the present invention is next described.

Figure 32:
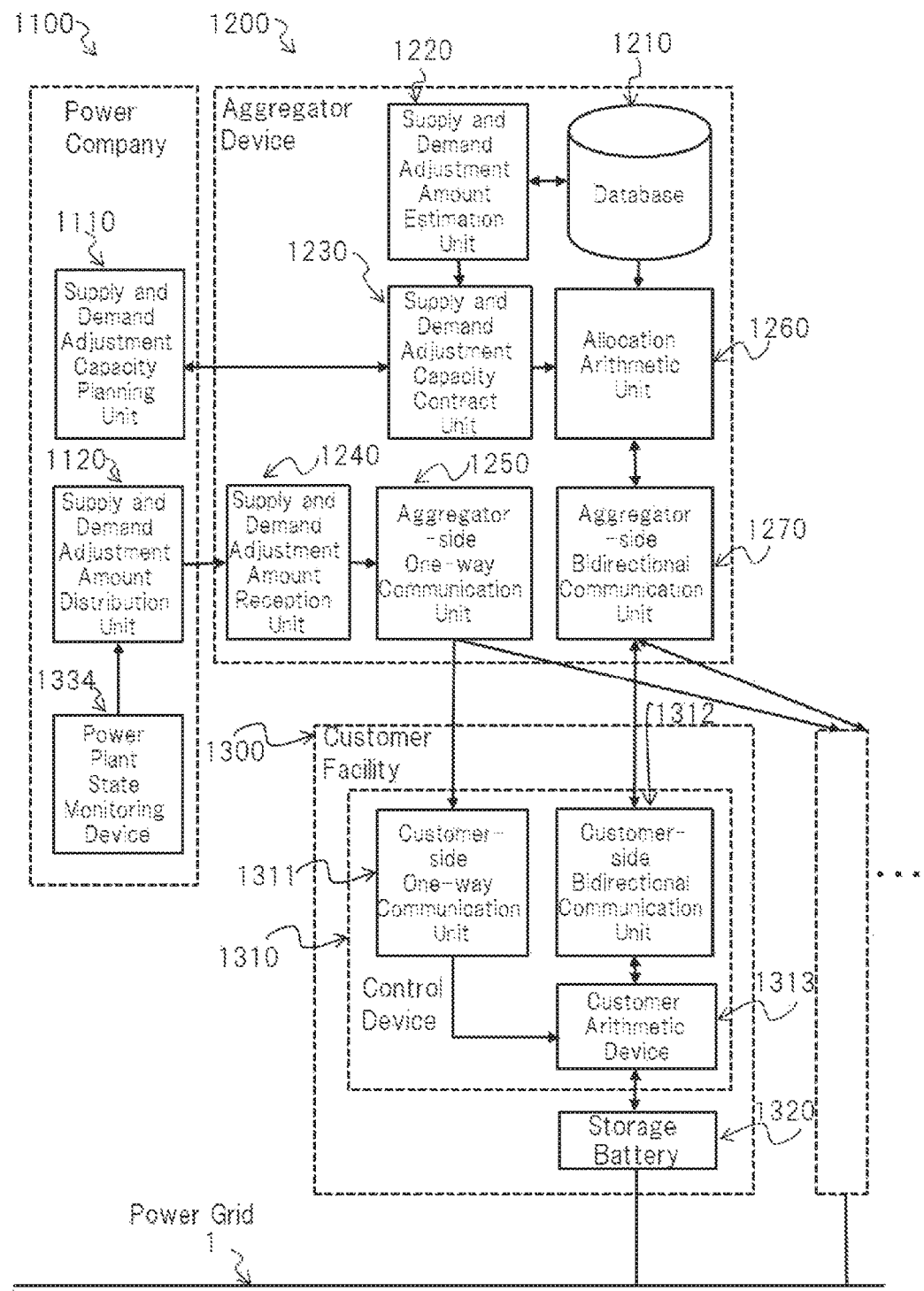
FIG. 32 shows an example of the configuration of the fifth exemplary embodiment of the present invention.

FIG. 32 shows an example of the configuration of the present exemplary embodiment.

The system of the present exemplary embodiment shown in FIG. 32 is realized by adding power plant state monitoring device 1334 to the system shown in FIG. 17. Regarding supply and demand adjustment amount distribution unit 1120, the functions are altered as will be described hereinbelow. The other functions are identical to the functions described in FIG. 17.

Power plant state monitoring device 1334 monitors parallel-off caused by malfunctions of a power plant, and in the event of a parallel-off, informs supply and demand adjustment amount distribution unit 1120 of the parallel-off.

In the system of the present exemplary embodiment, a function referred to as spinning reserve for giving auxiliary assistance to a power plant when the supply of power becomes insufficient in a fixed time interval due to a malfunction of the power plant can be provided to storage batteries belonging to a customer.

The operations of this system are next described.

The following explanation focuses on the operations of supply and demand adjustment amount distribution unit 1120. Functions of other parts are similar to the functions belonging to the second exemplary embodiment shown in FIG. 17.

In the second exemplary embodiment shown in FIG. 17, supply and demand adjustment amount distribution unit 1120 calculates the imbalance between demand and supply, calculates the normalized supply and demand adjustment amount $P_{norm}(t)$ on the basis of this calculation result, and distributes the normalized supply and demand adjustment amount $P_{norm}(t)$ to aggregator device 1200.

On the other hand, in the system of the present exemplary embodiment shown in FIG. 32, supply and demand adjustment amount distribution unit 1120 operates as shown hereinbelow.

Upon receiving parallel-off information of a power plant from power plant state monitoring device 1334, supply and demand adjustment amount distribution unit 1120 calculates the normalized supply and demand adjustment amount $P_{norm}(t)$ such that the generated power that was allotted beforehand to the power plant is discharged by the entire plurality of storage batteries 1320.

Supply and demand adjustment amount distribution unit 1120 next distributes this calculation result (the normalized supply and demand adjustment amount $P_{norm}(t)$) to aggregator device 1200.

Supply and demand adjustment amount distribution unit 1120 then continues to command aggregator device 1200 to discharge for a period of from several seconds to several hours until another power plant starts up, another power plant increases power, or the malfunctioning power plant recovers and the supply can be made stable again.

According to the present exemplary embodiment, power plant state monitoring device 1334 monitors the parallel-off due to, for example, malfunctioning of a power plant and upon recognizing a parallel-off, informs supply and demand adjustment amount distribution unit 1120 of the occurrence of the parallel-off. Upon receiving the parallel-off information of a power plant, supply and demand adjustment amount distribution unit 1120 calculates the normalized supply and demand adjustment amount $P_{norm}(t)$ such that the power generation that was allotted beforehand to the power plant is discharged by the entire plurality of storage batteries 1320. Supply and demand adjustment amount distribution unit 1120 then distributes the calculation result (the normalized supply and demand adjustment amount $P_{norm}(t)$) to aggregator device 1200. In aggregator device 1200, aggregator-side one-way communication unit 1250, upon receiving the normalized supply and demand adjustment amount $P_{norm}(t)$ by way of supply and demand adjustment amount reception unit 1240, transmits the normalized supply and demand adjustment amount $P_{norm}(t)$ to each customer facility 1300.

As a result, the function referred to as spinning reserve, in which auxiliary assistance is provided to a power plant when supply of electric power becomes insufficient for a fixed time interval due to malfunctioning of the power plant, can be implemented using storage batteries 1320 belonging to customers.

In the system of the present exemplary embodiment, the functions of devices belonging to customer facility 1300 can be made common to components for the supply and demand adjustment shown in FIGS. 17, 30, and 31, and through the coexistence of these components, the contribution to power grid 1 by storage batteries belonging to customers can be expanded.

In addition, in the third to fifth exemplary embodiments, aggregator device 1200 may be realized by a computer. In this case, the computer reads and executes a program that is recorded on a recording medium that can be read by the computer to execute each function belonging to aggregator device 1200.

In addition, in the third to fifth exemplary embodiments, control device 1310 may be realized by a computer. In this case, the computer reads and executes a program that is recorded on a recording medium that can be read by the computer to execute each function belonging to control device 1310.

Still further, in FIGS. 17, 28, and 30-32, when the amount of information of the adjustment power amount is less than the amount of information of the operation control information, bidirectional communication may be used as the communication between aggregator-side one-way communication unit 1250 and customer-side one-way communication unit 1311 and the communication between power-company-side one-way communication unit 12250 and customer-side one-way communication unit 1311.

In this case, an aggregator-side bidirectional communication unit, a customer-side bidirectional communication unit, and a power-company-side bidirectional communication unit are used in place of aggregator-side one-way communication unit 1250, customer-side one-way communication unit 1311, and power-company-side one-way communication unit 12250.

For example, communication between aggregator-side one-way communication unit 1250 and customer-side one-way communication unit 1311 is carried out by aggregator-side bidirectional communication unit 1270 and customer-side bidirectional communication unit 1312, and communication between power-company-side one-way communication unit 12250 and customer-side one-way communication unit 1311 is carried out by a power-company-side bidirectional communication unit and customer-side bidirectional communication unit 1312.

In each of the above-described exemplary embodiments, the configurations shown in the figures are merely examples, and the present invention is not limited to these configurations.

Although the invention of the present application has been described with reference to exemplary embodiments, the invention of the present application is not limited to the above-described exemplary embodiments. The configuration and details of the invention of the present application are open to various modifications within the scope of the invention of the present application that will be clear to one of ordinary skill in the art. This application claims the benefits of priority based on Japanese Patent Application No. 2013-189240 for which application was submitted on Sep. 12, 2013 and incorporates by citation all of the disclosures of that application.

EXPLANATION OF THE REFERENCE NUMBERS 1000 power control system
1 power grid
2 solar power generation unit
3 power storage device
4 thermal power generator
5 distribution transformer
6 distribution lines
7 load
8 other power grid
9 interconnection line
100 local charging/discharging device
101 detection unit
102 communication unit
103 comprehension unit
104 arithmetic unit
200 storage battery SCADA
201 communication unit
202 database
203 comprehension unit
204 arithmetic unit
300 central load dispatching office
300A power-supply command unit
301 frequency meter
302 power flow detection unit
303, 304 communication unit
305 arithmetic unit
1110 supply and demand adjustment capacity planning unit
1120 supply and demand adjustment amount distribution unit
1200 aggregator device
1210 database
1220 supply and demand adjustment amount estimation unit
1230 supply and demand adjustment capacity contract unit
1240 supply and demand adjustment amount reception unit
1250 aggregator-side one-way communication unit
1260 allocation arithmetic unit
1270 aggregator-side bidirectional communication unit
1300, 2910 customer facility
1310 control device
1311 customer-side one-way communication unit
1312 customer-side bidirectional communication unit
1313 customer arithmetic device
1320 storage battery
1330 customer frequency meter
1331 interconnection line power flow measurement device
1334 power plant state monitoring device
2900, 2920 intermediate aggregator device
12250 power-company-side one-way communication unit

The invention claimed is:

1. A control device that controls the operation of a supply and demand adjustment device that is connected to a power grid, comprising:
   detection means that detects the state of said supply and demand adjustment device;
   communication means that transmits the detection result of said detection means to an external device and that receives from said external device operation control information for controlling the operation of said supply and demand adjustment device at predetermined intervals, and that receives an adjustment power amount at intervals that are shorter than said predetermined intervals; and
   control means that, based on said adjustment power amount and said operation control information, controls the operation of said supply and demand adjustment device.

2. The control device according to claim 1, wherein said adjustment power amount is transmitted from an external device.

3. The control device according to claim 1, wherein said operation control information is generated on the basis of:
   the state of said supply and demand adjustment device that is detected by said detection means; and
   the amount of power that is allotted to all supply and demand adjustment devices that are controlled by N (where N is a number equal to or greater than 1) of said control devices.

4. The control device according to claim 3, wherein:
   said operation control information is the ratio of the total amount of the chargeable/dischargeable capacity in said supply and demand adjustment device and the amount of power allotted to all said supply and demand adjustment devices; and
   said control means determines the amount of power of each of said supply and demand adjustment device on the basis of said adjustment power amount and said ratio.

5. The control device according to claim 1, wherein said control means controls the operation of said supply and demand adjustment device on the basis of the state of said supply and demand adjustment device that is detected by said detection means.

6. The control device according to claim 1, wherein said adjustment power amount is an amount determined on the basis of power flow of an interconnection line by which said power grid is connected to another power grid, and the grid frequency of said power grid.

7. The control device according to claim 1, wherein said adjustment power amount is the same as the adjustment power amount that is received by another control device.

8. A control device that controls the operation of a supply and demand adjustment device that is connected to a power grid, comprising:
   detection means that detects the state of said supply and demand adjustment device;
   communication means that transmits to an external device the detection result of said detection means and that receives from said external device operation control information for controlling the operation of said supply and demand adjustment device at predetermined intervals, and that receives an adjustment power amount at intervals that are shorter than said predetermined intervals; and
   control means that, based on said adjustment power amount, said operation control information and the state of said supply and demand adjustment device that was detected by said detection means, controls the operation of said supply and demand adjustment device.

9. A control device that controls the operation of a supply and demand adjustment device that is connected to a power grid, comprising:
   detection means that detects the state of said supply and demand adjustment device;
   communication means that transmits to an external device the detection result of said detection means and that receives from said external device operation control information for controlling the operation of said supply and demand adjustment device at predetermined intervals, and that receives an adjustment power amount, transmitted from an external device that differs from said external device, at intervals shorter than said predetermined intervals; and control means that, based on said adjustment power amount and said operation control information, controls the operation of said supply and demand adjustment device.

10. A control device that controls the operation of a supply and demand adjustment device that is connected to a power grid, comprising:

detection means that detects the state of said supply and demand adjustment device;

communication means that transmits to an external device the detection result of said detection means and that receives from said external device operation control information for controlling the operation of said supply and demand adjustment device at predetermined intervals, and that receives an adjustment power amount, determined based on the power flow of an interconnection line that connects said power grid and another power grid and based on the grid frequency of said power grid, at intervals that are shorter than said predetermined intervals; and control means that, based on said adjustment power amount and said operation control information, controls the operation of said supply and demand adjustment device.

11. A control device that controls the operation of a supply and demand adjustment device that is connected to a power grid, comprising:

detection means that detects the degree of tendency for said supply and demand adjustment device to deteriorate;

communication means that transmits to an external device the detection result of said detection means and that receives from said external device operation control information for controlling the operation of said supply and demand adjustment device at predetermined intervals, and that receives an adjustment power amount at intervals that are shorter than said predetermined intervals; and control means that, based on said adjustment power amount and said operation control information, controls the operation of said supply and demand adjustment device;

wherein said control means reduces the operating load of said supply and demand adjustment device in proportion to the tendency of the supply and demand adjustment device to deteriorate.

12. A power storage device that contains a battery that is connected to a power grid, comprising:

detection means that detects the state of said battery;

communication means that transmits to an external device the detection result of said detection means and that receives from said external device operation control information for controlling the operation of said battery at predetermined intervals, and that receives an adjustment power amount, transmitted by bidirectional communication or one-way communication, at intervals that are shorter than said predetermined intervals; and control means that, based on said adjustment power amount and said operation control information, controls the operation of said battery.

13. A power storage device that contains a battery that is connected to a power grid, comprising:

detection means that detects the state of said battery;

communication means that transmits to an external device the detection result of said detection means and that receives from said external device operation control information for controlling the operation of said battery at predetermined intervals, and that receives an adjustment power amount at intervals that are shorter than said predetermined intervals; and control means that, based on said adjustment power amount, said operation control information and the state of said battery that was detected by said detection means, controls the operation of said battery.

14. A power storage device that contains a battery that is connected to a power grid, comprising:

detection means that detects the state of said battery;

communication means that transmits to an external device the detection result of said detection means and that receives from said external device operation control information for controlling the operation of said battery at predetermined intervals, and that receives an adjustment power amount, transmitted from an external device that differs from said external device, at intervals that are shorter than said predetermined intervals; and control means that, based on said adjustment power amount and said operation control information, controls the operation of said battery.

15. A power storage device that contains a battery that is connected to a power grid, comprising:

detection means that detects the state of said battery;

communication means that transmits to an external device the detection result of said detection means and that receives from said external device operation control information for controlling the operation of said battery at predetermined intervals, and that receives an adjustment power amount, determined based on the power flow of an interconnection line that connects said power grid to another power grid and based on the grid frequency of said power grid, at intervals that are shorter than said predetermined intervals; and control means that, based on said adjustment power amount and said operation control information, controls the operation of said battery.

16. A power storage device that contains a battery that is connected to a power grid, comprising:

detection means that detects the state of said battery;

communication means that transmits to an external device the detection result of said detection means and that receives from said external device correspondence relation information at predetermined intervals that indicates the correspondence relation between an adjustment power amount, received at intervals that are shorter than said predetermined intervals, and an allotted amount of each battery with respect to the electric power amount that is allotted to all batteries controlled by N (where N is a number equal to or greater than 2) of said power storage devices; and control means that uses said correspondence relation information to specify the allotted amount of said battery that corresponds to said adjustment power amount and causes said battery to charge or discharge at the allotted amount.

17. A power storage device that contains a battery that is connected to a power grid, comprising:

detection means that detects the degree of tendency for said battery to deteriorate;

communication means that transmits to an external device the detection result of said detection means and that receives from said external device operation control information for controlling the operation of said battery at predetermined intervals, and that receives an adjustment power amount at intervals that are shorter than said predetermined intervals; and control means that, based on said adjustment power amount and said operation control information, controls the operation of said battery;

wherein said control means reduces the operating load of said battery in proportion to the tendency of said battery to deteriorate.

18. A control method performed by a control device that controls the operation of a supply and demand adjustment device that is connected to a power grid, comprising steps of:

detecting the state of said supply and demand adjustment device;

transmitting to an external device the state of said supply and demand adjustment device and receiving from said external device operation control information for controlling the operation of said supply and demand adjustment device at predetermined intervals;

receiving an adjustment power amount, transmitted by bidirectional communication or one-way communication, at intervals that are shorter than said predetermined intervals; and controlling the operation of said supply and demand adjustment device based on said adjustment power amount and said operation control information.

19. A control method performed by a control device that controls the operation of a supply and demand adjustment device that is connected to a power grid, comprising steps of:

detecting the state of said supply and demand adjustment device;

transmitting to an external device the state of said supply and demand adjustment device and receiving from said external device operation control information for controlling the operation of said supply and demand adjustment device at predetermined intervals;

receiving an adjustment power amount at intervals that are shorter than said predetermined intervals; and controlling the operation of said supply and demand adjustment device based on said adjustment power amount, said control information and the state of said supply and demand adjustment device.

20. A control method performed by a control device that controls the operation of a supply and demand adjustment device that is connected to a power grid, comprising steps of:

detecting the state of said supply and demand adjustment device;

transmitting to an external device the state of said supply and demand adjustment device and receiving from said external device operation control information for controlling the operation of said supply and demand adjustment device at predetermined intervals;

receiving an adjustment power amount, transmitted from an external device that differs from said external device, at intervals that are shorter than said predetermined intervals; and controlling the operation of said supply and demand adjustment device based on said adjustment power amount and said operation control information.

21. A control method performed by a control device that controls the operation of a supply and demand adjustment device that is connected to a power grid, comprising steps of:

detecting the state of said supply and demand adjustment device;

transmitting to an external device the state of said supply and demand adjustment device and receiving from said external device operation control information for controlling the operation of said supply and demand adjustment device;

receiving an adjustment power amount, determined based on power flow of an interconnection line that connects said power grid to another power grid and the grid frequency of said power grid, at intervals that are shorter than said predetermined intervals; and controlling the operation of said supply and demand adjustment device based on said adjustment power amount and said operation control information.

22. A control method performed by a control device that controls the operation of a supply and demand adjustment device that is connected to a power grid, comprising steps of:

detecting the degree of tendency for said supply and demand adjustment device to deteriorate;

transmitting to an external device said detection result and receiving from said external device operation control information for controlling the operation of said supply and demand adjustment device at predetermined intervals;

receiving an adjustment power amount at intervals that are shorter than said predetermined intervals; and controlling the operation of said supply and demand adjustment device based on said adjustment power amount and said operation control information;

wherein the operating load of said supply and demand adjustment device is reduced in proportion to the tendency of said supply and demand adjustment device to deteriorate.

23. A battery control device that controls the operation of a battery that is connected to a power grid, comprising:

detection means that detects the state of said battery;

communication means that transmits to an external device the detection result of said detection means, and moreover, that receives from said external device operation control information for controlling the operation of said battery at predetermined intervals, and that receives an adjustment power amount, for adjusting the balance between supply and demand of electric power in said power grid, at intervals that are shorter than said predetermined intervals; and control means that controls the operation of said battery based on said adjustment power amount and said operation control information.

24. A battery control method performed by a battery control device that controls the operation of a battery that is connected to a power grid, comprising:

detecting the state of said battery;

transmitting to an external device the state of said battery and receiving from said external device operation control information for controlling the operation of said battery at predetermined intervals;

receiving an adjustment power amount, for adjusting the balance between supply and demand of electric power in said power grid, at intervals that are shorter than said predetermined intervals; and controlling the operation of said battery based on said adjustment power amount and said operation control information.

25. A recording medium that can be read by a computer on which is recorded a program to be executed for causing a computer to execute:
   a detection procedure of detecting the state of a battery that is connected to a power grid;
   a communication procedure of transmitting the state of said battery to an external device, and moreover, receiving from said external device operation control information for controlling the operation of said battery at predetermined intervals and receiving an adjustment power amount, for adjusting the balance between supply and demand of electric power in said power grid, at intervals that are shorter than said predetermined intervals; and
   a control procedure of controlling the operation of said battery based on said adjustment power amount and said operation control information.

26. The control device according to claim 1, wherein said adjustment power amount is an amount determined on the basis of at least one of a power flow of an interconnection line by which said power grid is connected to another power grid, the voltage of the interconnection line, and the grid frequency of said power grid.

27. A control support device communicating with a control device that controls the operation of a supply and demand adjustment device that is connected to a power grid, comprising:
   communication means that receives state information that indicates the state of said supply and demand adjustment device and supply and demand adjustment information of said power grid; and
   computing means that generates operation control information for controlling the operation of said supply and demand adjustment device based on said state information and that generates adjustment power information based on said supply and demand adjustment information,
   wherein said communication means transmits said adjustment power information and said operation control information to said control device, wherein said adjustment power information is transmitted at intervals that are shorter than transmission intervals of said operation control information.

28. The control support device according to claim 27, wherein said supply and demand adjustment information of said power grid is determined on the basis of at least one of a power flow of an interconnection line by which said power grid is connected to another power grid and the grid frequency of said power grid.

29. A control support device communicating with a control device that controls the operation of a supply and demand adjustment device that is connected to a power grid, comprising:
   communication means that receives state information that indicates the state of said supply and demand adjustment device; and
   computing means that generates operation control information for controlling the operation of said supply and demand adjustment device based on said state information,
   wherein said communication means transmits adjustment power information and said operation control information to said control device by bidirectional communication or one-way communication, wherein said adjustment power information is transmitted at intervals that are shorter than transmission intervals of said operation control information.

30. The control support device according to claim 29, further comprising:
   comprehension means that comprehends the state of said power grid,
   wherein said computing means generates said operation control information based on said state information and the state of said power grid.

31. The control support device according to claim 29, further comprising:
   comprehension means that comprehends the state of said power grid,
   wherein said computing means generates said adjustment power information based on the state of said power grid or based on the state of said power grid and said state information.

32. The control support device according to claim 30, wherein
   the state of said power grid includes signal information from a central load dispatching office.

33. The control support device according to claim 31, wherein
   the state of said power grid includes signal information from a central load dispatching office.

34. The control support device according to claim 29, wherein
   said communication means receives said state information from said supply and demand adjustment device and transmits said operation control information to said supply and demand adjustment device.

35. A control support device communicating with a control device that controls the operation of a supply and demand adjustment device that is connected to a power grid, comprising:
   communication means that receives state information that indicates the state of said supply and demand adjustment device; and
   computing means that generates operation control information that indicates the correspondence relation between adjustment power information and allotted power information of each supply and demand adjustment device with respect to the allotted power information that is allotted to all supply and demand adjustment devices controlled by N, where N is a number equal to or greater than 2, of said control devices based on said state information, wherein
   said communication means transmits said adjustment power information and said operation control information to said control device, wherein said adjustment power information is transmitted at intervals that are shorter than transmission intervals of said operation control information.

36. A control support device communicating with a control device that controls the operation of a supply and demand adjustment device that is connected to a power grid, comprising:
   communication means that receives state information that indicates the state of said supply and demand adjustment device; and
   computing means that generates operation control information for reducing the operating load of said supply and demand adjustment device in proportion to the tendency of said supply and demand adjustment device to deteriorate, wherein said communication means transmits adjustment power information and said operation control information to said control device, wherein said adjustment power information is transmitted at intervals that are shorter than transmission intervals of said operation control information.

37. A control support method performed by a control support device communicating with a control device that controls the operation of a supply and demand adjustment device that is connected to a power grid, the method comprising steps of:

receiving state information that indicates the state of said supply and demand adjustment device and supply and demand adjustment information of said power grid;

generating operation control information for controlling the operation of said supply and demand adjustment device based on the state information;

generating adjustment power information based on said supply and demand adjustment information; and transmitting said adjustment power information and said operation control information to said control device, wherein said adjustment power information is transmitted at intervals that are shorter than transmission intervals of said operation control information.

38. A control support method performed by a control support device communicating with a control device that controls the operation of a supply and demand adjustment device that is connected to a power grid, the method comprising steps of:

receiving state information that indicates the state of said supply and demand adjustment device; and generating operation control information for controlling the operation of said supply and demand adjustment device based on said state information; and transmitting adjustment power information and said operation control information to said control device by bidirectional communication or one-way communication, wherein said adjustment power information is transmitted at intervals that are shorter than transmission intervals of said operation control information.

39. A control support method performed by a control support device communicating with a control device that controls the operation of a supply and demand adjustment device that is connected to a power grid, the method comprising steps of:

receiving state information that indicates the state of said supply and demand adjustment device;

generating operation control information that indicates the correspondence relation between adjustment power information and allotted power information of each supply and demand adjustment device with respect to the electric power information that is allotted to all supply and demand adjustment devices controlled by N, where N is a number equal to or greater than 2, of said control devices based on said state information;

transmitting adjustment power information and said operation control information to said control device, wherein said adjustment power information is transmitted at intervals that are shorter than transmission intervals of said operation control information.

40. A control support method performed by a control support device communicating with a control device that controls the operation of a supply and demand adjustment device that is connected to a power grid, the method comprising steps of:

receiving state information that indicates the state of said supply and demand adjustment device;

generating operation control information for reducing the operating load of said supply and demand adjustment device in proportion to the tendency of said supply and demand adjustment device to deteriorate; and transmitting adjustment power information and said operation control information to said control device, wherein said adjustment power information is transmitted at intervals that are shorter than transmission intervals of said operation control information.

* * * * *